(12) United States Patent
Bricaud et al.

(10) Patent No.: US 7,033,221 B2
(45) Date of Patent: Apr. 25, 2006

(54) CONNECTOR FOR HIGH CAPACITY SMART CARDS

(75) Inventors: Herve Guy Bricaud, Dole (FR); Yves Pizard, Dole (FR)

(73) Assignee: ITT Manufacturing Enterprise, Inc., Wilmington, DE (US)

( * ) Notice: Subject to any disclaimer, the term of this patent is extended or adjusted under 35 U.S.C. 154(b) by 96 days.

(21) Appl. No.: 10/657,423

(22) Filed: Sep. 8, 2003

(65) Prior Publication Data

US 2005/0059281 A1 Mar. 17, 2005

Related U.S. Application Data

(63) Continuation-in-part of application No. PCT/EP02/02640, filed on Mar. 11, 2002.

(30) Foreign Application Priority Data

Mar. 9, 2001 (FR) .................................. 01 03228

(51) Int. Cl.
H01R 24/00 (2006.01)
(52) U.S. Cl. ...................................... 439/630; 439/188
(58) Field of Classification Search ................ 439/188, 439/630, 489, 108, 101, 607, 609; 200/51.09, 200/51.1
See application file for complete search history.

(56) References Cited

U.S. PATENT DOCUMENTS 6,015,311 A * 1/2000 Benjamin et al. ........... 439/267
6,074,223 A * 6/2000 Huang .......................... 439/95
6,544,074 B1 * 4/2003 Bricaud et al. ............. 439/630
6,638,087 B1 * 10/2003 Takada et al. .............. 439/188
6,648,694 B1 * 11/2003 Takamori et al. ........... 439/630
6,692,276 B1 * 2/2004 Abe et al. ................... 439/188
6,709,281 B1 * 3/2004 Shishikura et al. ......... 439/188
6,719,577 B1 * 4/2004 Nogami ...................... 439/188
2001/0053622 A1 * 12/2001 Oguchi ....................... 439/188
2003/0064627 A1 * 4/2003 Ooya et al. ................. 439/630

* cited by examiner

*Primary Examiner*—Hien Vu
(74) *Attorney, Agent, or Firm*—Peter Van Winkle

(57) ABSTRACT

A smart card connector that includes an insulative support (52) with a card-supporting face (62), and a sheet metal cover (54) mounted on the support to form a card-receiving cavity (58) between the support and cover, for receiving SD and MICROSIM smart cards. A card-detecting switch blade (144) is mounted at one side of the support and has a blade part (150) that projects into the path of the card so the card deflects the blade against a side (116) of the sheet metal cover to close a circuit. The cover can be mounted on the support by sliding the cover rearwardly until projections (121, 123) at the front end of the cover each snaps into a notch (127, 129) near the front end of the support. The connector contacts have tails (104) for soldering to traces on a circuit board CB, the tails lying at a rear edge (84) of the support and the cover having tabs (132, 134) at the front end of the cover. The tails and tabs are soldered to traces on the circuit board (CB) for balanced hold-down of the connector to the circuit board. A stop molded into the support, prevents upside-down insertion of an SD card before it can damage the contacts.

4 Claims, 49 Drawing Sheets

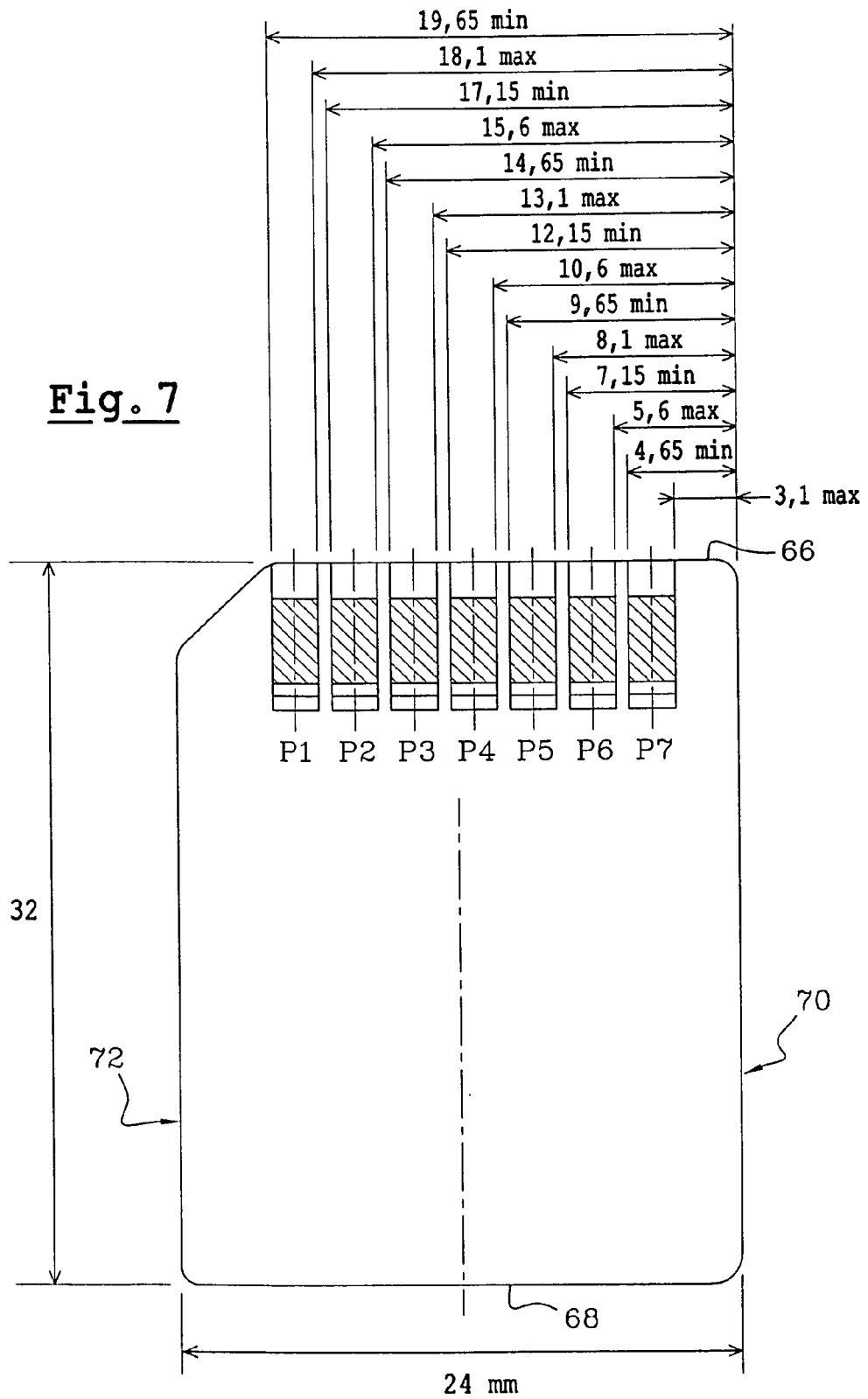

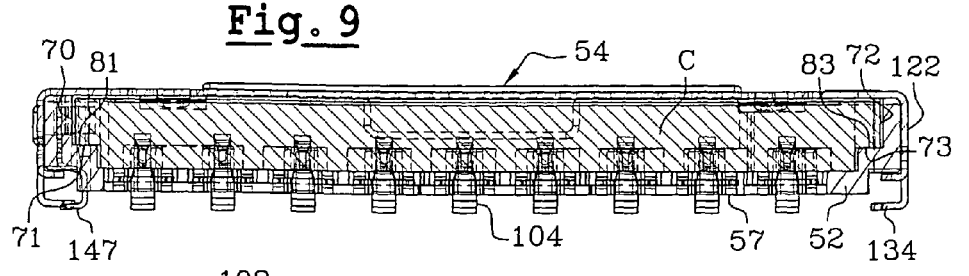
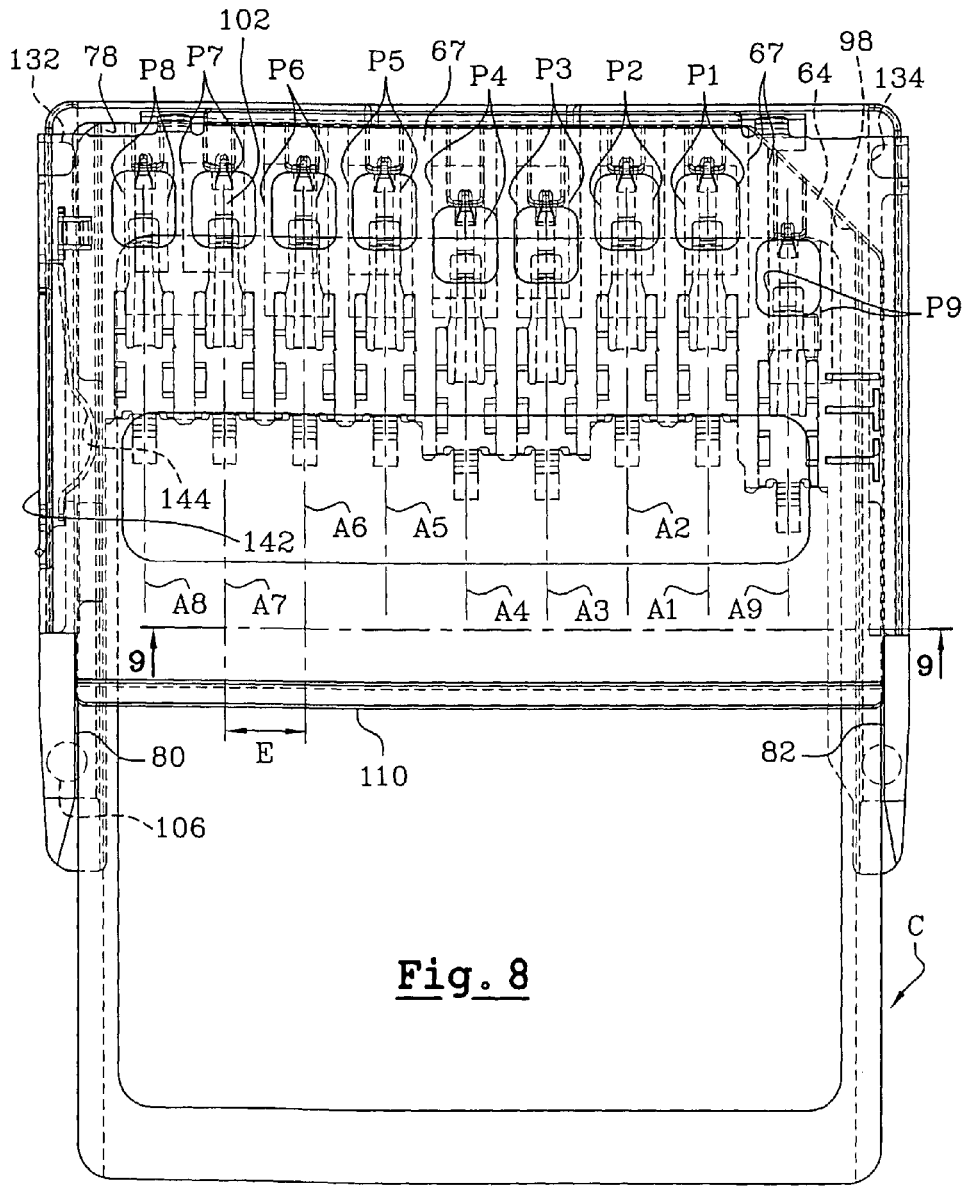

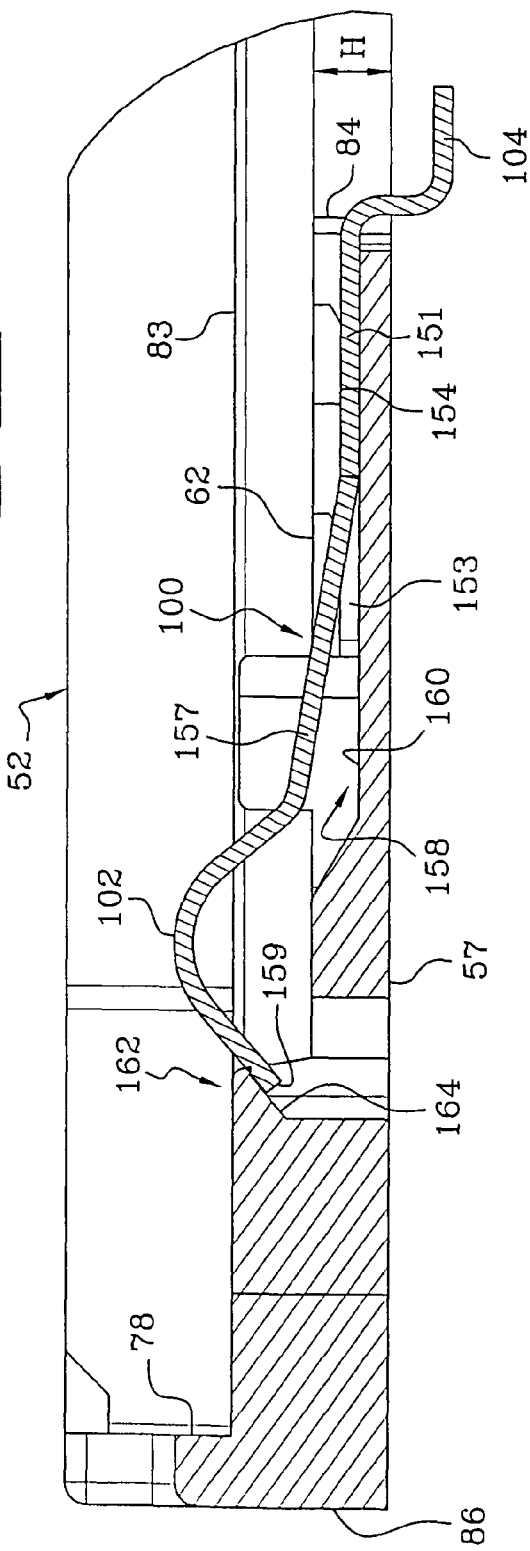

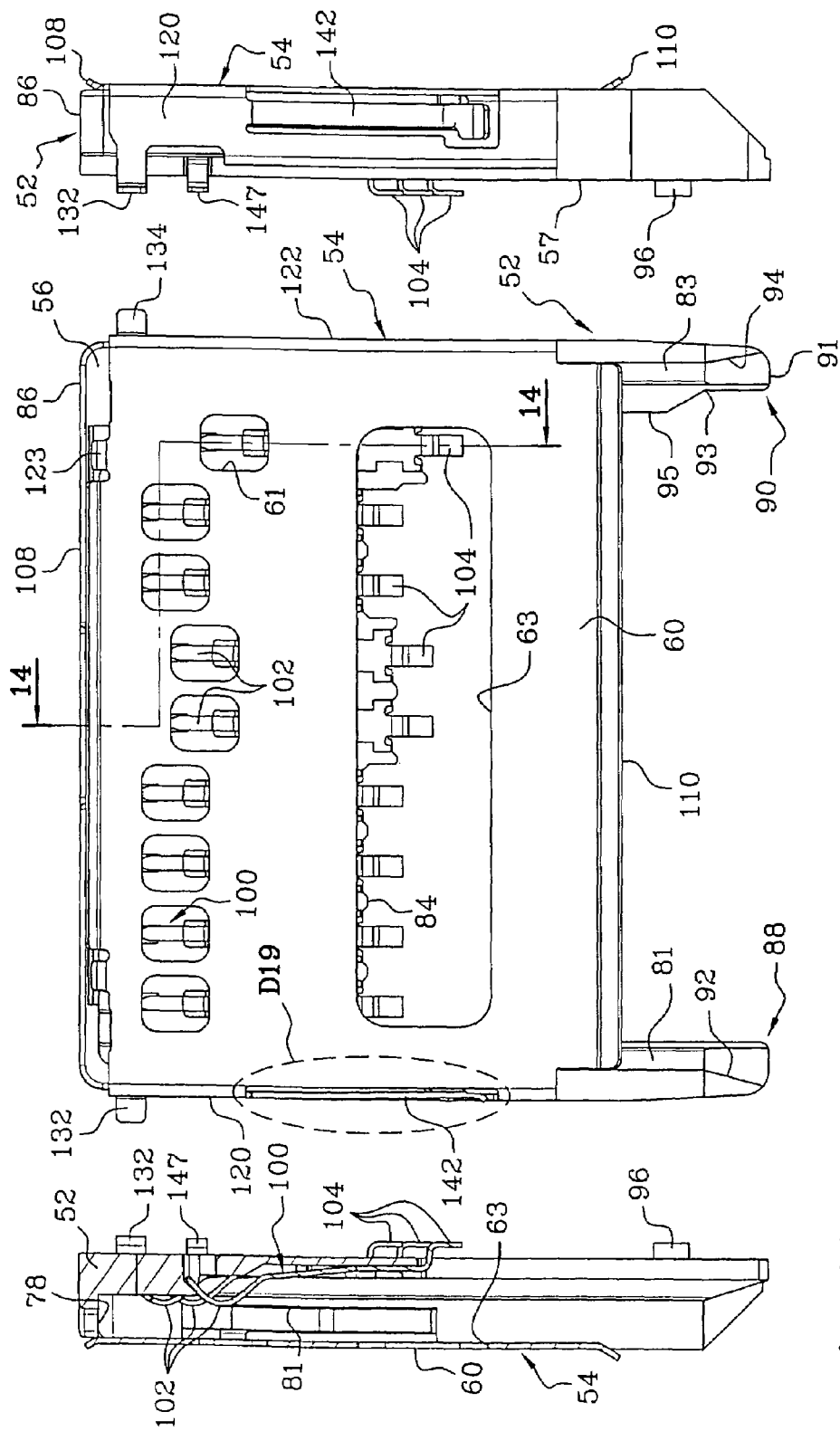

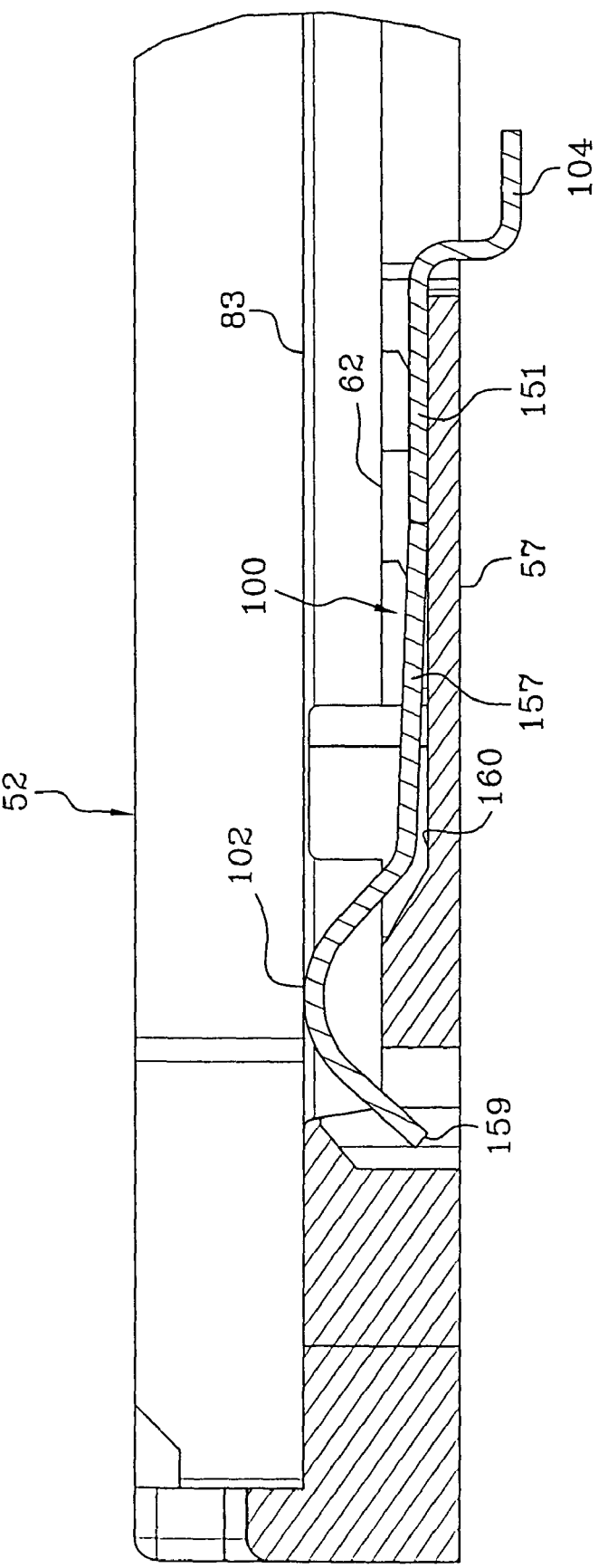

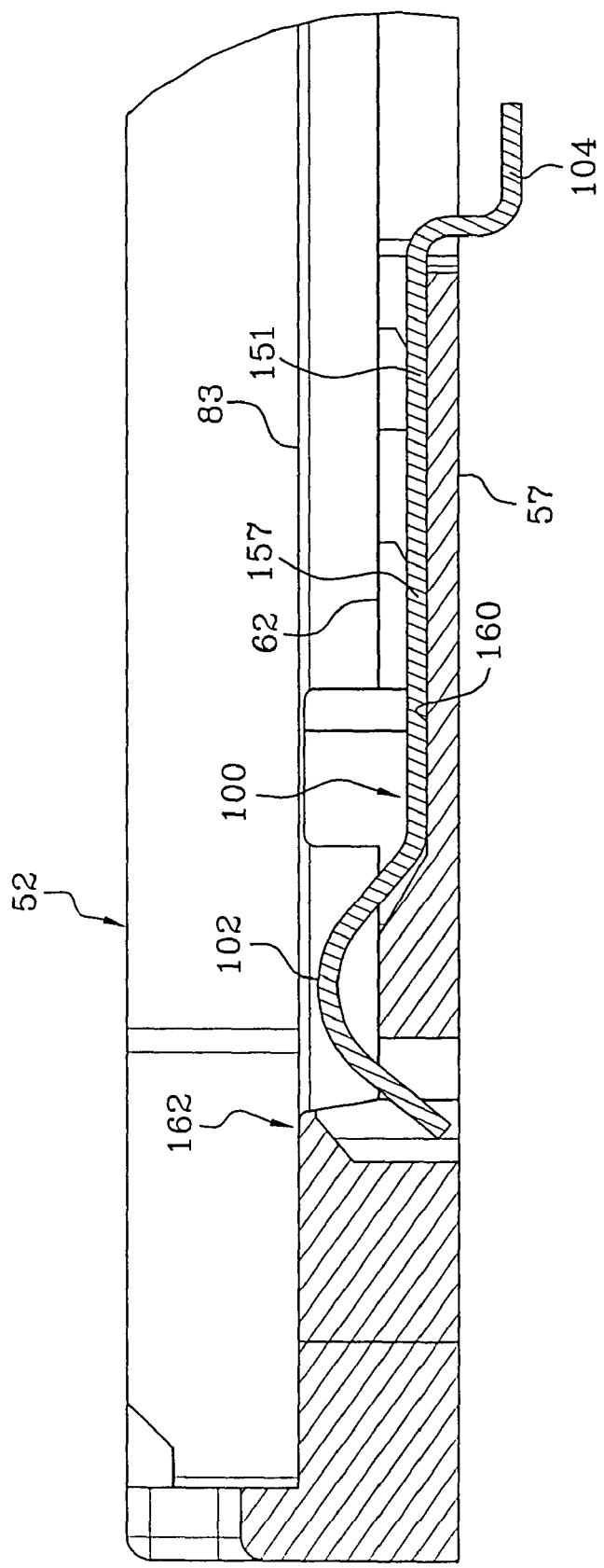

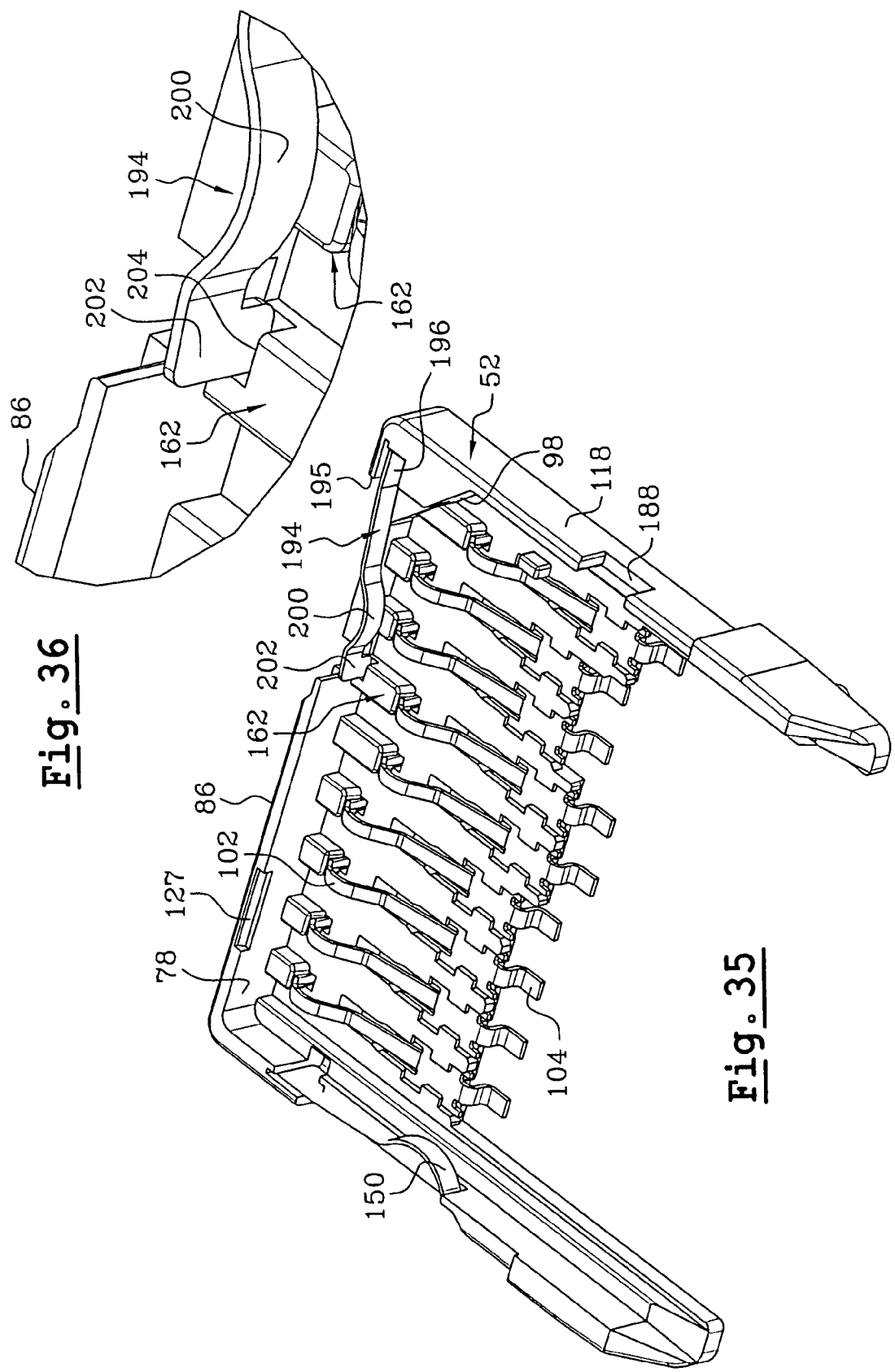

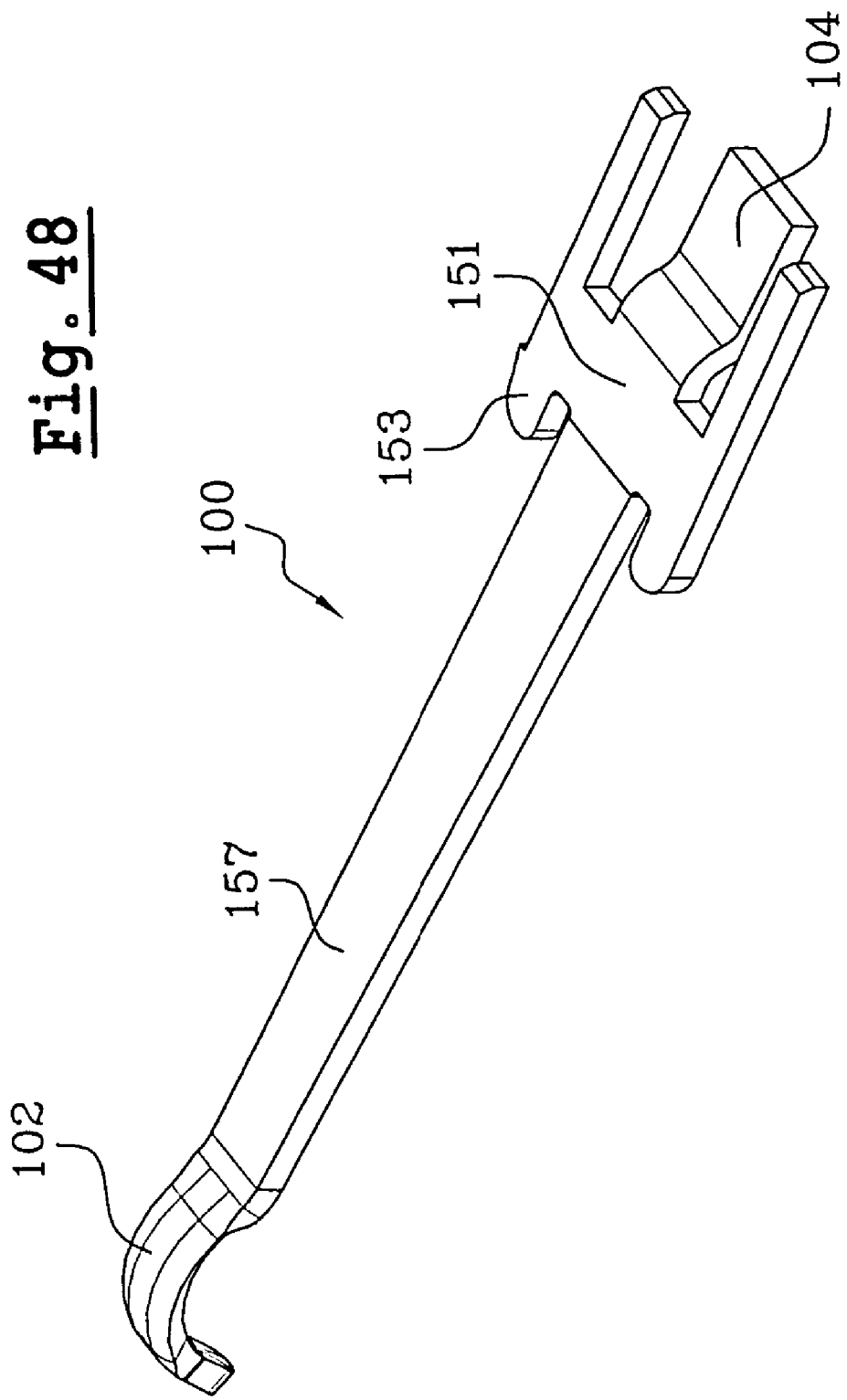

CONNECTOR FOR HIGH CAPACITY SMART CARDS

CROSS-REFERENCE

This is a continuation-in-part of PCT/EP02/02640 filed Mar. 11, 2002, which claimed priority from French patent application no. 0103228 filed Mar. 9, 2001.

BACKGROUND OF THE INVENTION

Smart card connectors commonly include a molded plastic insulative support having an upper face, at least one row of contacts mounted on the support and having pad-engaging ends projecting above the support, and a sheet metal cover that lies over the support to hold down a card. Improvements in such a connector which facilitated detection of a card being inserted, which facilitated mounting of the cover on the support, which facilitated fastening of the connector to a circuit board, and which prevented upside-down insertion of an SD type smart card far enough to damage a contact, would be of value. It also would be desirable if a dual connector were provided with first and second connector parts for receiving cards of different cross-sectional shapes, where the dual connector was of low cost design and occupied a minimum of circuit board space.

One type of smart card is a high capacity SD (secured digital) card which has a thickness of 2.1 mm and nine recessed contact pads. MMC cards have similarly placed seven contact pads but have a thickness of 1.4 mm. MICRO-SIM cards are slightly smaller in size than MMC cards, and have contact pads differently spaced.

SUMMARY OF THE INVENTION

In accordance with one embodiment of the present invention, a smart card connector is provided, which has a simple card-detecting switch, which is easily assembled and fastened to a circuit board, which blocks insertion of an upside-down SD card for a connector that receives such cards, and which can be constructed in a simple design to receive two different types of cards. In one connector, a switch blade with a tail soldered to a circuit board trace, is mounted on an insulative support and has a part lying in the path of an inserted card. An inserted card deflects the switch blade against a side of a sheet metal cover, to complete a circuit.

The sheet metal cover can be slid rearwardly onto the support until a pair of downward projections at the front end of the cover snap into notches near the front end of the support, to thereby lock the cover in place. Contacts mounted on the support have tails lying at a rear edge of the support where they are soldered to the circuit board. The cover has a pair of laterally-spaced tabs at its front end, that extend down to the level of the circuit board and are soldered thereat to the circuit board. This provides a balanced fastening of the connector to the circuit board.

For a connector that receives only SD smart cards, which have grooves at their front ends in which their contact pads lie, applicant forms the support with an upstanding projection. The projection can be received in one of the grooves, but prevents upside-down insertion of the SD card far enough to damage the contacts.

A dual connector that can receive two different types of cards with different cross-sectional shapes, has first and second groups of contacts for the first and second connector parts. The tails of the first group of contacts lie at a front end of the support, while the tails of a second group of contacts lie at laterally opposite sides of the support.

The novel features of the invention are set forth with particularity in the appended claims. The invention will be best understood from the following description when read in conjunction with the accompanying drawings.

BRIEF DESCRIPTION OF THE DRAWINGS

FIG. 7 is a bottom of an MMC card, and showing main standardized dimensions of the MMC card.

FIG. 8 is a top view of the connector and smart card of FIGS. 2 and 3, which are shown as though the connector were transparent, and with the contact pads on the lower face of the SD card shown to illustrate the relative positions of the pad-engaging parts of a contact blade with respect to an associated contact pad.

FIG. 9 is a sectional view taken on line 9—9 of FIG. 8.

FIG. 12 (shown on the same sheet as FIG. 22) is a partial isometric view taken on arrow F12 of FIG. 11.

FIG. 13 is a top view of the connector of FIG. 1, but with cover solder tabs turned outward.

FIG. 14 is a sectional view taken on line 14—14 of FIG. 13.

FIG. 15 is a left side view of the connector of FIG. 13.

FIG. 22 is an enlarged sectional view taken on line 22 of FIG. 11, which shows a contact blade in its initial position wherein a card is not in the connector.

FIG. 23 is a view similar to that of FIG. 22, but with the contact blade depressed to the height of a step 83.

FIG. 24 is a view similar to that of FIG. 22, in which the contact blade is depressed to almost its lowest position.

FIGS. 33–40 are isometric views of a connector of another embodiment of the invention, for receiving an SD card.

FIGS. 41–51 are views of a connector of another embodiment of the invention.

DESCRIPTION OF THE PREFERRED EMBODIMENT

A. General Description

Figure 1:
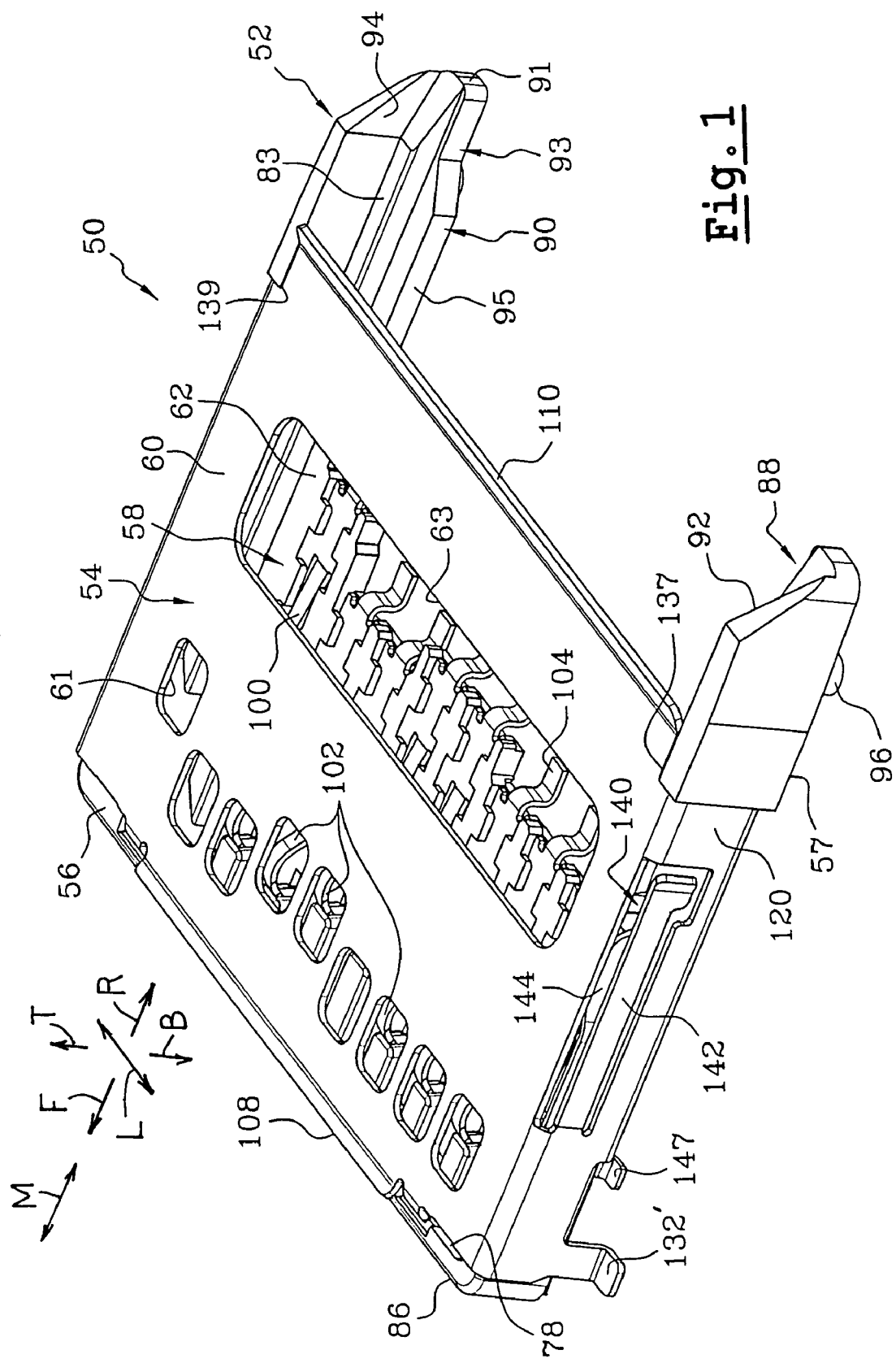
FIG. 1 is a top and left side isometric view of a connector of the present invention.
Figure 4:
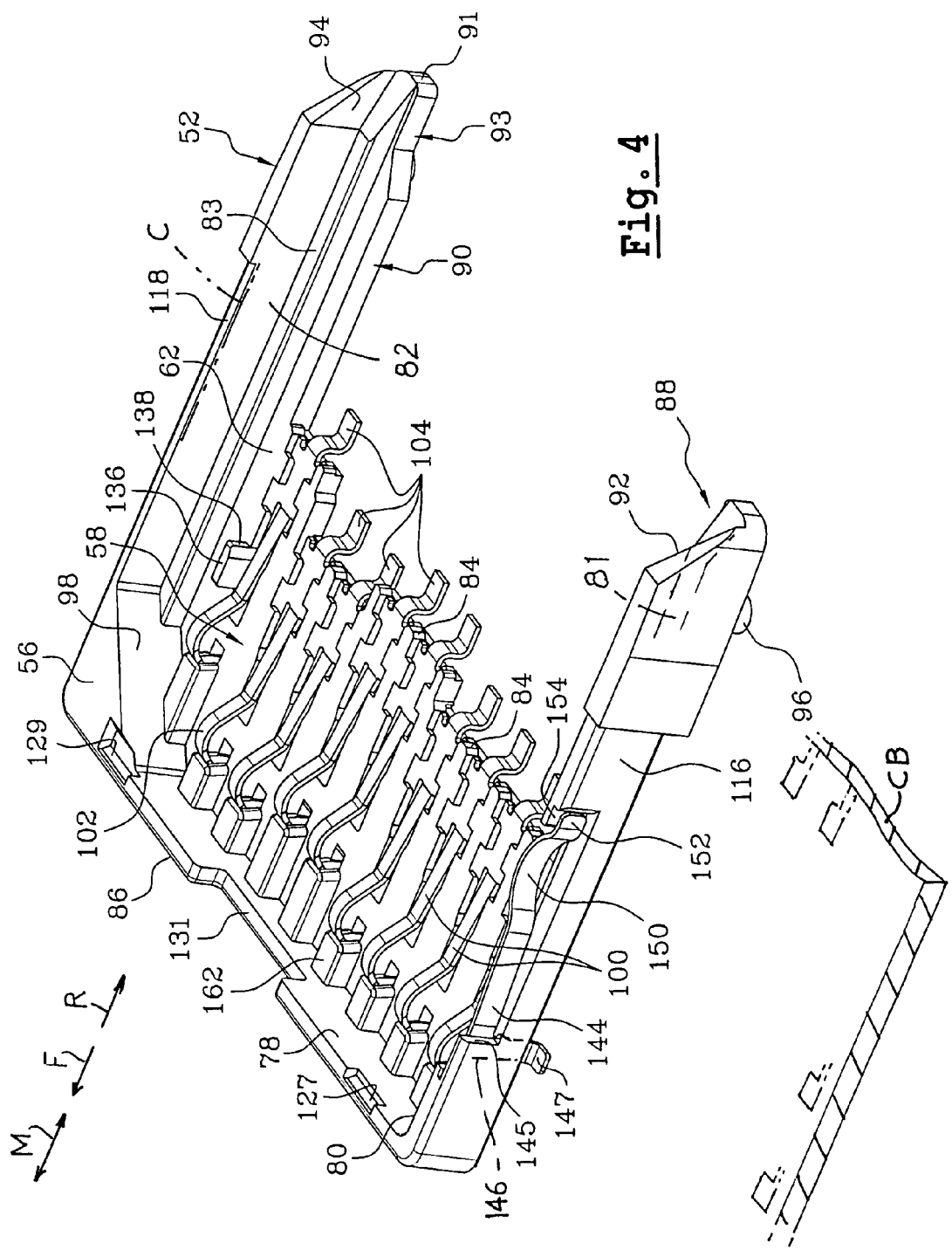
FIG. 4 is a top and left side isometric view of the connector of FIG. 1, but without the cover, and also showing a circuit board.

FIG. 1 illustrates a smart card connector 50 of the present invention, which includes an insulative support 52 and a sheet metal cover 54 that together form a card-receiving cavity 58 between them. The cover has laterally L opposite sides 120, 122 at opposite sides of the connector. The connector extends in front F and rear R longitudinal M directions, and in upper or top T and lower or bottom B directions. As shown in FIG. 4, the support 52 has a cavity bottom wall 62 on which a smart card such as an SD card lies, and the connector has a plurality of contact blades or contacts 100 mounted on the support. The contacts have pad-engaging ends 102 that project above the cavity bottom wall 62 to engage contact pads at the lower face of the card. The contacts have rear ends that form tails 104 that lie at a height to be soldered to traces of a circuit board CB on which the connector lies. The tails 104 lie at a rear edge 84 of the support. The support also has laterally opposite rear extensions 88, 90 that extend rearward of the rear edge 84 and that help guide opposite sides of an inserted card C.

Figure 2:
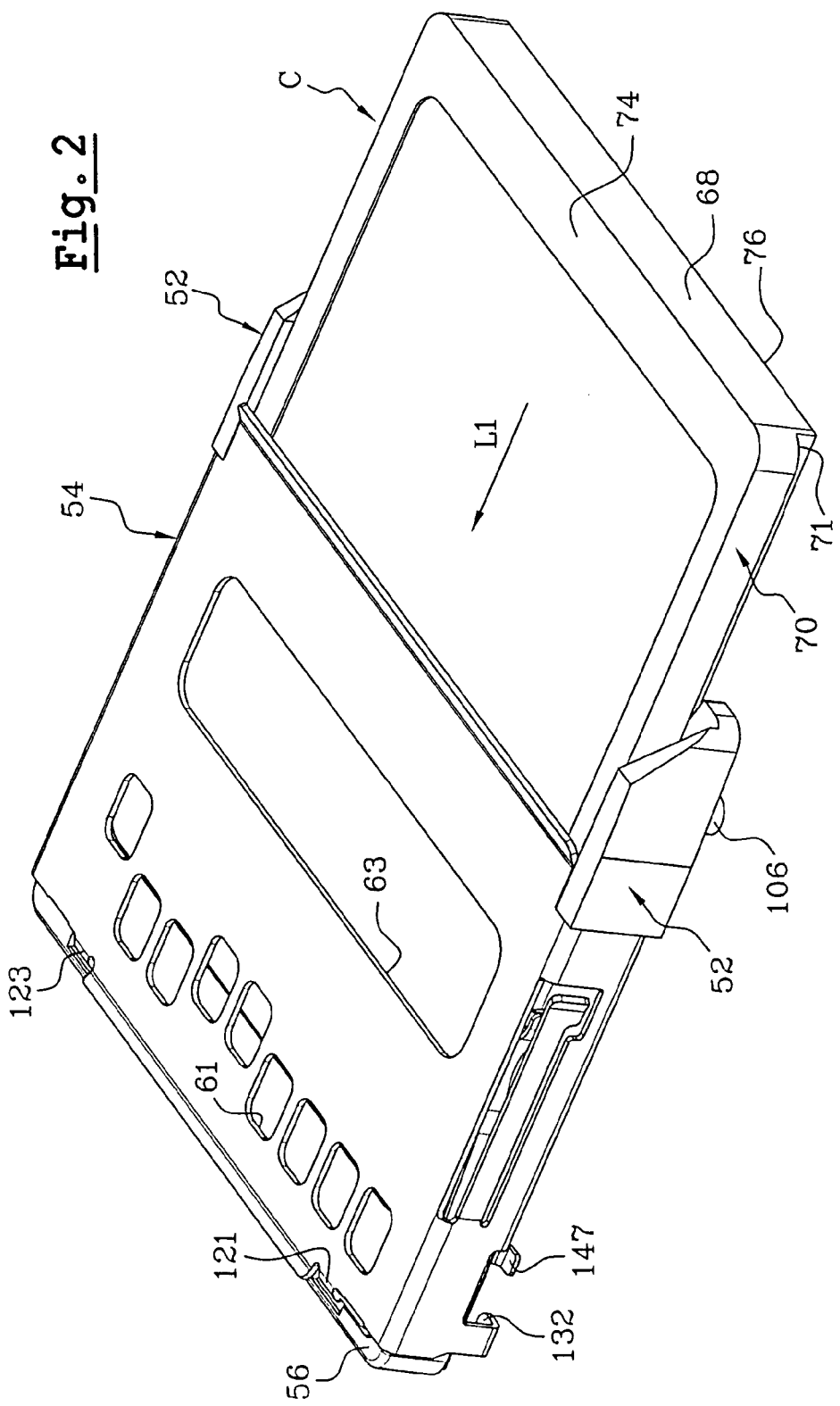
FIG. 2 is a view similar to that of FIG. 1, but showing an SD type smart card fully inserted into the connector.
Figure 3:
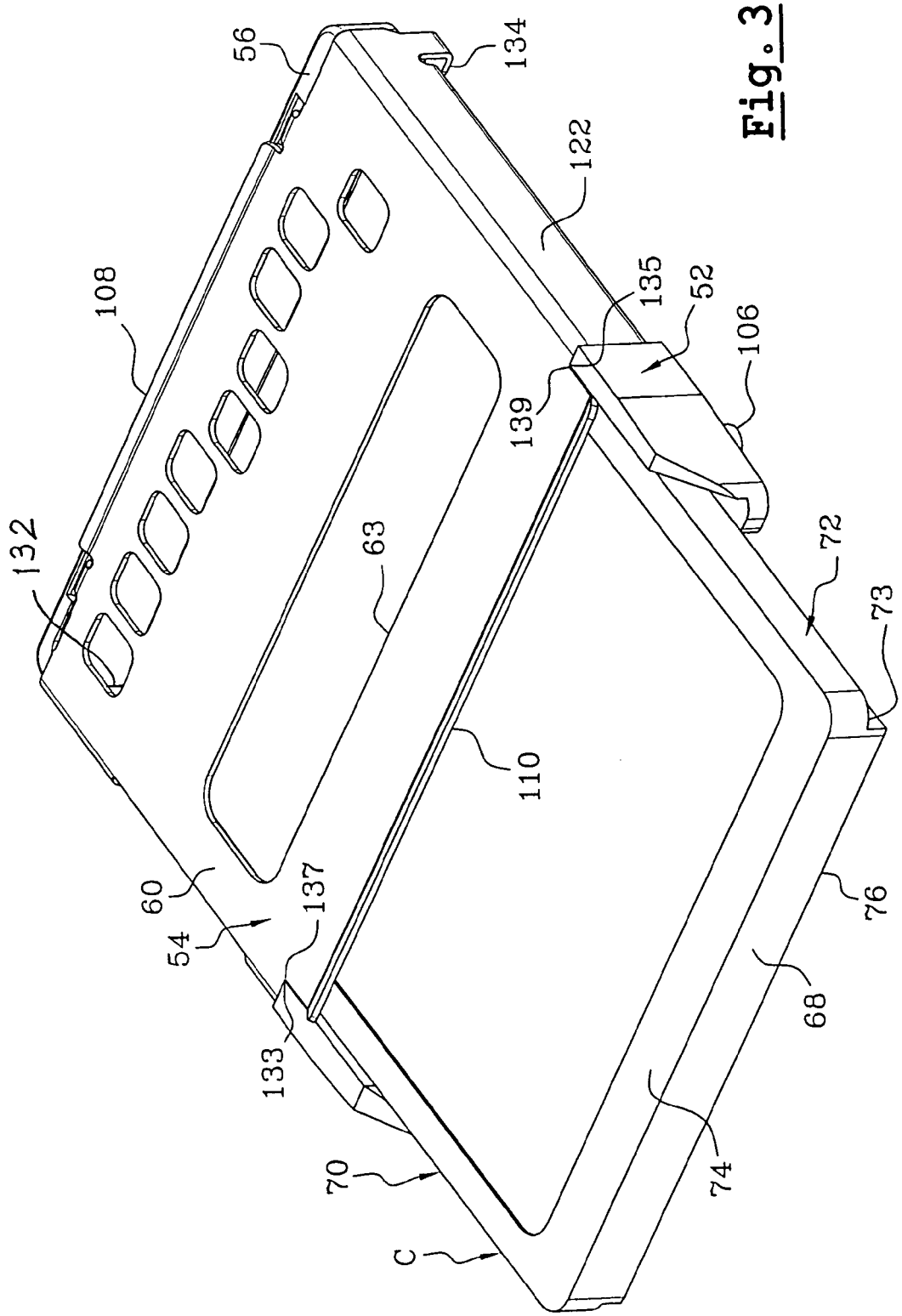
FIG. 3 is a top and right side isometric view of the connector of FIG. 2, with the card fully inserted.
Figure 6:
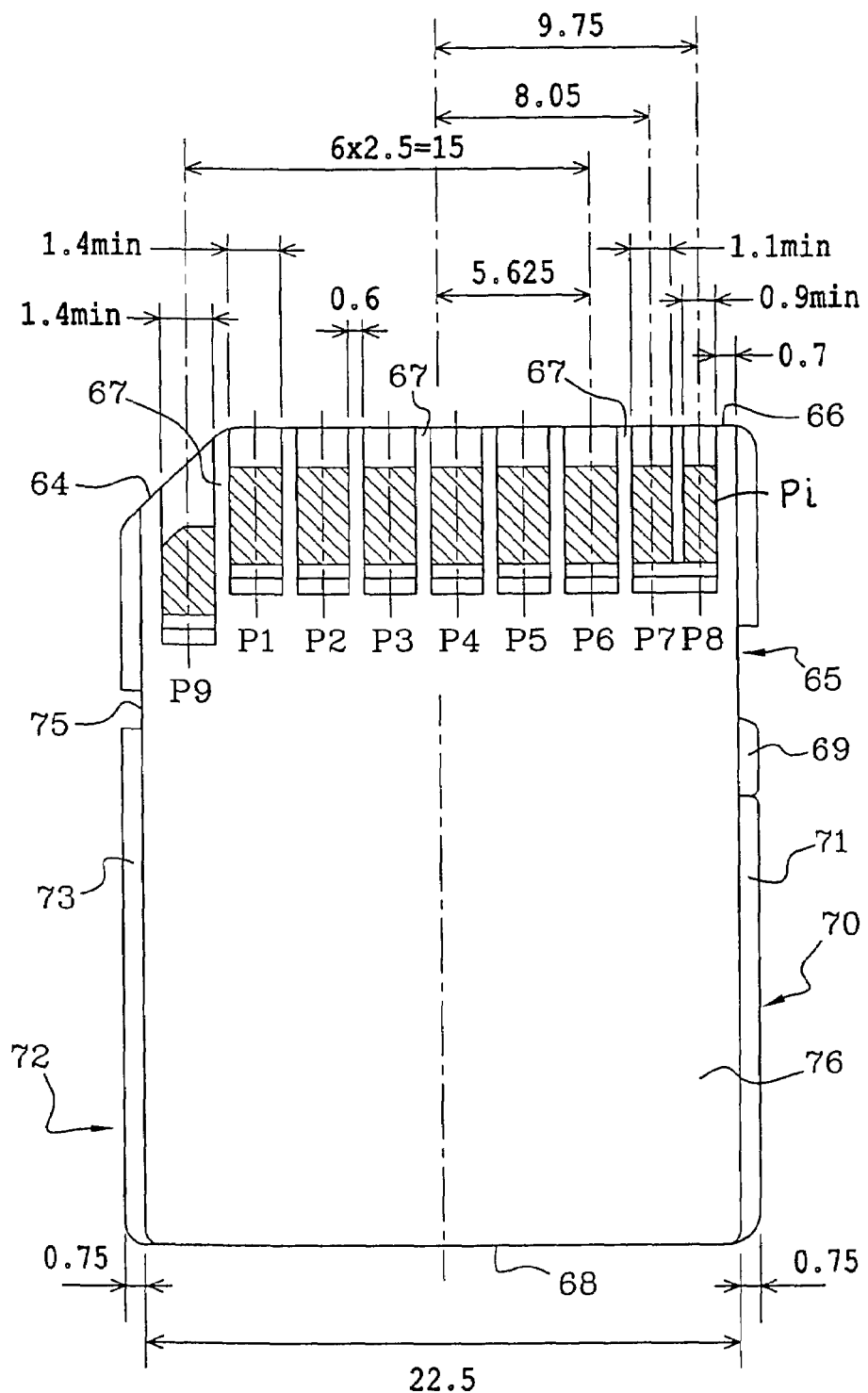
FIG. 6 is a bottom view of an SD card, showing major standardized dimensions of the SD card.

The connector is designed to receive two different types of memory cards, or smart cards, one type being an SD card and the other type being an MMC card. FIG. 6 shows an SD card, which has an overall width of 24 mm, but which has insteps at its opposite sides that are each of a width of 0.75 mm. The SD card has a thickness of 2.1 mm (±0.15 mm). The MMC card of FIG. 7 also has a width of 24 mm, but is thinner than the SD card and does not have insteps at its opposite sides. FIGS. 2 and 3 show an SD card which has steps 71, 73 at its laterally opposite sides.

As shown in FIG. 4, applicant provides guide steps 81, 83 at the opposite sides of the support, which receive the SD card insteps. The thinner MMC card slides on the top of the steps 83.

Figure 19:
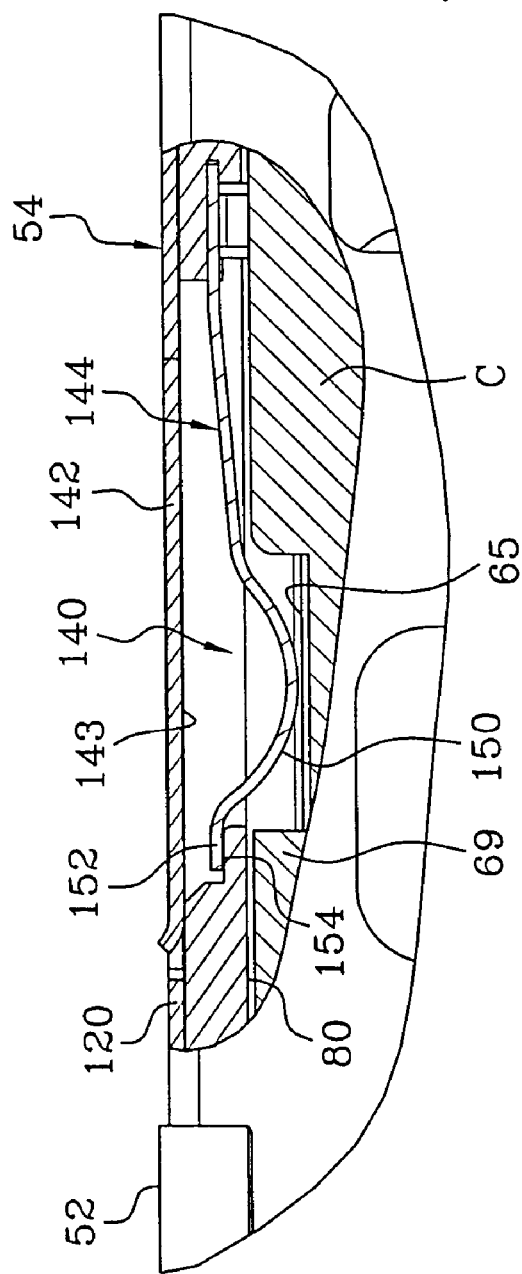
FIG. 19 is a partially sectional view of detail D19 of FIG. 13, which shows the switch in its open position.
Figure 20:
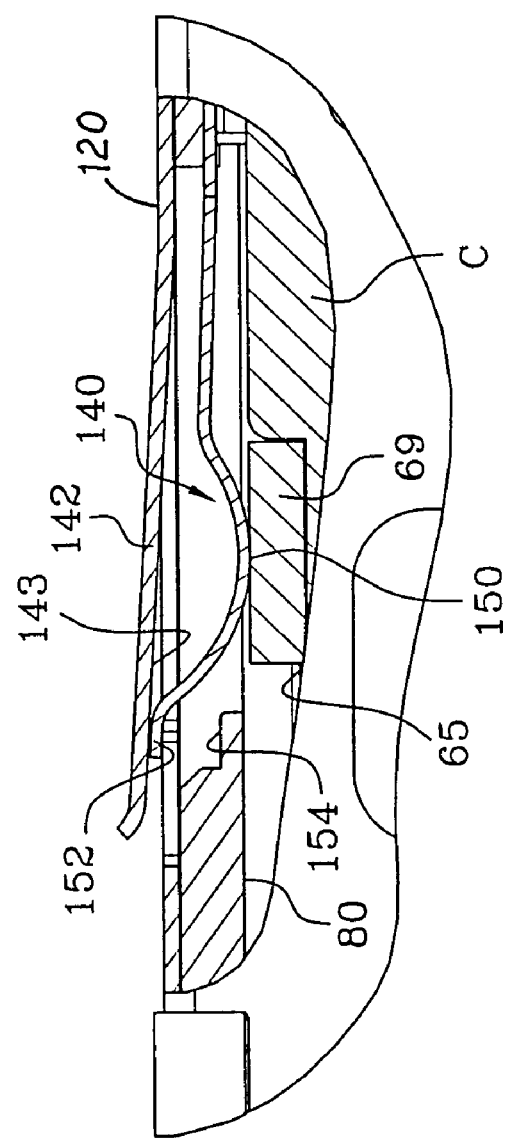
FIG. 20 is a view similar to FIG. 19, but which illustrates the switch in its closed position, corresponding to detection of a write protect device.

In accordance with one aspect of the present invention, applicant provides a switch blade 144 (FIG. 4) for detecting deep insertion of a card. The switch blade has a cover-engaging part 150 that is positioned to be deflected laterally by an inserted card. As shown in FIG. 19, the switch blade has an end 152 forming a tab that is biased against a fixed surface, or stop at 154. FIG. 20 shows that when a card cursor part 69 (also see FIG. 27) passes across the laterally projecting blade part 150, the switch blade is deflected so the end 152 is pressed against a side 120 of the sheet metal cover 54. FIG. 20 shows the cursor 69 deflecting the switch blade while FIG. 19 shows a recess 65 in the card, so the switch is first closed, then opened, and then closed again as the card passes by. The opening and closing can be used to signal whether the card is an SD type or MMC type. Both the switch blade 144 and cover 54 are connected to circuit board traces so a circuit is closed when the switch blade is deflected.

FIG. 1 shows that the side 120 of the sheet metal cover is formed with a slot that leaves a cover blade or tine 142 adjacent to the switch blade 144. The cover tine 142 provides additional resilience. In FIG. 20, the cover blade 142 is shown deflecting out of its original position.

Figure 17:
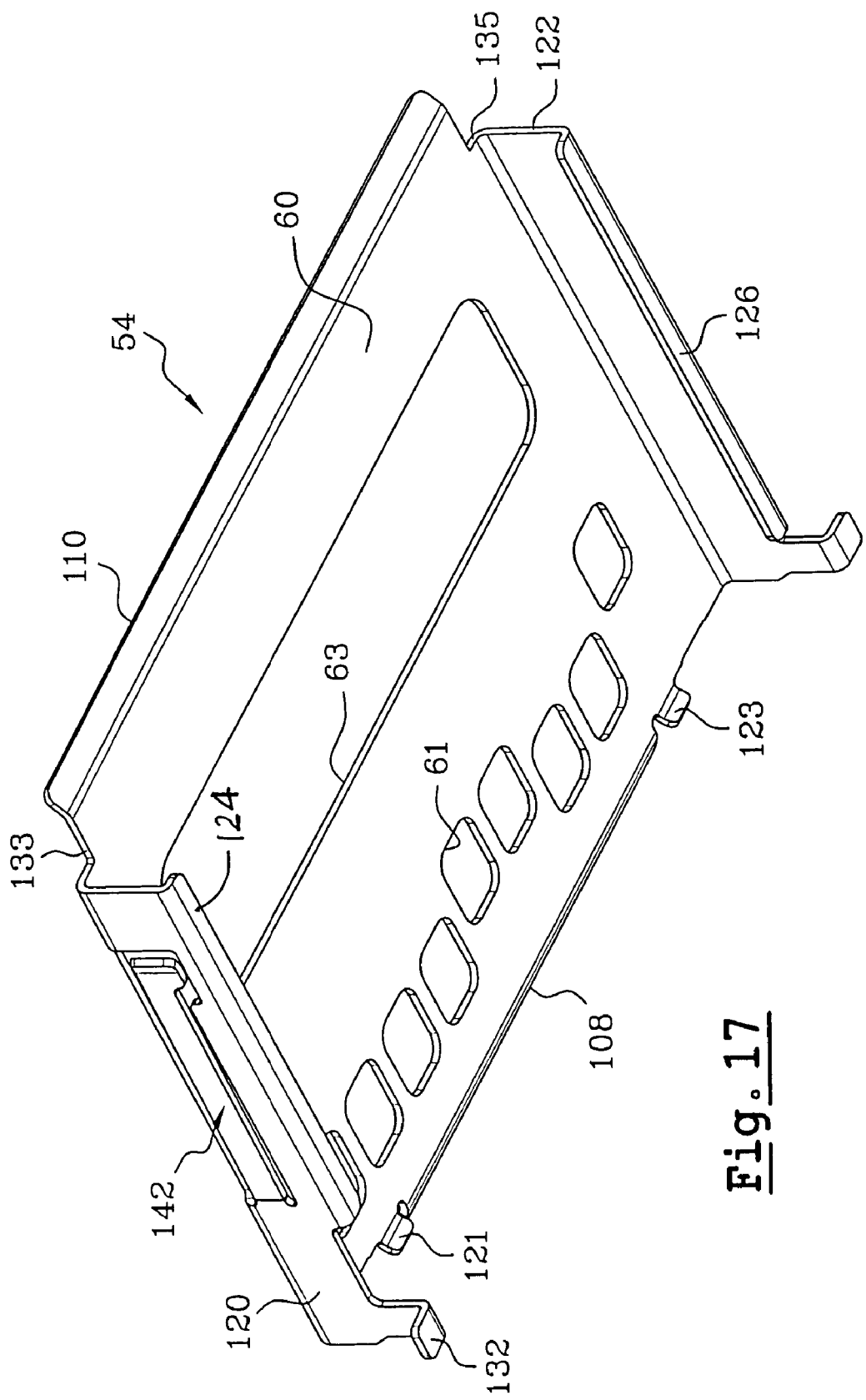
FIG. 17 is a bottom isometric view of the cover of FIG. 16.
Figure 18:
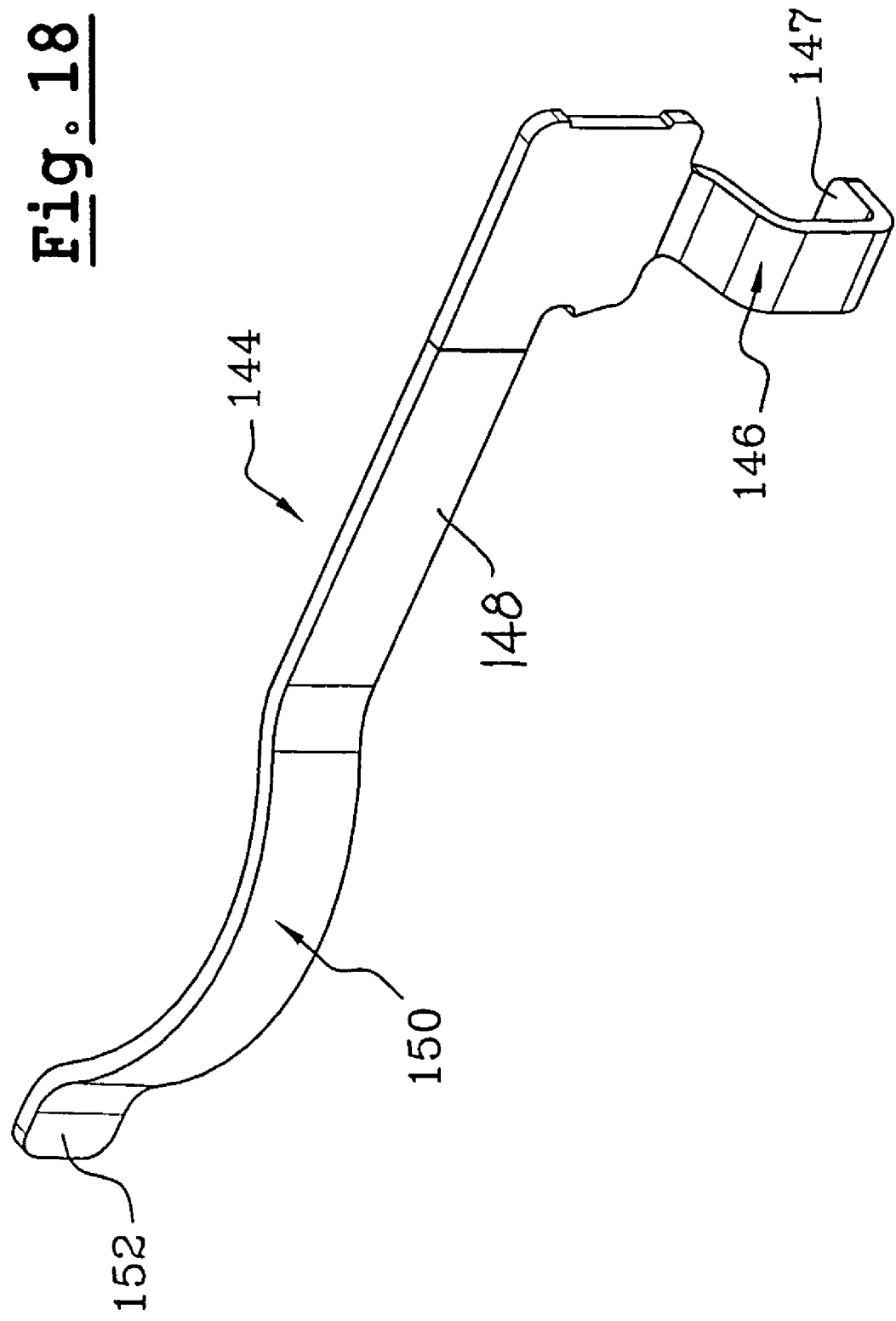
FIG. 18 is an enlarged isometric view taken along arrow F18 in FIG. 11, which shows the switch contact blade for detecting card position.

FIG. 4 shows that the front end of the molded insulative support 52 has a pair of notches 127, 129. The notches lie in the upper surface of support top face 56 near the front end of the support. FIG. 17 shows that the sheet metal cover has a pair of laterally-spaced and partially downward projections 121, 123. The cover 54 is installed, as shown in FIG. 2, by sliding the cover rearwardly around the support until the projections 121, 123 snap into the notches in the support. The cover shown in FIG. 17, has a bottom with horizontal branches 124, 126 that slide under the bottom of the support, while the sides 120, 122 of the cover slide along opposite sides of the support.

As shown in FIG. 4, the frontwall of the support has a cutout 131. To remove the cover (prior to soldering or after desoldering) a person can insert a screwdriver blade or the like to snap up the projections out of the notches 127, 129 to remove the cover.

As described earlier, the tails 104 of the contacts are soldered to traces on the circuit board on which the connector is mounted. The tails 104 lie at the rear edge 84 of the support. The sheet metal cover has a pair of tabs 132, 134 (FIG. 3) that also extend down to the level of the circuit board on which the connector lies. The tabs are soldered to traces on the circuit board. The combination of tails at the rear edge of the support and the tabs 132, 134 at laterally opposite sides of the front end of the support, results in a balanced fastening of the connector to the circuit board.

Figure 26:
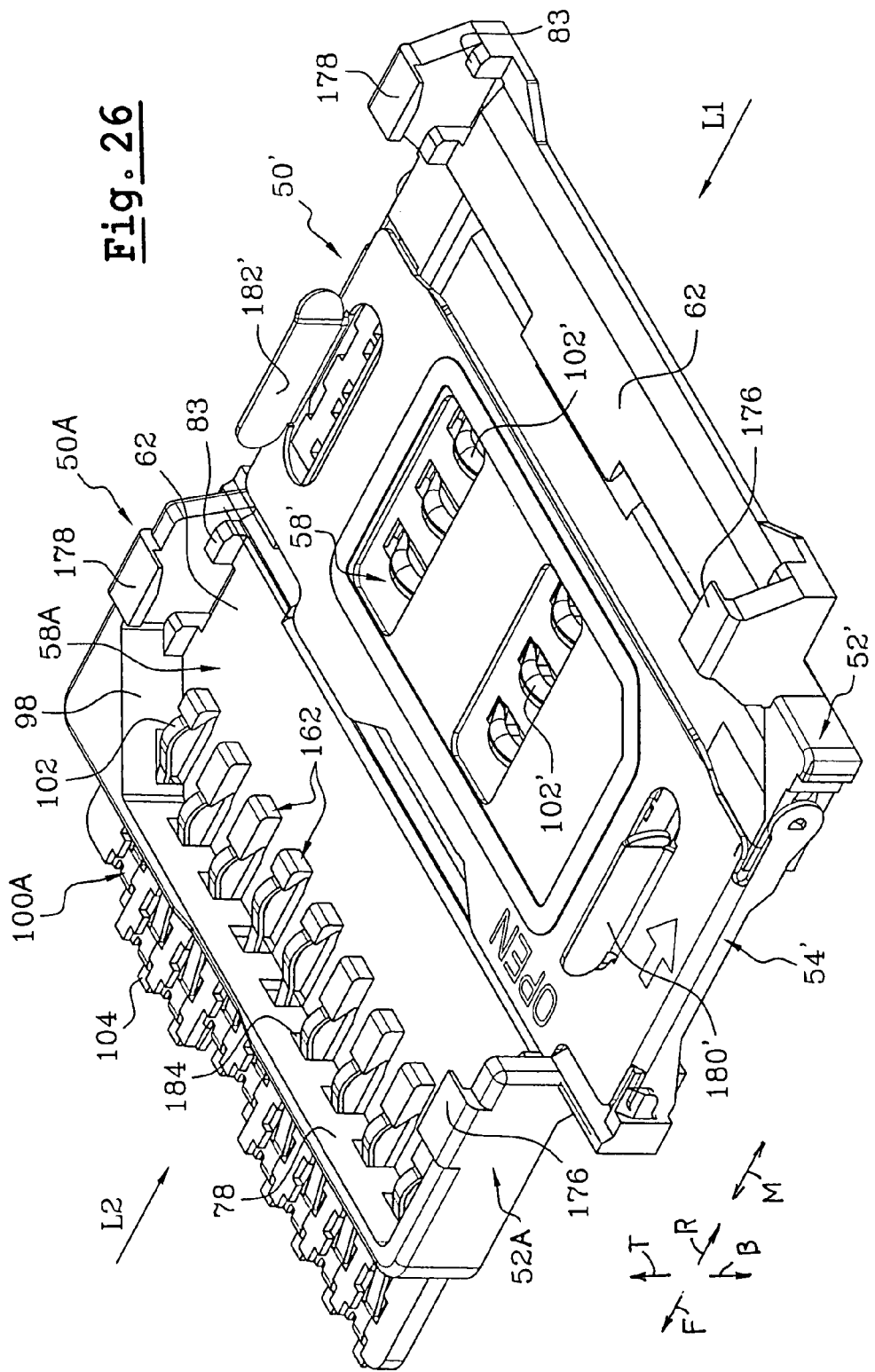
FIG. 26 is a top, rear and left side isometric view of a dual connector constructed in accordance with another embodiment of the invention, which can receive both a MICROSIM card and an SD card.

FIG. 26 illustrates a connector 51 that has two connector parts 50A and 50'. A single insulative support 52A forms part of each connector. The second connector 50' has a sheet metal cover 54', and a card-receiving cavity 58' is formed between the sheet metal cover 54' and a portion of the support. The first connector part 50A does not have a sheet metal cover but has guide tabs 176, 178 that hold down an inserted card.

The sheet metal cover 54' has two upstanding guide tabs 180', 182' that form side guides for the insertion of a card into the cavity 50A of the first connector part 50A.

Figure 29:
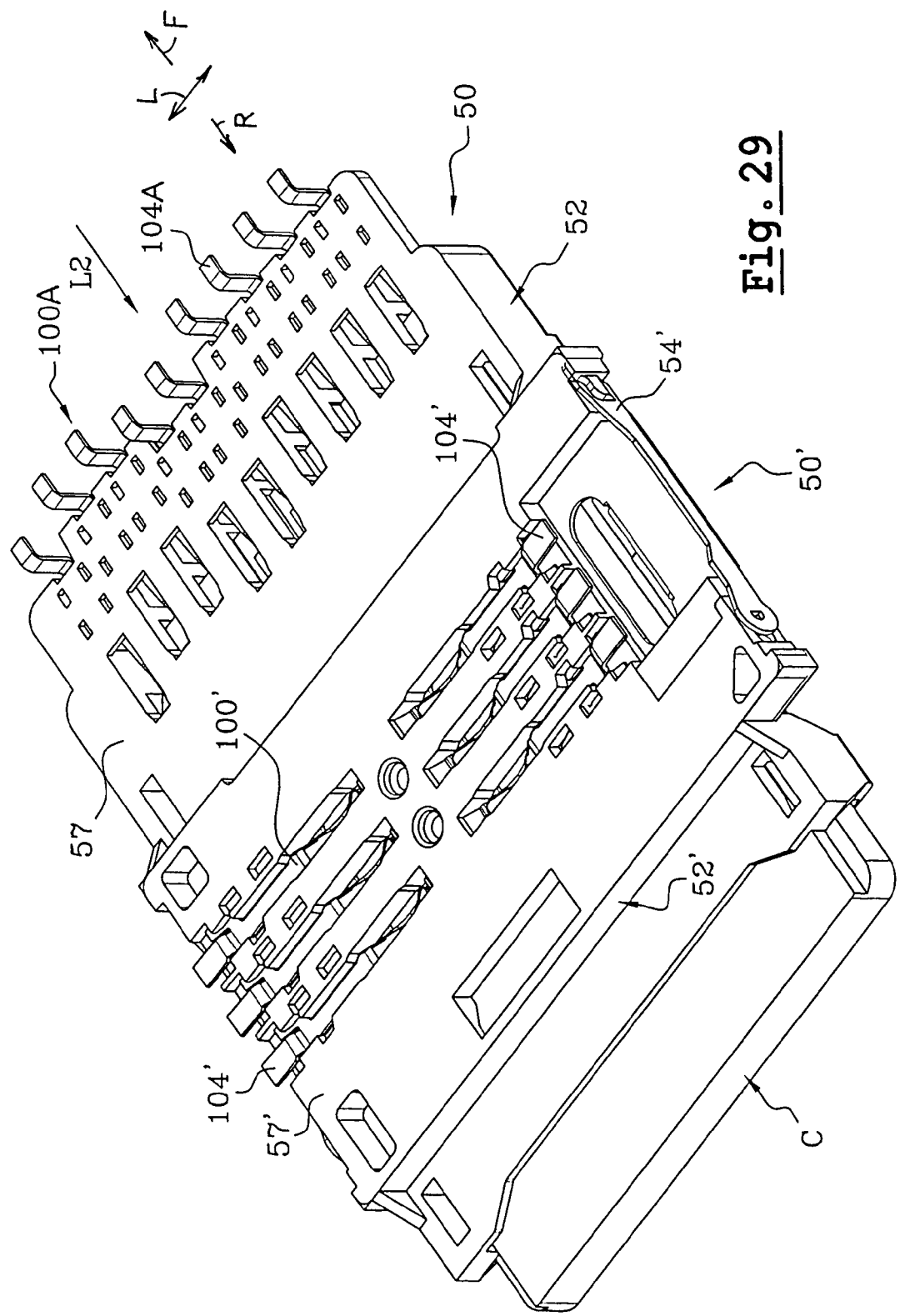
FIG. 29 is a bottom isometric view of the connector and fully inserted SD card of FIG. 27.

As shown in FIG. 29, the contacts 100A for the first connector form tails 104A at the front end of the connector, that are soldered to circuit board traces. The contacts 100' of the second connector form tabs 104' that lie at opposite lateral L sides of the second connector part. This provides a balanced fastening of the connector to the circuit board.

B. Detailed Description of the Invention

In the description which follows, identical, similar or analogous components will be denoted by the same reference numbers.

FIG. 1 shows an electrical connector 50 which essentially consists of an overall plate-shaped plastic insulating support 52 and a metal or metallized lid or cover 54 which extends above a flat horizontal upper face 56 of the insulating support 52. The support and cover form a card-receiving cavity.

The cavity 58 is bounded vertically downwards by a horizontal lower bottom wall 62 and it is open longitudinally rearwards so as to have a slot for the longitudinal insertion of the front portion of an electronic memory card which is, for example, a card C of the SD type or of the MMC type.

The card C (FIG. 4), of known design, has a rectangular overall shape bounded longitudinally by a transverse front end edge 66, by a transverse rear end edge 68 and by two parallel and opposed lateral edges 70 and 72.

The front right corner corresponding to the intersection of the edges 66 and 72 has a cut corner 64 cut at the standardized 45° for polarizing the position and orientation of the card C.

Moreover, the card C has a horizontal upper face 74 and an opposed parallel lower face 76 which is turned towards the free contact ends 102 of the contact blades of the connector, and in this case downwards towards the printed circuit board and which has, near its transverse front end edge 66, a series of conducting contact pads Pi which are oriented downwards towards the printed circuit board (not shown) which carries the connector on its upper face.

The two types of card—SD and MMC—are shown in FIGS. 6 and 7, seen from their lower faces 76.

The card C is thus capable of being inserted, in the direction L1 indicated in FIG. 2, from the rear forwards into the cavity 58 until its front transverse edge 66 butts against a front transverse bottom edge 78 which defines the cavity 58 towards the front.

The opposed lateral edges 70 and 72 of each card C are guided so as to slide in the cavity 58 by parallel and opposed longitudinal edges 80 and 82 (FIG. 4) respectively, by which the cavity 58 is bounded transversely.

More specifically, as may be seen in FIGS. 4 and 9, the edges 80 and 82 have a stepped profile complementary to the profile of the edges 70 and 72 of the SD card (each edge of which has a step 71, 73) with a horizontal step 81, 83, on which steps the card inserted into the connector "slides" so as to be able to take either an SD card, as shown in the figures, or an MMC card (not shown in position in the connector) which is then housed above the steps 81 and 83.

As may be seen in the figures, the cavity 58 proper, which receives the front portion of the card C, is bounded transversely forwards by the front transverse bottom edge 78 and transversely towards the rear by a transverse rear end face 84 of the insulating support 52.

Moreover, the insulating support 52 is bounded transversely forwards by a front transverse face.

In order to improve the lateral guiding of the card C as it slides during its insertion into or its extraction from the housing 58, the body of the insulating support 52 has two long opposed longitudinal extensions or arms 88 and 90 which extend longitudinally rearwards beyond the rear transverse face 84 in order to increase the length of the longitudinal guiding edges 80 and 82.

The extensions 88 and 90 also have profiles which extend those of the guiding edges 80, 82 with an insertion chamfer 92, 94.

Figure 5:
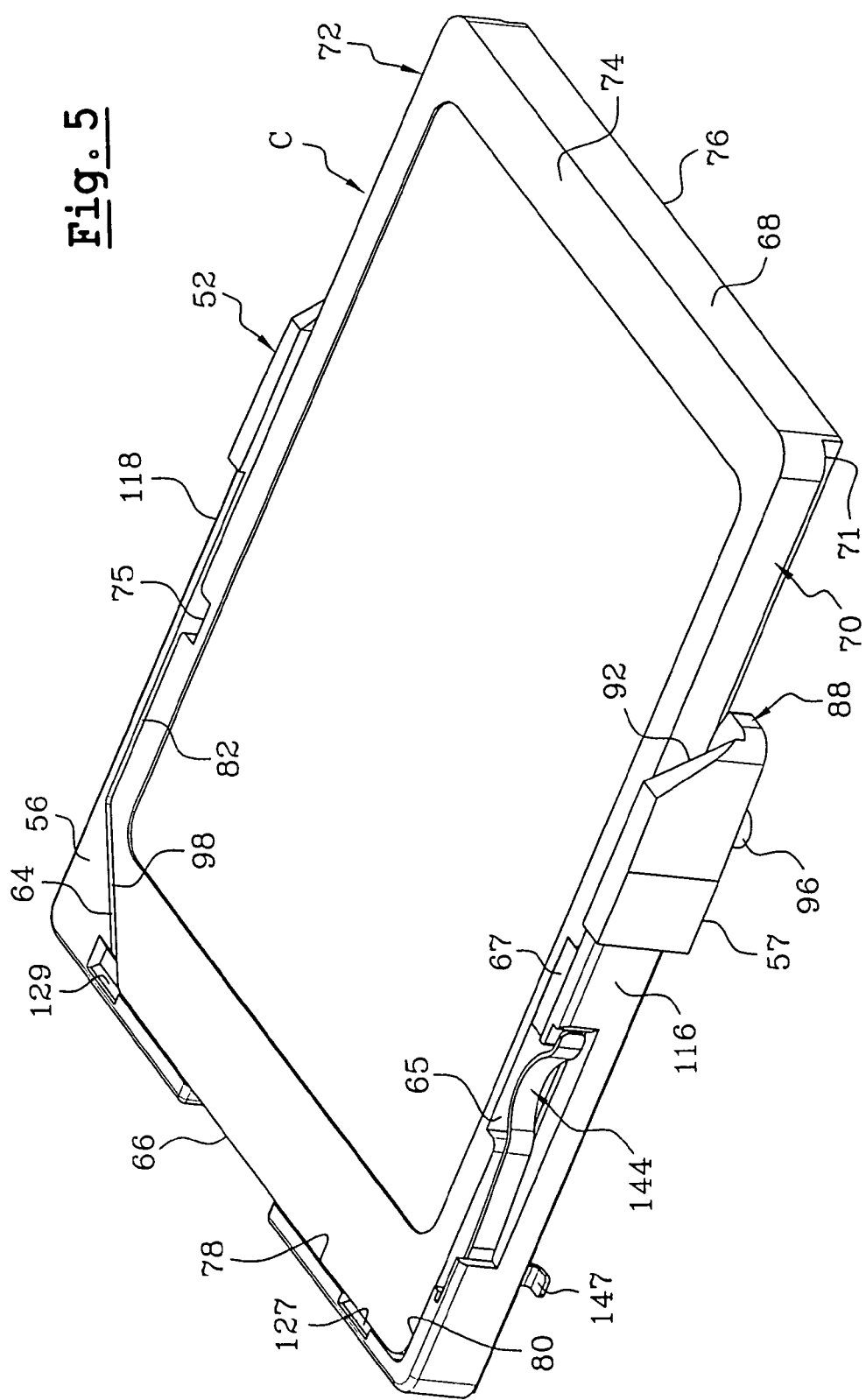
FIG. 5 is a view similar to that of FIG. 2, but without the cover.

According to an alternative form (not shown), it is possible to provide a version of the connector having arms or extensions of shorter length, this shorter length being, however, sufficient to allow the fitting of the switch 140 which will be described below. In order to fulfill the function of polarizing the position and orientation of the card C, the corner of the housing 58 corresponding to the intersection of the front transverse bottom edge 78 and the longitudinal edge 82 has a vertical face 98 inclined at 45°, which is complementary to the shape and the size of the cut corner 64, as may be seen in FIG. 5, when the card C is inserted into a correct position.

According to a technique known in the field of connectors for connecting smart cards, the insulating support 52 carries a series of electrical contact elements 100 which are made in the form of elastically deformable blades, a free contact end 102 of which projects vertically above the plane of the bottom 62 in order to engage with the conducting pads on the lower face 76 of the card C.

In the example illustrated in the figures, the resilient contact blades 100 are nine in number, six of these blades being aligned transversely near the front transverse bottom edge 78 of the housing 58 whereas three other blades, corresponding to the contact pads P3, P4 and P9 of the SD card, are longitudinally offset rearwards so that their contact ends 102 are longitudinally offset rearwards. In the case of the pad P9, the offset results from the design of the SD card, whereas the offset of the blades associated with the pads P3 and P4 is due to the "hot plug-in" connection explained above.

All the contact blades 100 are identical and each has a rear free connection end 104 in the form of a tab which terminates approximately in line with the rear transverse face 84, each tail end 104 here being designed in the form of a tab to be soldered to the surface of the upper face of the printed circuit board.

Each tab here is bent at 90° for soldering it to a track on a printed circuit board, but it may also be of the type suitable for insertion into plated-through holes.

So-called "solderless" versions may also be provided, in which the output tabs are in elastic bearing contact against the corresponding tracks on the printed circuit board. The vertical bearing is provided by the equipment which receives the connector, part of which bears on the cover 54, or else the connector is fixed to the printed circuit board by snap-fastening the earth (grounding) tabs 132, 134, (see earlier in the description) which are then, for example, designed in the shape of harpoons housed in plated-through holes in the printed circuit board.

The length bounded by the front transverse bottom edge 78 and the rear transverse face 84 is in this case approximately ¼ of the total length of the SD-type or MMC-type card C.

Figure 10:
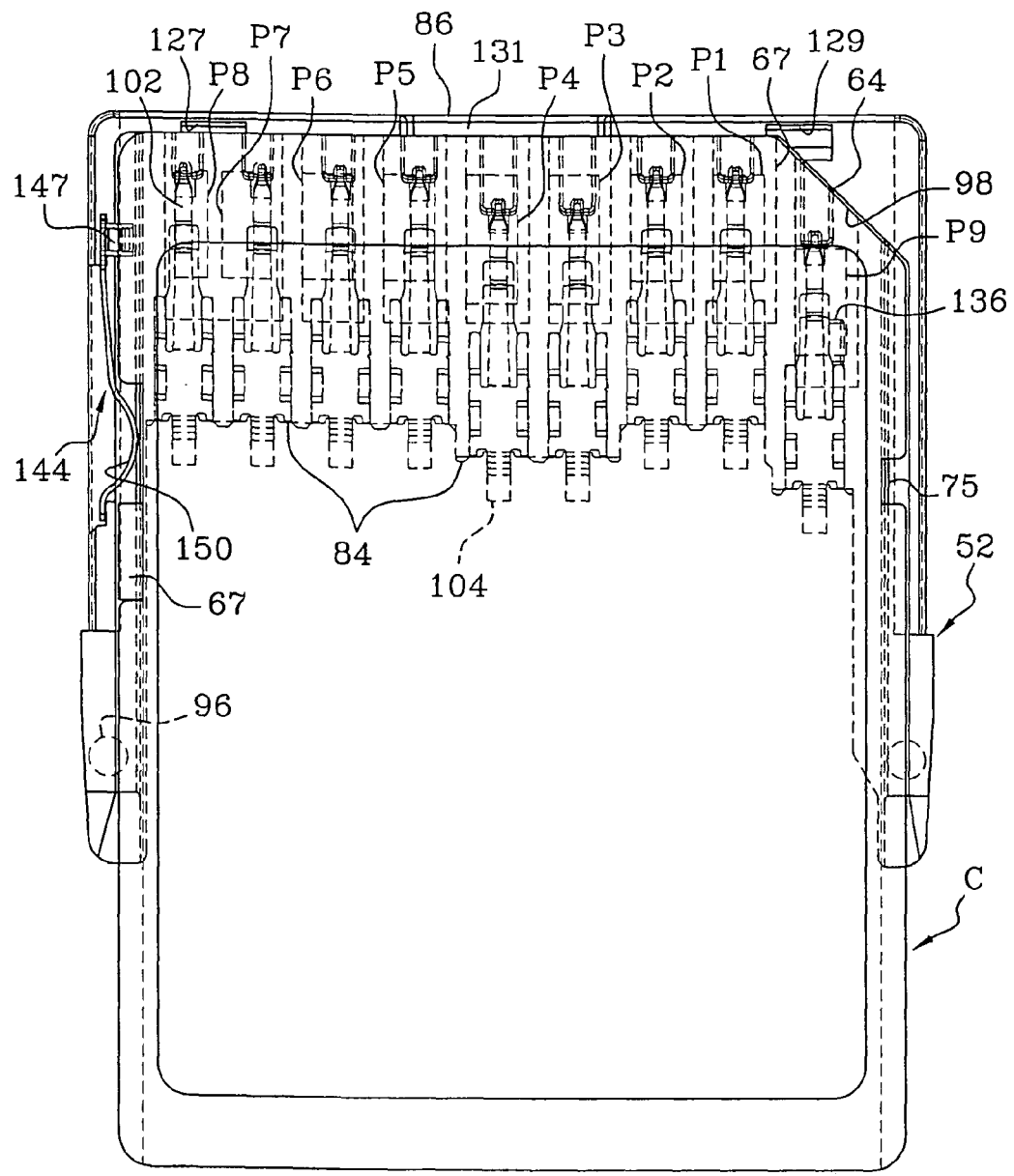
FIG. 10 is a view of the connector and card of FIG. 8, but without the cover.

Thus, as may more particularly be seen in FIG. 10, about three-quarters of the card C extends longitudinally rearwards out of the housing 58 in a cantilever fashion above the facing portion of the upper face of the printed circuit board.

Figure 11:
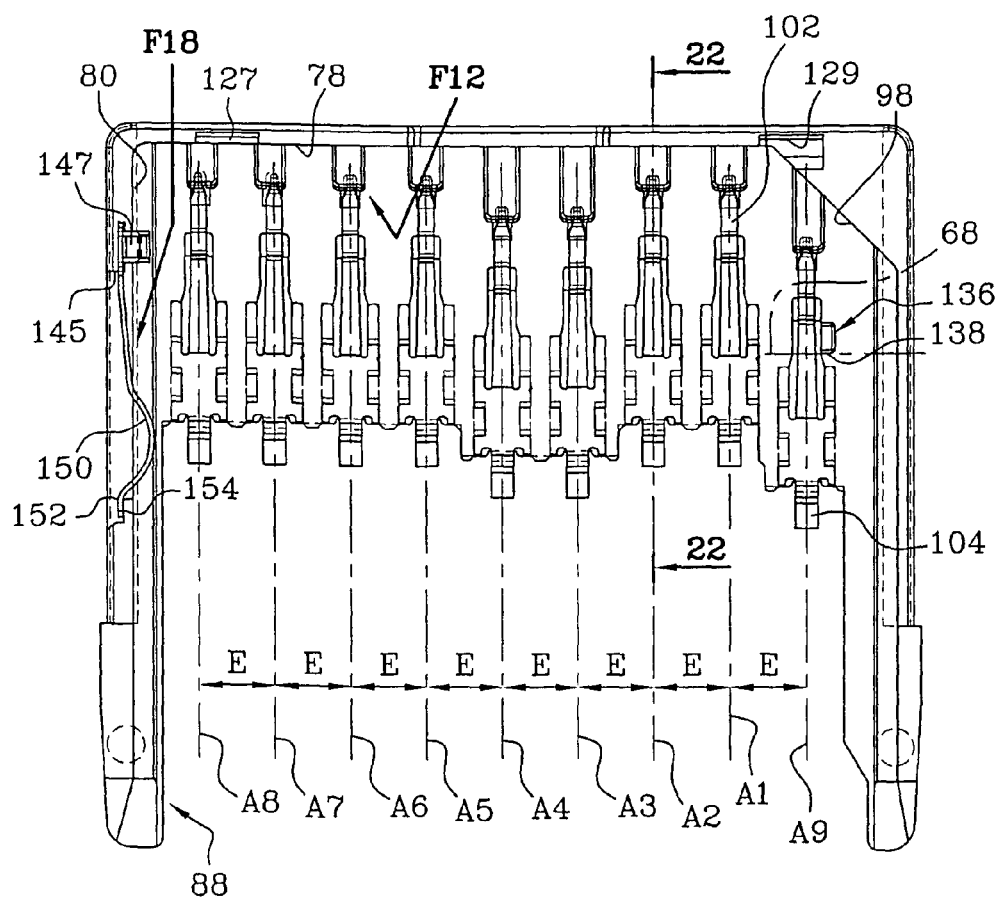
FIG. 11 is a view similar to that of FIG. 10, but without the card.

As may also be seen in FIGS. 11 and 13, the length of the upper plate 60 of the cover 54, bounded by its front transverse edge 108 and rear transverse edge 110, is roughly equal to double the length of the housing 58, whereas more than half of the total length of the card is guided and held in place by the edges 80 and 82 and the extensions 88 and 90.

The edge 110 of the metal or metallized cover 54, which is connected to the earth of the printed circuit board which carries the connector, allows the card to be electrostatically discharged at the start of its longitudinal insertion into the connector 50.

As may be seen in particular in FIGS. 14 and 15, the tails, or free connection ends 104 lie approximately below the plane of the lower plane face 57 of the insulating support 52 which here has feet 96.

According to a known general design, the metal cover 54 has, in order to mount it on the insulating support 52, two parallel and opposed lateral sides, or rims 120 and 122 which extend vertically downwards along corresponding portions 116 and 118 of the vertical and external longitudinal faces of the insulating support 52. The rims 120 and 122 are shaped in the form of slideways, that is to say they are extended horizontally under the insulating support 52 by horizontal branches 124 and 126 which are bent inwards and are received in corresponding recesses formed in the lower face 57 of the insulating support 52 so as to allow it to be mounted by longitudinal sliding and so as not to project out of the plane of the latter.

As may be seen especially in FIGS. 2, 3, 9 and 15, the rims 120 and 122 shaped in the form of a slideway with the bent-in parts 124 and 126 give an enveloping shape to the cover which completely goes around the two long arms 88 and 90 which help to guide the MMC card or the SD card as it is being inserted longitudinally into the connector in the direction of the housing 58.

This enveloping shape gives the arms 88 and 90 great robustness in all directions. This is because the design of the cover also allows it to prevent two arms from "coming closer together" in the transverse direction by means of the two rear upper corners 133 and 135 of the upper plate 60 which are housed in complementarily shaped parts 137 and 139 of the upper face of the arms 88 and 90.

The cover 54 is fitted onto the support 52 by sliding longitudinally from the front to the rear, that is to say from the left to the right when considering FIG. 1 for example. The cover 54 is immobilized in the mounted position on the insulating support 52 by means of two snap-fastening tabs 121 and 123 which are for example visible in detail in FIGS. 16 and 17. In the mounted position of the cover 54, the tabs are received in notches 127 and 129 formed for this purpose in the upper face 56 of the insulating support 52 between the transverse faces 78 and 86 (see FIG. 4). During mounting, the snap-fastening of the tabs 121 and 123 results from their engagement with the front upper edge of the insulating support beyond which they go by elastic deformation of the cover.

In order to remove or retract the cover 54 longitudinally, all that is required is for the cover 54 to be elastically deformed slightly, by raising its front transverse edge 108, by means of one's nail or an inserted tool, thanks to the notch 131 formed in the insulating support (see FIG. 4) for disengaging the tabs or lugs 121 and 123.

Near its front transverse edge 108, the cover 54 may have two front lower horizontal tabs 132 and 134 which extend from the rims 120 and 122 so that the tabs 132, 134 can be soldered, for example by reflow, to the corresponding conducting tracks on the printed circuit board. These tracks are preferably connected to the earth plane (ground) of the electrical circuit of the printed circuit board so as to electrically connect the metal cover 54 to this earth plane. The tabs 132 and 134 may be bent over towards the outside of the connector, as illustrated for example in FIGS. 1 and 13 to 17, or else bent over inwards, as illustrated in FIGS. 2 to 5, 8 and 9.

When the tabs 132 and 134 are bent over towards the outside, it is then possible to disconnect the cover 54 for the purpose of carrying out maintenance work on the electronic components which are carried by the printed circuit board and are located under the cover, by desoldering the tabs 132 and 134 from the cover, which can then be partially or completely moved away by sliding.

Mechanically fastening, by soldering, the cover 54 by its solder tabs can allow the connector 50 to be mechanically held in place at its front part without making use of any additional piece or component. In addition, this fastening of the front part balances the fastening of the rear part, provided by soldering the outputs 104.

As may especially be seen in FIG. 1, the upper plate 60 of the cover 54 has a series of holes 61 which, like the contact ends 102, are oriented upwards, allowing the equipment to be tested after the components and the connectors have been soldered, by being directly connected, by means of a test apparatus or tester, to the ends which are accessible when a card C is absent.

A transverse slot 63 allows the output tabs 104 to be soldered and the soldered joints to be checked.

If it is desired to improve the electromagnetic screening that the cover provides, it is possible to make the upper plate without any holes 61 or slot 63. In accordance with the teachings of the invention, all the contact blades 100, 102 are identical to one another and are arranged with a constant transverse pitch compatible with the position and the distribution of the conducting pads Pi on the multimedia card housed in the connector, and especially compatible with those on the SD card.

This arrangement and this compatibility are illustrated on a large scale in FIG. 8, which is a representation of a connector according to the invention with slight differences in detail of the shapes of certain components compared with the other figures.

As may be seen in this FIG. 8, and in FIGS. 10 and 11, the longitudinal mid-axes A1 to A9 of the nine contact blades 100, 102 associated respectively with each of the contact pads P1 to P9 are shown with a uniform and constant centre-to-centre spacing "E" which in this case is equal to 2.4 mm.

By means of this design, all the identical and equidistant blades 100, 102 may be treated simultaneously by means of a single tool, by longitudinal insertion, in this case from the rear forwards.

As shown in FIG. 8 or FIG. 10, each contact blade 100, 102 of axis Ai is not "centred" transversely with respect to the contact pad Pi with which it engages, but each free end of a blade is in electrical contact with a facing portion of the rectangular lower face of the corresponding contact pad Pi, by defining with the latter at least one point of contact lying substantially on the longitudinal mid-axis Ai of the contact blade.

As may be seen, it is the blades associated with the pads P6, P7 and P8 which are the least transversely "centred" and which are especially very close to the internal lateral faces opposite the corresponding intermediate partitions 67.

The particular design of each blade 100, 102 will be explained in detail below, together with its insertion and retention technology, but it should be noted here that the longitudinal position of each contact blade with respect to the insulating support 52, which is different for the blades associated with the pads P3, P4 and P9 compared with the group of furthest advanced blades associated with the contact pads P1, P2 and P5 to P8, results from the operation of mounting them by insertion, during which operation each blade butts against its housing provided for this purpose near the rear transverse edge 84.

As shown only in FIGS. 10 and 11, there is a 2.4 mm centre-to-centre spacing between the various blades and the transverse position of the group of blades with respect to the insulating support 52. With respect to the contact pads Pi, such spacing allows a depolarization stop 136 to be fitted which is molded as one piece with the insulating support and is formed as a vertical relief on the bottom 62 of the housing 58.

The stop 136 is a rectangular parallelepipedal block which, because of its short transverse width of about 0.4 mm, is housed between the right lateral edge of the blade 100, 102 associated with the pad P9 and the left internal lateral edge of the partition 67, by which edge this pad P9 is bounded transversely towards the right.

The height of the stop is around 0.6 mm so as to allow full correct insertion of the SD card as illustrated in the figures.

However, the solid stop 136 is positioned longitudinally so that, when the SD card is inserted improperly, that is to say with its transverse edge 68 inserted first, it prevents any penetration of the body of the SD card into the housing 58, the lower edge corresponding to the intersection of the transverse edge 68 with the lower face 76 then butting against the rear transverse face 138 of the stop 136, as shown schematically by the dot-dash line in FIG. 11.

In the absence of such a stop, the card would partly penetrate the cavity 58 and, before the intervention of the inclined polarizing face 98, would "crush" the free ends 102 of the two contact blades set furthest back, which are associated with the pads P3 and P4.

To prevent such crushing, another solution consists in providing holes or recesses which emerge in the insulation beneath each blade but this then generally results in the blade being bent beyond the yield point of the material and therefore results in permanent deformation of the blade. There is therefore then also a risk of the free contact ends colliding with the upper face of the printed circuit board or with electronic components located beneath the connector.

It should be noted that this risk does not exist in the case of a conventional MMC card which has a small thickness and which is in the "high" position above the steps 81 and 83 and which therefore does not crush the contact blades, even if it is improperly inserted. Polarization of the improperly inserted MMC card is achieved by the inclined surface 98.

During longitudinal insertion of the SD card into the connector to the fully installed position, that is to say with its front transverse edge 66 penetrating the connector first and with its upper face 74 oriented upwards, the plastic partition 67, which lies between the contact pad P5 and the longitudinal edge 72 and which terminates in the cut corner 64, would run the risk of butting against the rear end transverse edge 91 of the longitudinal arm 90.

To remedy this drawback and further improve the ergonomics of the connector, a cut-away 93 is provided in the inner longitudinal edge 95 of the arm 90 near its rear free end (see for example FIGS. 1 and 4) which prevents such an abutment of the partition 67 until the SD card bears in guiding contact on the steps 81 and 83.

The connector according to the invention also includes a switch 140 for detecting the longitudinal position of the SD card write protect cursor 69.

For this purpose, the switch 140 has what is called a fixed contact blade 142 incorporated into the metal or metallized cover 54 and a moving detection blade 144 carried by the insulating support 52. As will be explained below, the blade 142 is called a fixed blade in the operating principle of the switch, but it has the ability to undergo elastic deformation so as in particular to avoid a "hard spot" during insertion and/or extraction of the card making it possible to take up the dimensional tolerances on the inserted card.

Figure 16:
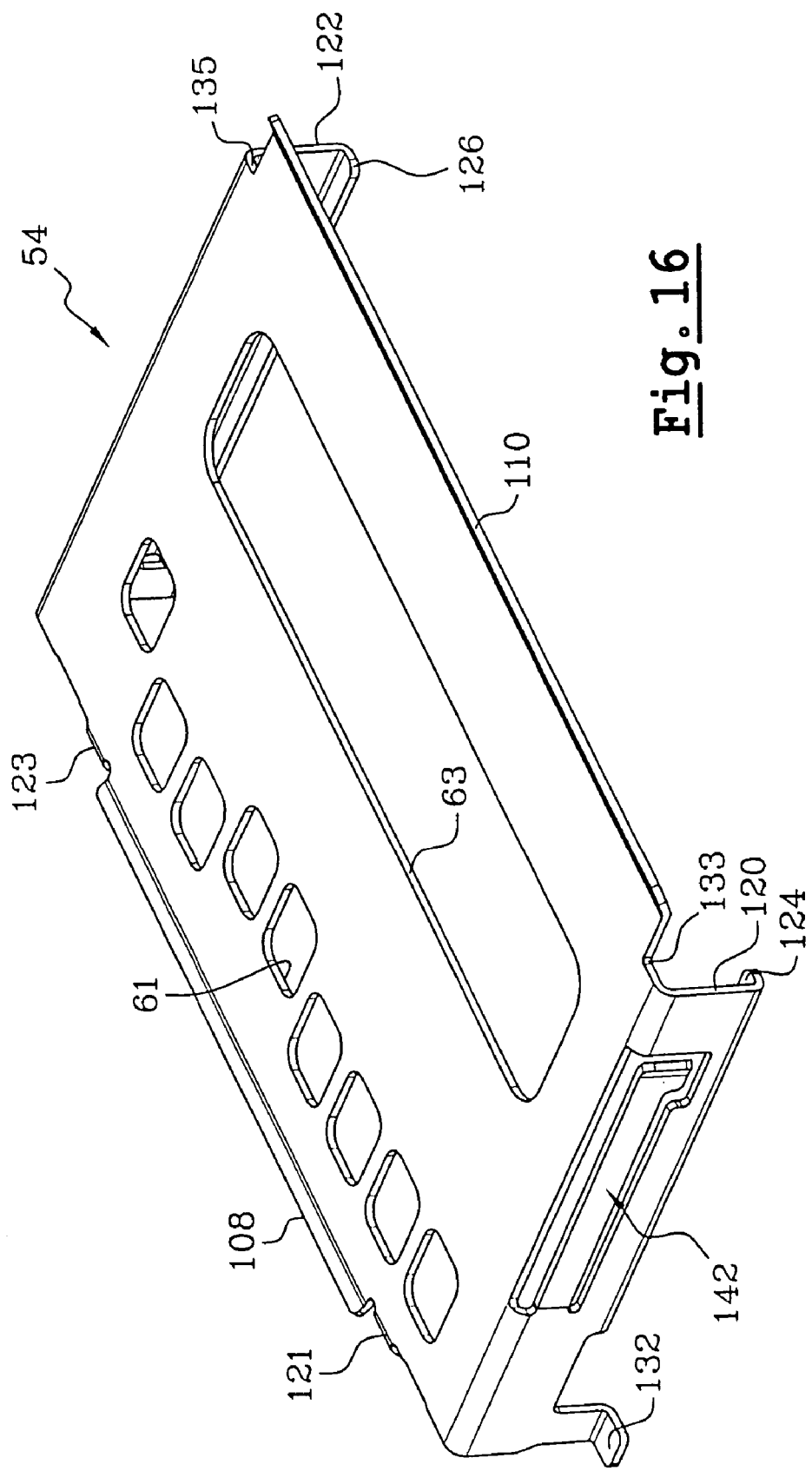
FIG. 16 is a rear and top isometric view of the cover of the connector of FIG. 1.

As may be seen especially in FIGS. 1, 16 and 17, the left lateral rim 120 of the cover 54 has a cut-out fixed blade, of longitudinal orientation, which is slightly deformed transversely outwards. By being part of the cover 54, the fixed blade 142 of the switch 140 is connected to the electrical earth, as is the cover 54, by its soldered tabs 132 and 134. In addition, this blade 142 is "free", that is to say it is made as one piece with the cover.

The moving blade 144 has a longitudinal overall orientation and includes a front foot 146 for fitting and for connection, which extends vertically downwards, being housed in a complementary hole formed for this purpose in the insulating support 52 near the lateral edge 80. The foot 146 has a connection tab 147 intended to be soldered to or inserted into a hole in contact with a conducting track associated with the printed circuit board.

Beyond the set-in foot 146, the moving blade is extended longitudinally rearwards by an elastically deformable branch 148 which terminates in a curved detection portion 150 with its convex side facing inwards in the direction of the left longitudinal edge 70 of the SD card (see FIGS. 19 and 20).

Beyond the curved portion 150, the moving blade 144 has a contact tab 152 which is capable of coming into electrical contact with the facing internal surface portion 143 of the fixed contact blade 142.

At rest and as illustrated in FIG. 19, the position of the detection blade 144 is determined by a slight elastic prestress by means of which the tab 152 bears against a fixed surface 154 of the insulating support 52.

In this rest position corresponding to the rear position of the protection cursor 67, the switch is in its normal "open" state, whereas it is closed when the cursor 67 is in the forward position as may be seen in FIG. 20.

In order to ensure the change of state of the detection switch 140 whatever the manufacturing and positioning tolerances, the dimensions and the positions of the two blades—the fixed blade 142 and the moving blade 144—are such that the fixed blade 142 is slightly deformed elastically outwards by the contact tab 152 when the switch is-in the closed, working position, as may be seen in FIG. 20.

As may be seen especially in FIGS. 4, 10 and 11, the moving blade 144 is placed in a cut-out 145 in the left longitudinal edge 80, 88. Thus, the widths of the two lateral, transversely opposed parts of the insulating support 52 are identical and the switch 140 can be fitted without the minimal and the small width of the connector being increased. This minimal transverse width results from the dimensions of the card and from the minimal structural amount of plastic needed to guide the card.

If a blade is fitted symmetrically along the right edge of the insulating support, it is possible to produce in the same way a switch for detecting the insertion of a card into the connector.

Figure 21:
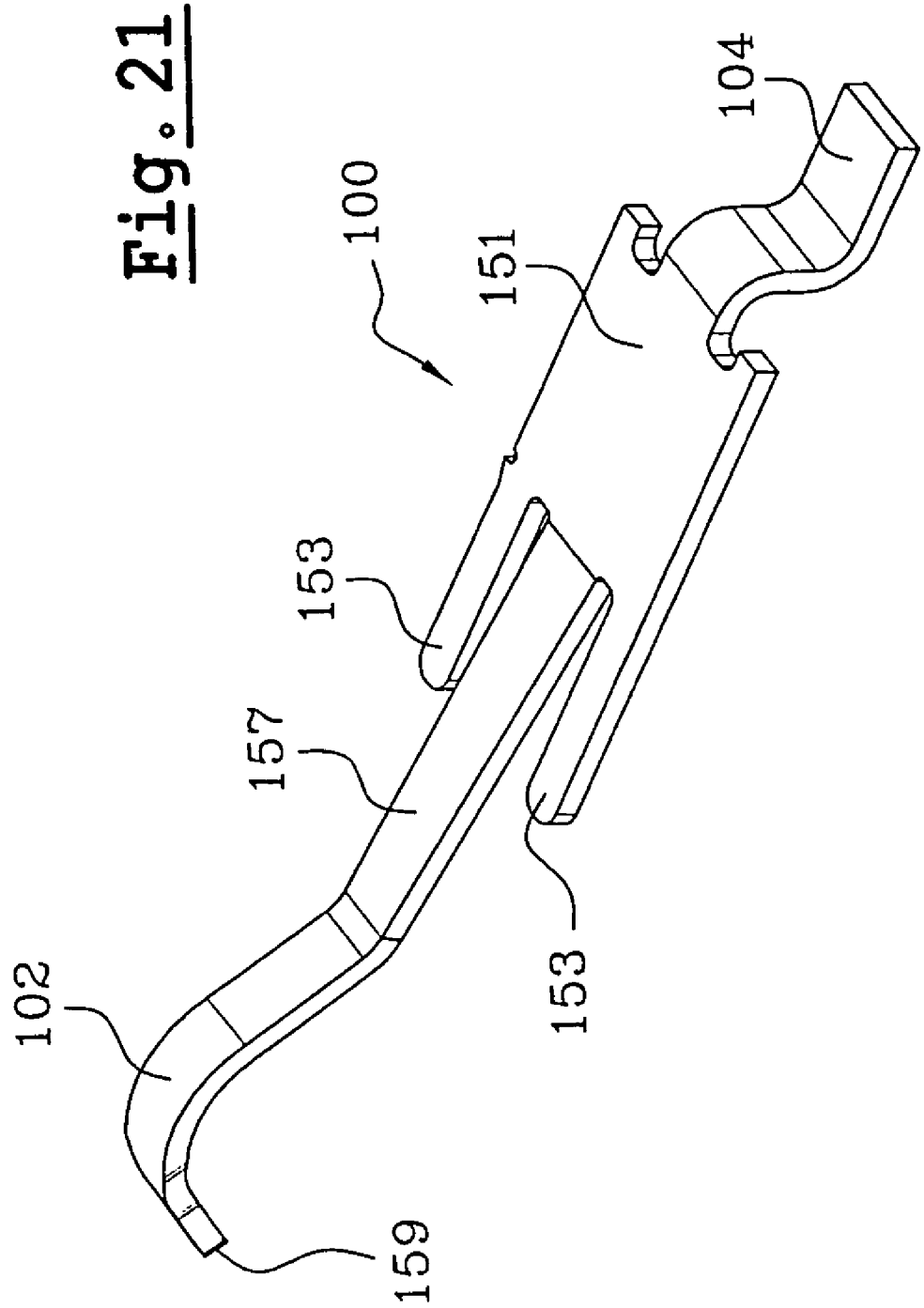
FIG. 21 is an isometric view of one of the nine identical contact blades of the connector of FIG. 1.

The general design of each contact blade, one of which is illustrated in FIG. 21, is of known type. In particular, it has a mounting or fitting section 151 which lies in a horizontal plane and is extended towards the front by two insertion tabs 153, which also have a stabilizing function. Each tab 153 is designed, in a known manner, to be inserted longitudinally forwards into a complementary slot 155 which is open towards the rear in the rear transverse edge 84 of the insulating support 52.

Beyond the mounting section 151, and between the two insertion tabs 153, each blade 100 has an upwardly inclined intermediate section 153 which constitutes the elastically flexing body of the blade and which is itself extended by a free contact end portion 102 which is curved with its convex side oriented upwards.

In order to allow connection with all the contact pads Pi, as was explained above, the width of each contact section 102 is small and equal to 0.5 mm. In order to mount each blade 100, 151, 153 and to allow it to undergo elastic deformation vertically downwards, the upper face of the bottom 62 has throughout a groove 158 which is itself bounded by a blind bottom 160.

In line with the end edge, or free end 159 of the contact section 102, the insulating support has a "box" 162 (FIG. 4) formed as a relief with respect to the cavity bottom 62. Each box is longitudinally open towards the rear in order to allow the edge 159 to be freely inserted therein during insertion of the contact blade into position in the insulating support 52 (see FIG. 12). The internal upper face 164 of the box 162 is chamfered in order to make insertion easier during mounting.

In the mounted position and at rest, as may be seen in FIG. 22, the blade is slightly prestressed elastically with the upper face of the contact section bearing vertically upwards against the chamfer 164, so as to define a precise height of the contact section 102 projecting above the bottom 62.

The bottom of the box is open vertically downwards in line with the end edge 159 so that the latter can be inserted thereinto when the contact blade is flexed, as may be seen in FIGS. 23 and 24.

Figure 25:
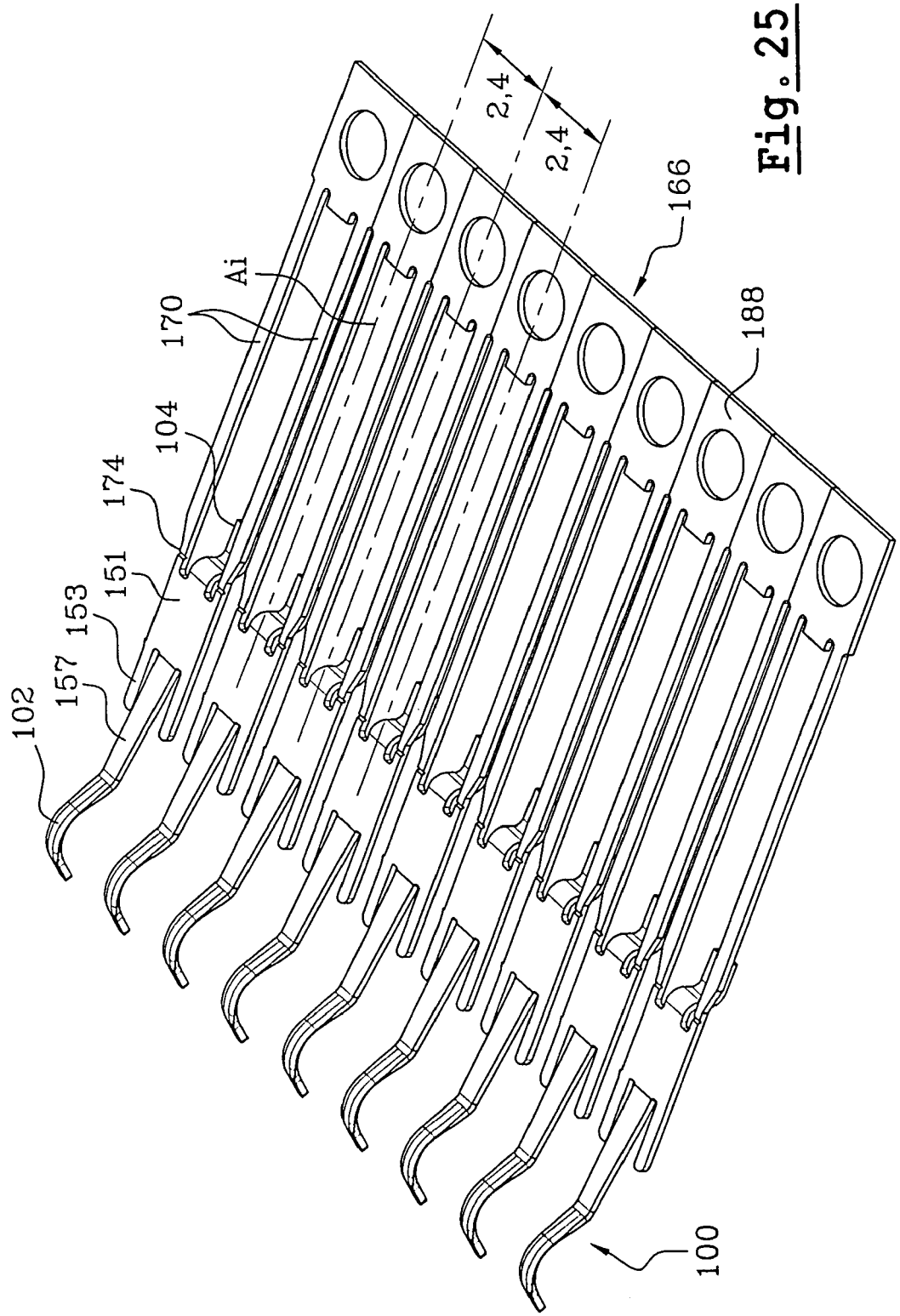
FIG. 25 illustrates a row of contact blades in its process of manufacture.

FIG. 25 shows a portion of a strip 166 of contact blades 100 of the type of those used for the manufacture of connectors according to the invention. The blades are manufactured in a known manner by successive cutting, folding and/or bowing, and coating, steps starting from a thin strip 166 of metallic material. After the various manufacturing steps, all the blades thus belong to the same strip 166 and are joined together by a linking band or border 188, each via a pair of long longitudinal straps 170 of small transverse width.

The ends 172 of the straps 170 are joined to the rear part (to the right when considering FIG. 25) of the mounting section 51, each with a fracture initiator 174. Thus, a continuous series of contact strips is used which, in the case of the present invention, are inserted longitudinally in groups of nine contact blades into an insulating support 52, without having to separate each of the blades beforehand, that is to say all the blades inserted into the same insulating support for the manufacture of a connector belong to the same batch and are homogeneous from the standpoint of their dimensional characteristics so as to ensure that there is no lack of coplanarity of the output or connection tabs 104.

During insertion, and taking into account the different longitudinal positions of the nine blades, the linking straps 170 (FIG. 25) for the blades associated with the pads P9, and then P3 and P4, deform by buckling so as to allow all the blades to be fully inserted in forward abutment by means of an automatic insertion tool (not shown) before the blades 100 are separated from their straps 170.

The separating operation is carried out by fracturing the initiators 174 by performing alternating bending operations on the straps.

Thus it is certain that all the blades are homogeneous within the meaning of the invention, as they all come from one strip of material and have been formed by the same cutting tool, with no modification to the settings of this tool.

It should be noted that the embodiment of a connector according to the invention that has just been described, in which the contact blades 100 are inserted from the rear, with their outputs or connection tabs 104 oriented rearwards, has the advantage of minimizing the footprint of the connector 50 on the printed circuit board, especially by optimizing the total length between the transverse stop face 78 for the card and the front transverse face 86 of the connector.

The invention is not limited to the basic embodiment that has just been described.

It is also possible to incorporate into the connector means for simultaneously connecting a MICROSIM card in a manner similar to that described in document WO-A-00/17806.

Two embodiments of such a double connector type are illustrated in FIGS. 26 to 31.

Figure 27:
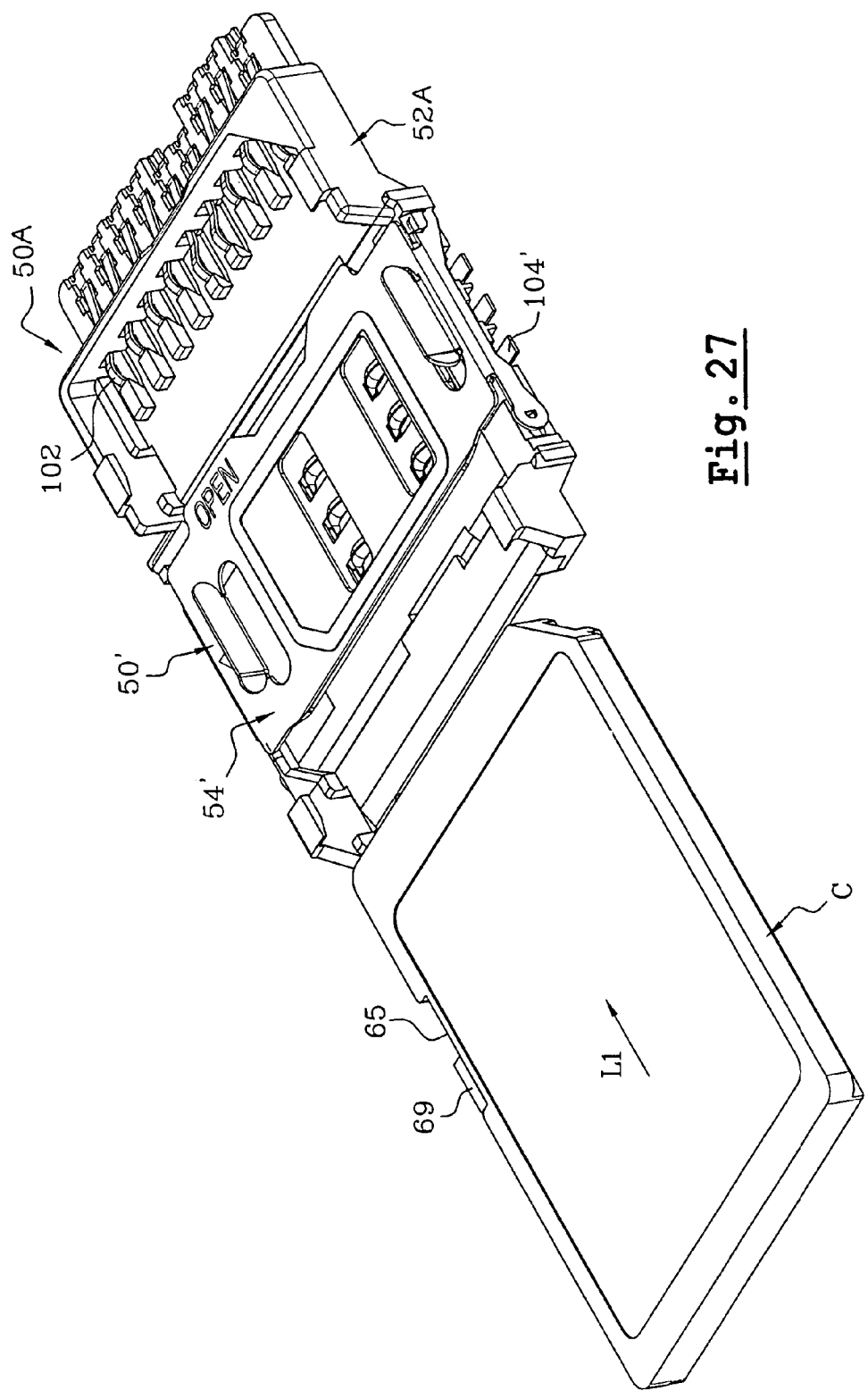
FIG. 27 is a top and right side isometric view of the connector of FIG. 26, and shows an SD card at the beginning of its insertion into one of the connector parts.
Figure 28:
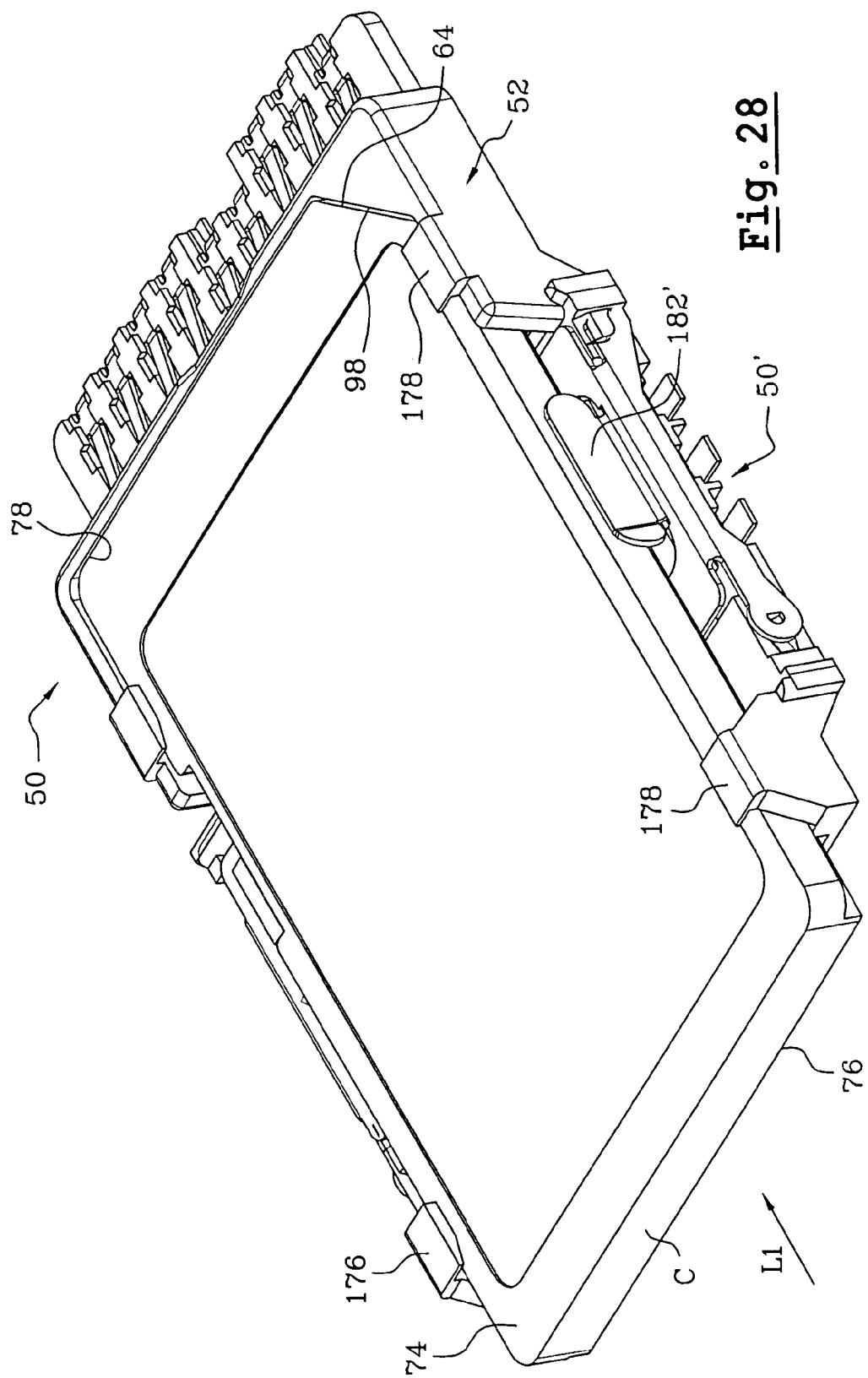
FIG. 28 is a view similar to that of FIG. 27, but showing the SD card fully inserted.

In the first embodiment illustrated in FIGS. 26 to 29, the MICROSIM card is designed to be housed in a second connector part 50' which is placed "upwards" when considering FIGS. 26 to 28, that is to say like the main connector 50A for the SD card, the connector part or connector 50' and the connector 50A sharing the insulating support 52A whose rear part 52' is modified and lowered with respect to the horizontal plane of the bottom 62 in order to constitute a cavity 58' which is designed to take a MICROSIM card and in which contact blades 102' are arranged, the connection outputs 104' of which are oriented transversely on either side (to the left and to the right) of the common insulating support 52A, 52', a lower part of which constitutes the insulating support 52' for the connector 50', as may be seen especially in FIG. 29.

The connector 50' has its own hinged closure cover 54', the design of which is described and illustrated in WO-A-01/61790.

When the cover 54' is in the closed position, as illustrated in the figures, the plane of the upper face of the cover 54' is offset vertically downwards with respect to the plane of the bottom 62 of the cavity 58 for the connector 50A which is completed, in order to guide the SD card, by a rear end part.

In this case the connector 50A illustrated in FIGS. 26 to 29 does not have a cover 54 as previously, and the vertically upward retention of the SD card and its guiding, during its longitudinal insertion, are provided by horizontally oriented upper guiding tabs 176 and 178 molded with the insulating body, or support 52A.

To make it easier to insert the SD card, it may also be seen that the cover 54' of the connector 50' has two vertically oriented lateral guiding tabs 180' and 182' which, made as one piece with the cover 54', are produced by cutting and bending.

In so far as that part of the main connector 50A for the SD card which is located to the rear of the contact ends 102 of the blades 100 (that is to say that part located to the right when considering FIG. 26) is "occupied" by the connector 50', the contact blades 100 are, of course, mounted longitudinally the opposite way round compared with the embodiment of a single connector described above with reference to FIGS. 1 to 25.

Thus, the blades are inserted longitudinally from the front rearwards, that is to say in the direction L2 indicated in FIGS. 26 and 29.

The orientation of the boxes 162 is, of course, also reversed and the vertically oriented transverse bottom wall 78, by which the housing 58 is bounded longitudinally at the front, has holes 184 for allowing the contact ends 102 of the blades 100 to pass through it as they are being mounted by longitudinal insertion in the direction L2.

Figure 30:
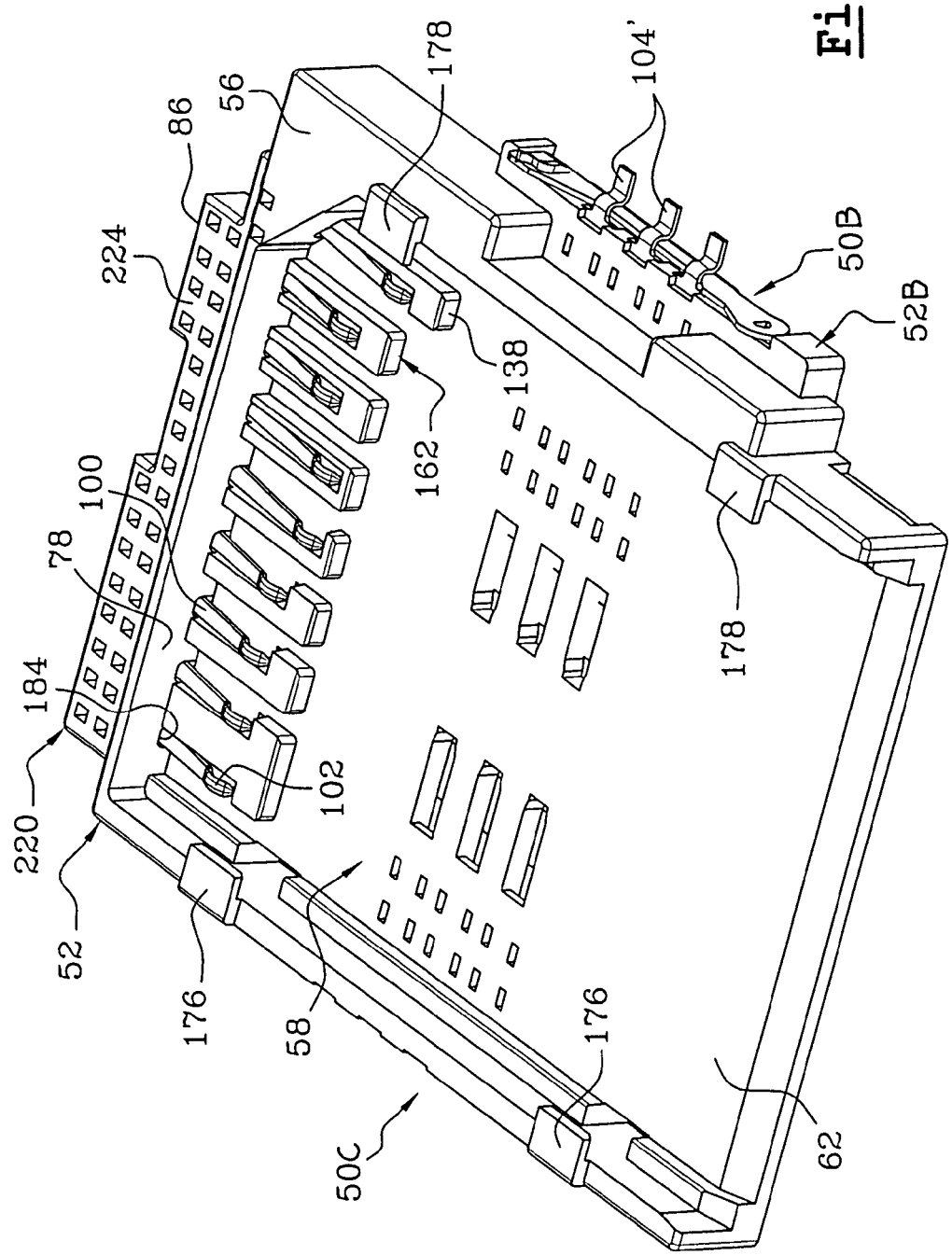
FIG. 30 is a top, right side and rear isometric view of a double connector of another embodiment of the invention, for connecting to both a MICROSIM card and an SD card.
Figure 31:
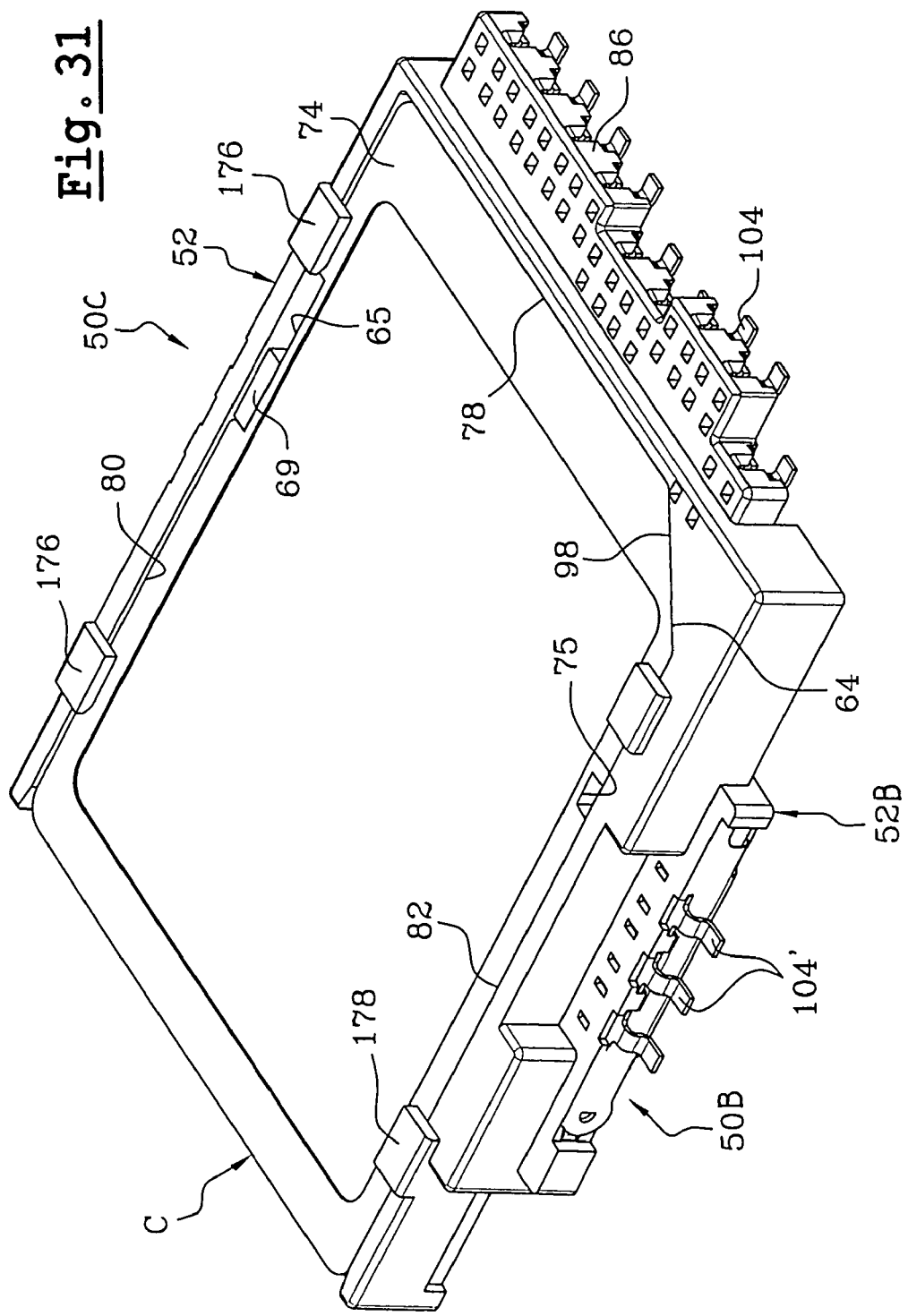
FIG. 31 is a top, front, and right side view of the connector of FIG. 30, with an SD card fully installed thereon.
Figure 32:
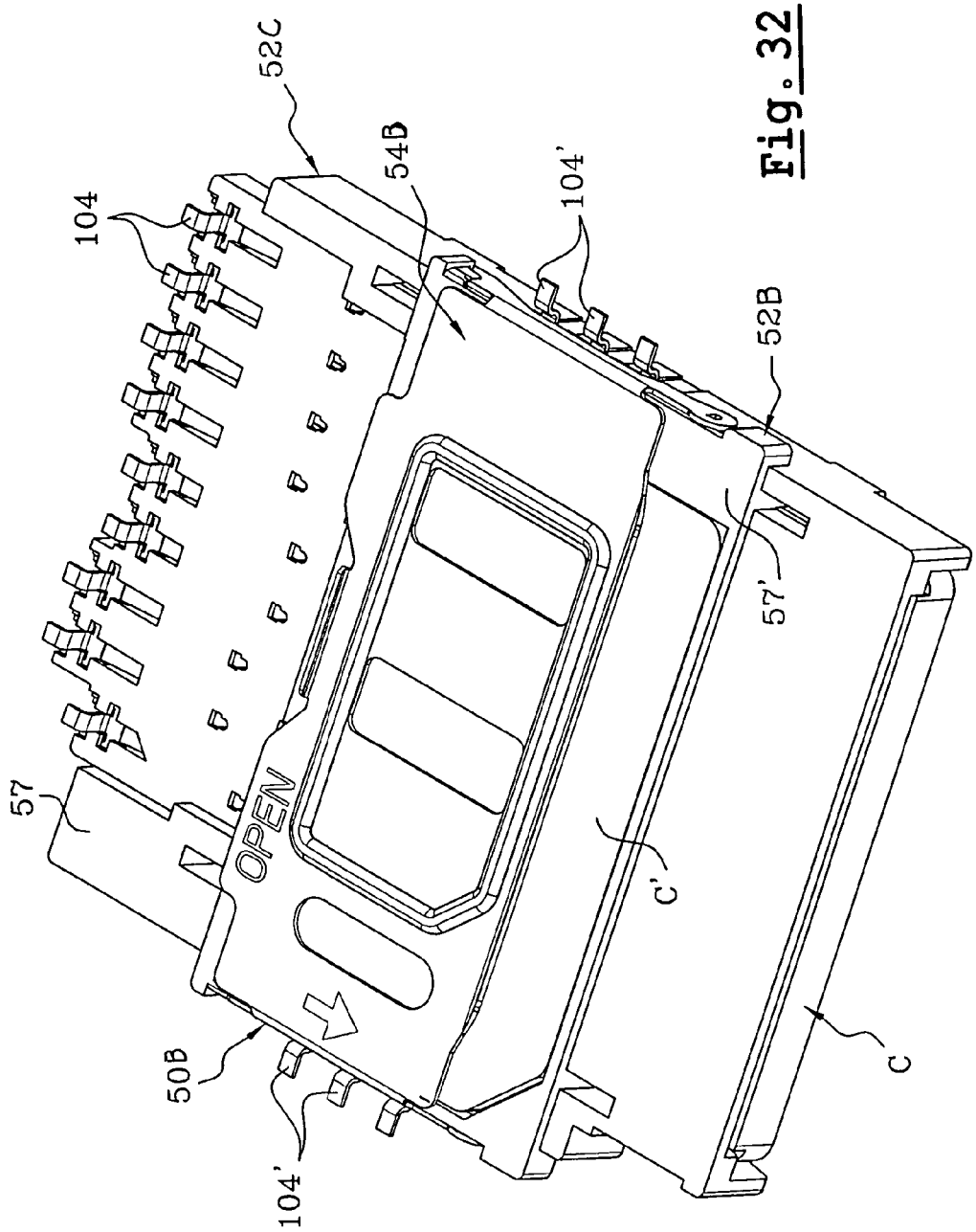
FIG. 32 is a bottom isometric view of the connector of FIG. 30.
Figure 33:
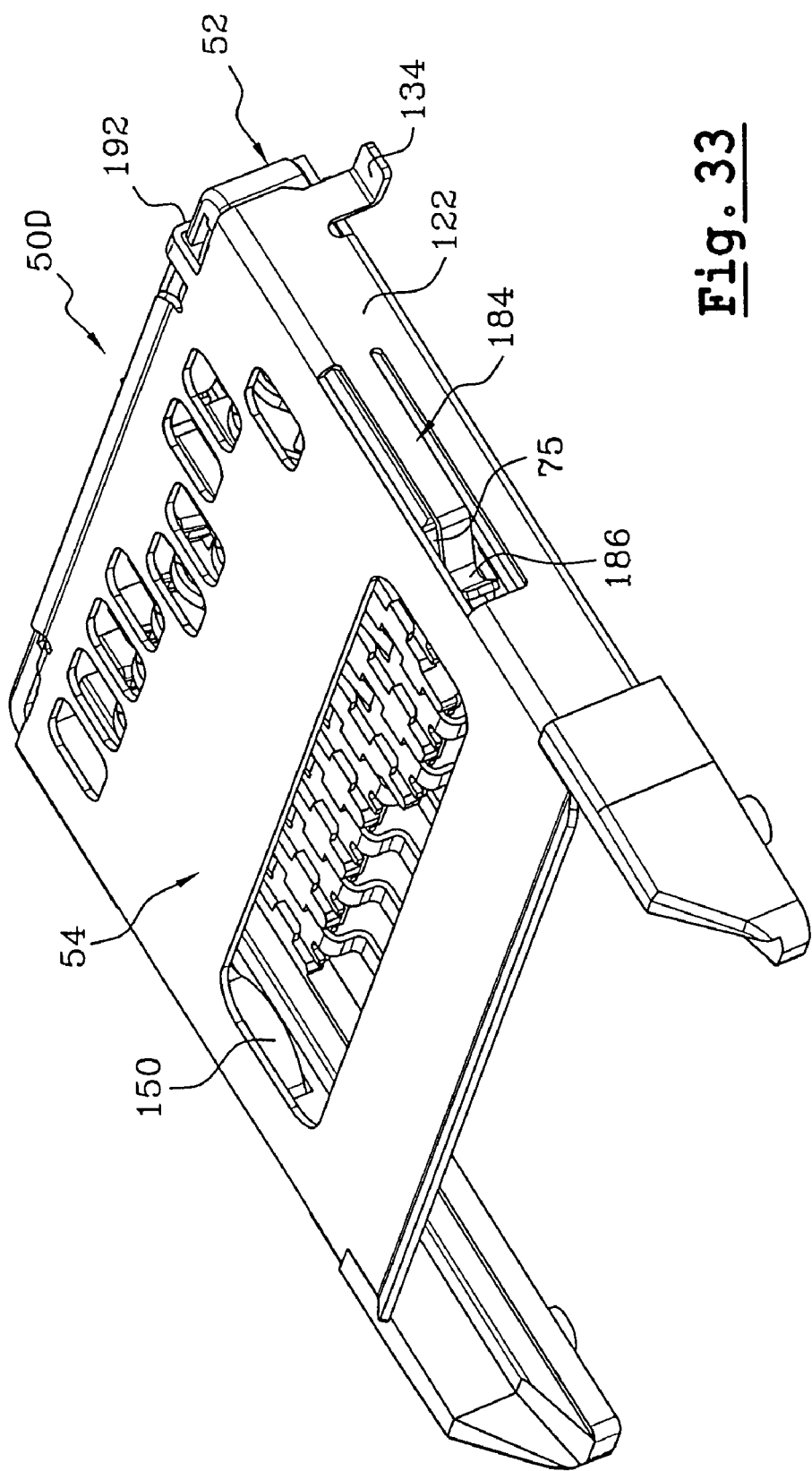
Figure 34:
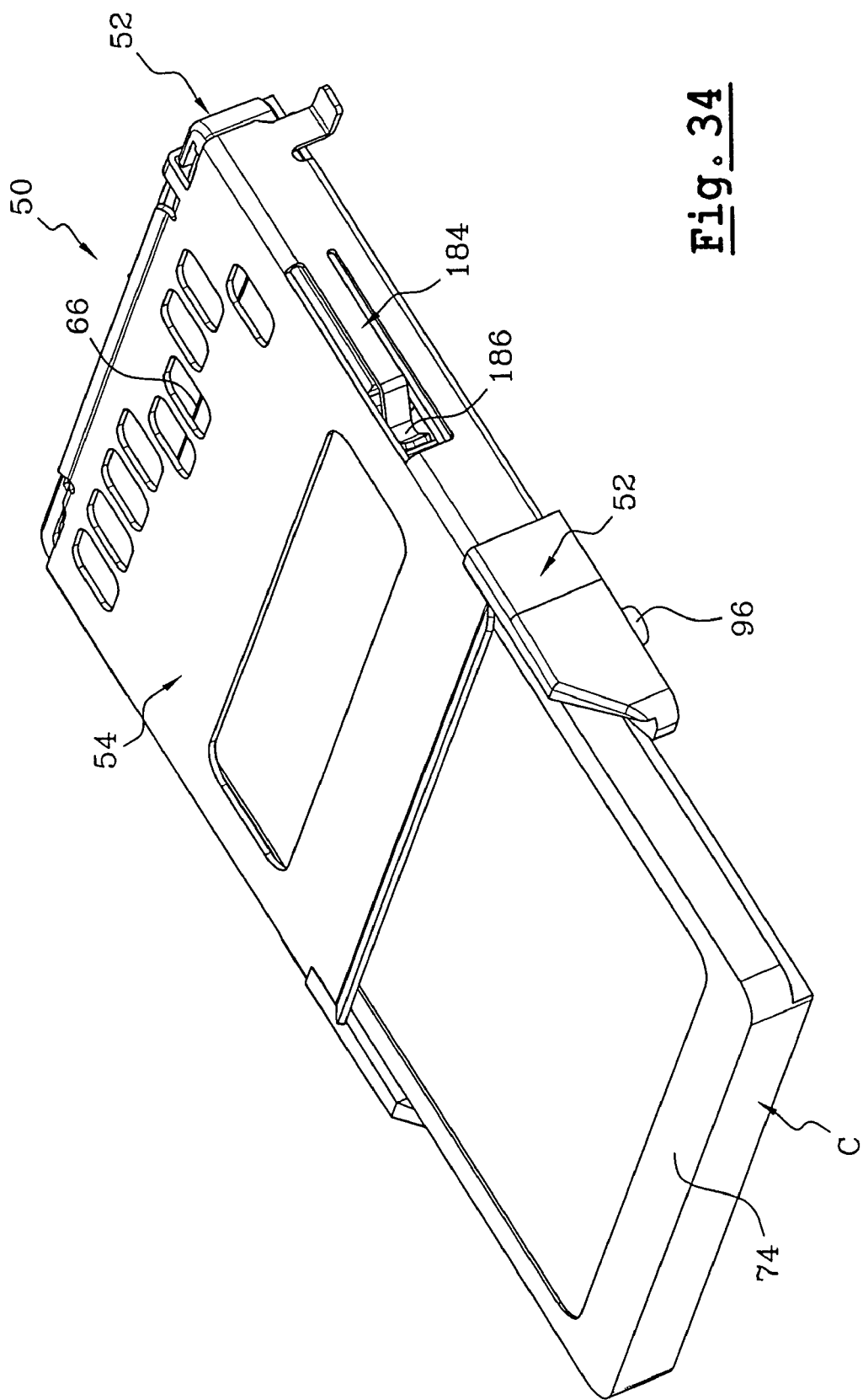

In the second embodiment of a double connector illustrated in FIGS. 30 to 32, the connector 50B for the MICRO-SIM card is located below the lower face 57 of the insulating body 52 of the connector 50C which takes the SD card and which is itself located in the upper part, as in the previous examples.

In this embodiment, the contact blades 100 of the connector 50C which takes the SD card are of the type inserted from the front, with the advantages which result therefrom and which will be described below. Among these advantages, there is the small overall height of the insulating support 52C of 2.5 mm between the faces 56 and 57.

The insulating part which projects below the plane of the face 57 in order to constitute the support 52B of the connector 50C projects by about 0.7 mm from this plane, that is to say the distance separating the faces 57 and 57' is around 0.7 mm. The projecting part 52C may also be fitted into a window or cut-out in the printed circuit board which carries the connector 50B. It is not necessary to provide a cover 54B if it is desired to reduce the total height of the connector further.

With regard to the connector 50C, the tabs 176 and 178 may also be fitted into complementary holes in another printed circuit board without therefore increasing the total height of the assembly, the double connector 50B and 50C then being sandwiched between the opposing faces of the two printed circuit boards which are separated by 2.5 mm.

According to another embodiment, it is also possible to replace the tabs 176 and 178 with a metal cover whose thickness is around 0.2 mm, i.e. less than the thickness of the molded tabs 176 and 178 which is around 0.4 mm.

The embodiment illustrated in FIGS. 33 to 40 is an alternative version of the first embodiment according to the invention illustrated in FIGS. 1 to 20, which firstly has a blade for retaining or locking the SD card in the longitudinal position, which blade is designed to engage with the notch 75 in the card.

The locking blade 184 is advantageously made as one piece with the cover 54, said blade being formed in its lateral rim or wall 122, in the same way as the fixed blade 142 of the switch 140.

The blade 184 extends longitudinally rearwards and has a V-shaped catch 186 at its free end, the tip of the V of which is oriented transversely towards the inside of the connector, facing the right longitudinal edge 72 of the SD card which has the notch 75.

Figure 37:
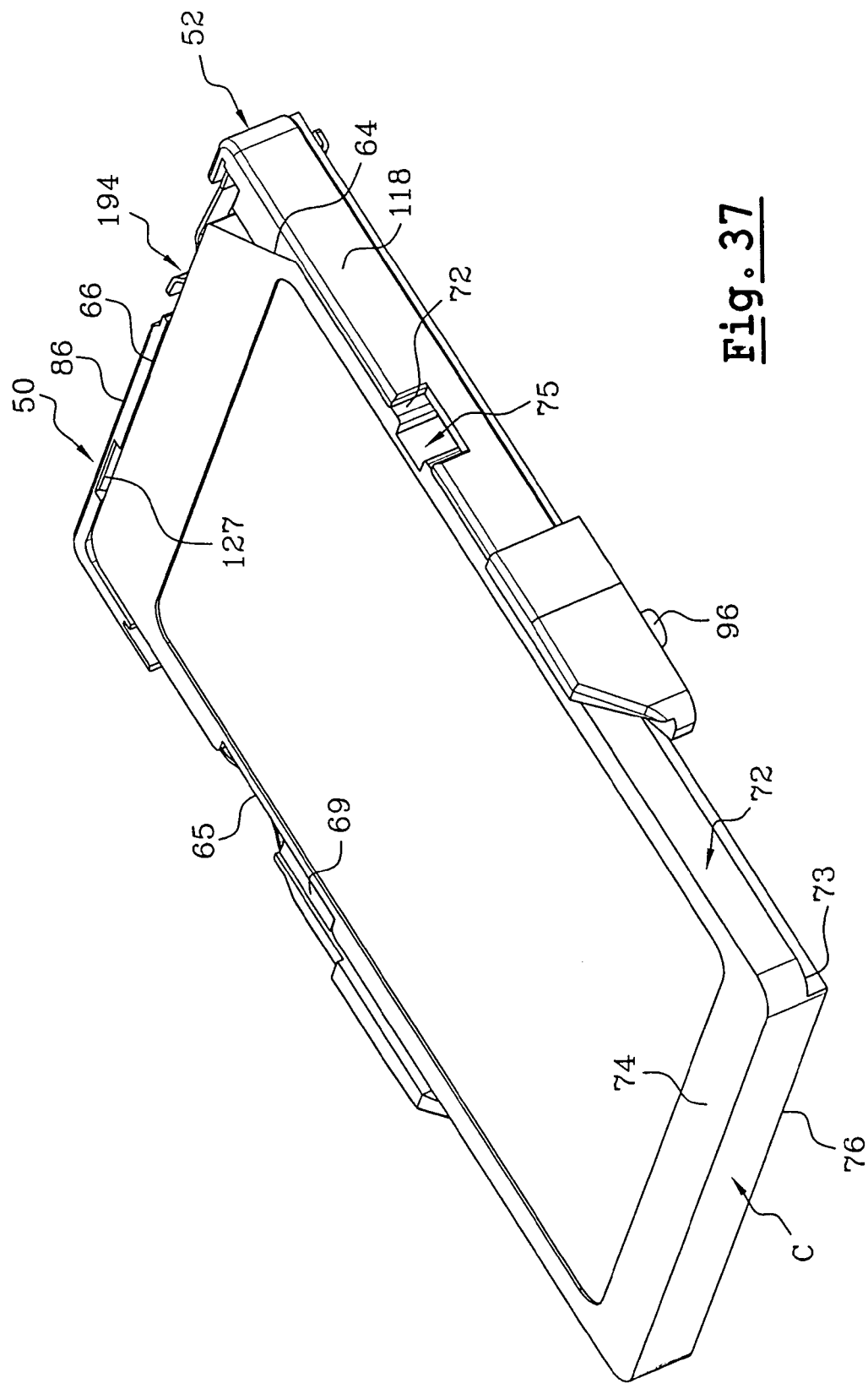
Figure 38:
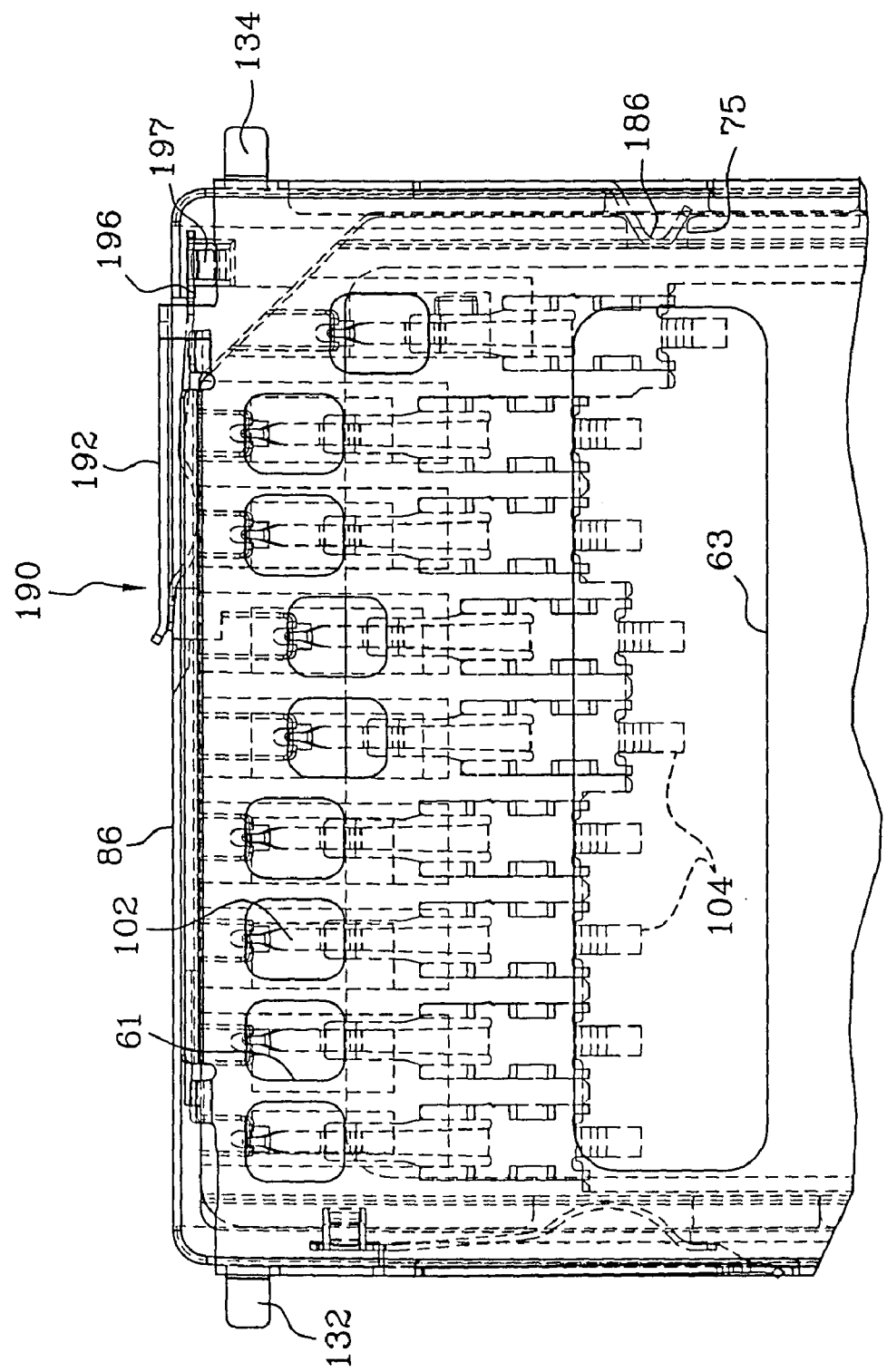

At rest, that is to say in the absence of a card, the catch 186 lies inside the connector, thanks to the notch 188 formed in the insulating support (see FIG. 35), this notch being positioned longitudinally so as to lie to the right of the notch 75 in the SD card when the latter is in the contact position, as may be seen in FIG. 37. When the SD card is in the contact position in the connector 50D, the catch 186 is caught in the notch 75 (see FIG. 38).

During insertion of the SD card into the connector, the catch 186 automatically snaps into the notch 75.

The V-shaped part of the catch 186 engages with the cut corner 64 of the SD card, which allows the catch 186 to be progressively moved aside by a low resistance force applied by the blade 184.

During extraction of the SD card longitudinally rearwards, the force to release the catch 186 from the notch 75 is higher since the Y-shaped part then engages with a right-angled edge of the notch 75.

Of course, a choice of angles of the branches of the V-notch 186 makes it possible to "adjust" by design the value of the force to release the catch 186.

When an MMC card has been inserted into the connector, the blade 184 with its catch 186 is moved aside transversely towards the outside in the same way as in the case when an SD card is inserted, and the catch 186 then engages with the right longitudinal edge 72 of the MMC card, without a notch, against which it remains elastically prestressed by the blade 184, thus constituting a card friction brake.

Of course, in this configuration it is not possible to produce a switch for detecting the presence of a card in the contact position in the connector by producing one of the blades of the switch by cutting it out from the wall 122 of the cover 54, as mentioned previously.

The embodiment illustrated in FIGS. 33 to 40 thus provides a switch 190 for detecting the end of insertion and the presence of a card MMC or SD, in the contact position near the front longitudinal end of the connector.

Figure 39:
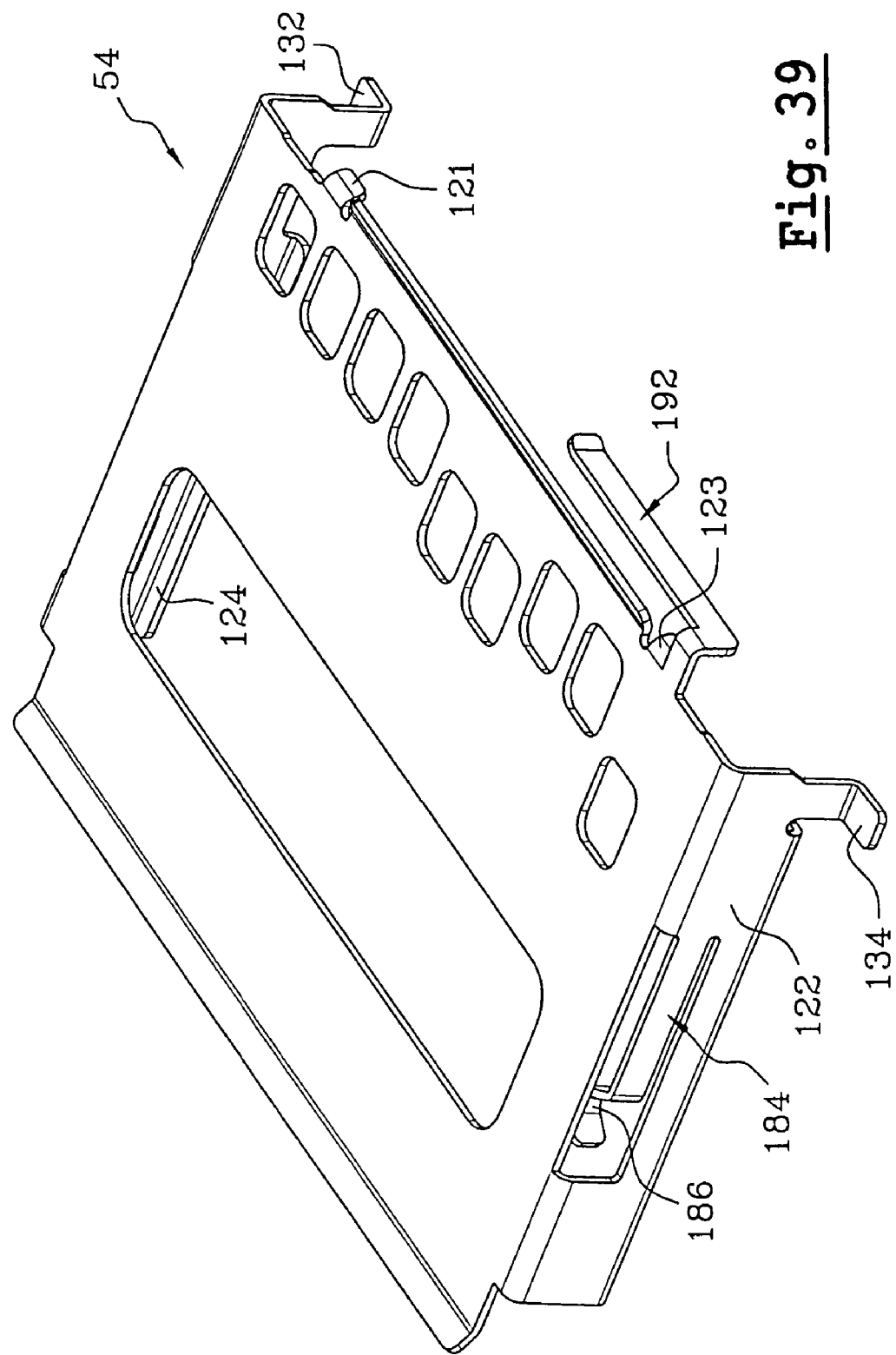
Figure 40:
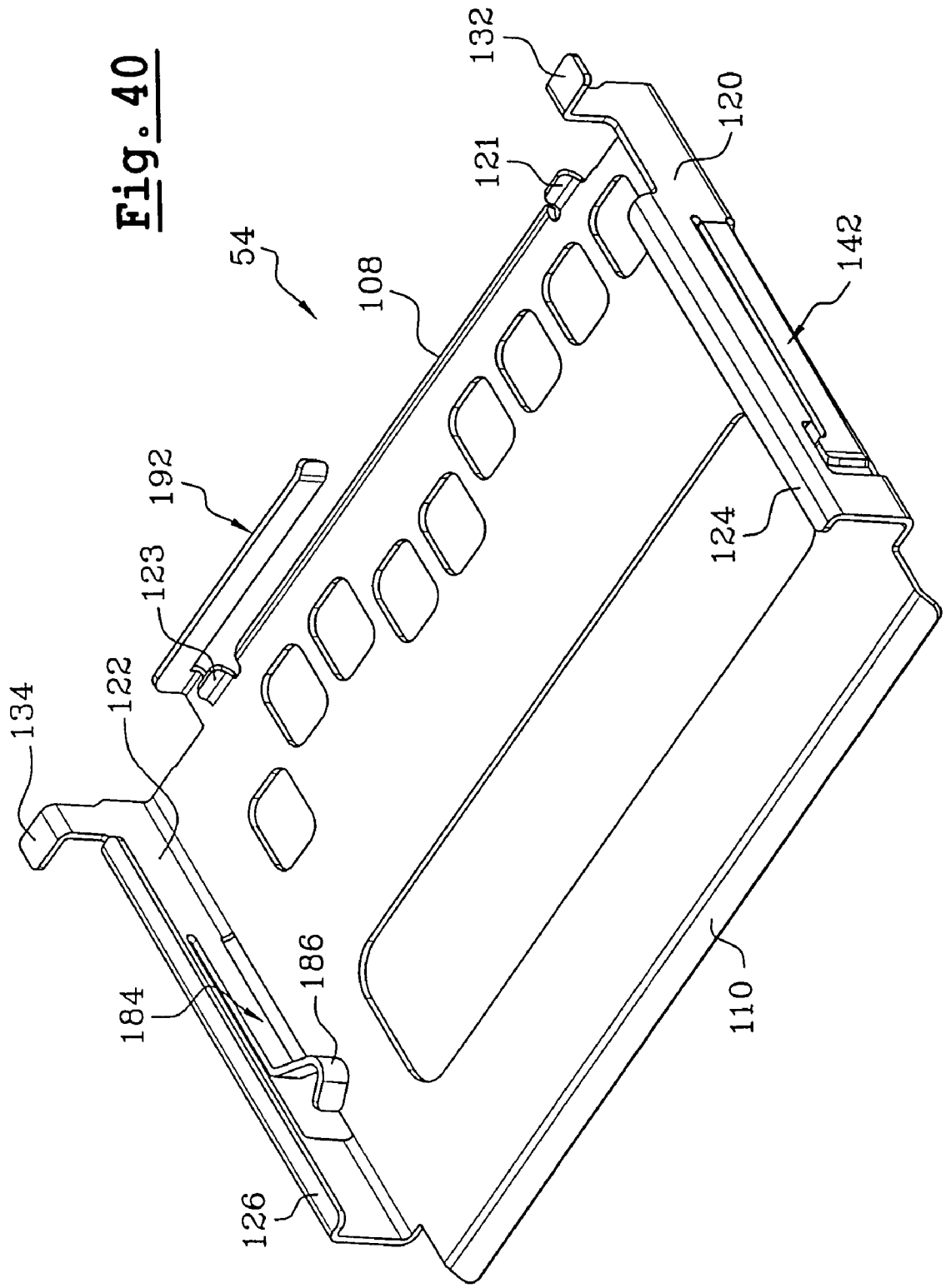

The switch 190 has a "fixed" blade 192, similar to the blade 142 of the switch 140, which, being made as one piece with the cover 54, is formed by cutting and bending, and which is visible in detail especially in FIGS. 39 and 40.

The blade 192 thus, lies in a transverse vertical plane facing a cut-out 195 formed in the front transverse wall of the insulating support 52 so as to lie facing a moving blade 194 of the switch 190, which is of similar design to the moving blade 144 of the switch 140 and which has, in particular, a connection foot 196, 197, a convex actuating portion 200 and a free end contact tab 202.

In this embodiment, the metal or metallized cover 54 constitutes a common connection, with the earth tracks on the printed circuit board, for the switches 140 and 190 via its "fixed" blades 142 and 192.

As may be seen in detail in FIG. 36, the bearing face 204, against which the contact tab 202 is pressed elastically when the switch is at rest, is advantageously made in a box 162 so that this face 204 lies below the SD card, or the MMC card, thus making it possible to reduce the overshoot of the switch when the card C is in the working position or contact position.

A first embodiment of a single connector, similar to that described and illustrated in FIGS. 1 to 15, will now be described and illustrated in FIGS. 41 to 51, in which embodiment the contact blades 100 are inserted longitudinally rearwards in the direction L2 in FIG. 44, with their connection tabs or outputs 104 oriented towards the front.

This version of the connector 50E with the tails, or outputs 104 oriented towards the front has the advantage of reducing the total thickness of the connector, if one compares it with the version with the outputs oriented towards the rear. Here, the connector is in a first configuration in which, as previously, the contact pads Pi on the card C are directed towards the printed circuit board, that is to say with the housing 58 open upwards.

Figure 52:
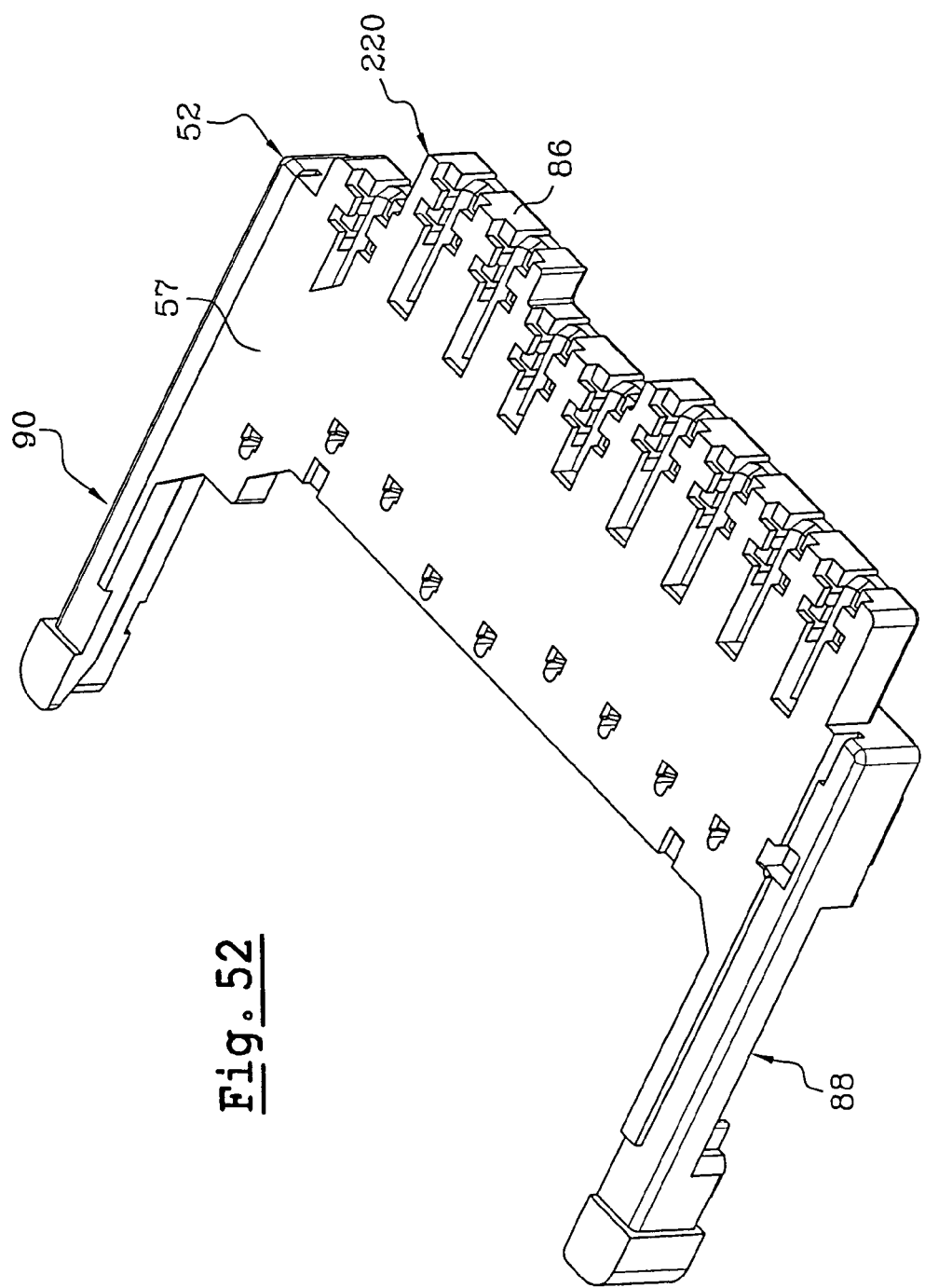
FIG. 52 is a bottom view of a support of the connector shown in FIGS. 41–51.

Another version of a connector with outputs 104 oriented towards the front is illustrated in FIG. 52 and the following figures, in which version the contact pads Pi on the card are oriented away from the printed circuit board, that is to say upwards, with the housing 58 for the insulating support entirely oriented downwards towards the upper face of the printed circuit board.

In the version in FIGS. 41 to 51, the total thickness of the connector, including the thickness of the SD card which is 2.1 mm (plus or minus 0.15 mm) and the thickness of the cover 54 which is 0.2 mm, is 2.7 mm.

In the version illustrated in FIG. 52 and the following figures, the total thickness is 2.5 mm, the vertical retention of the card then being provided, downwards, by the printed circuit board. This connector of low height, equal to 2.5 mm, may take an SD card whose maximum height is 2.1+ 0.15=2.25 mm.

Figure 41:
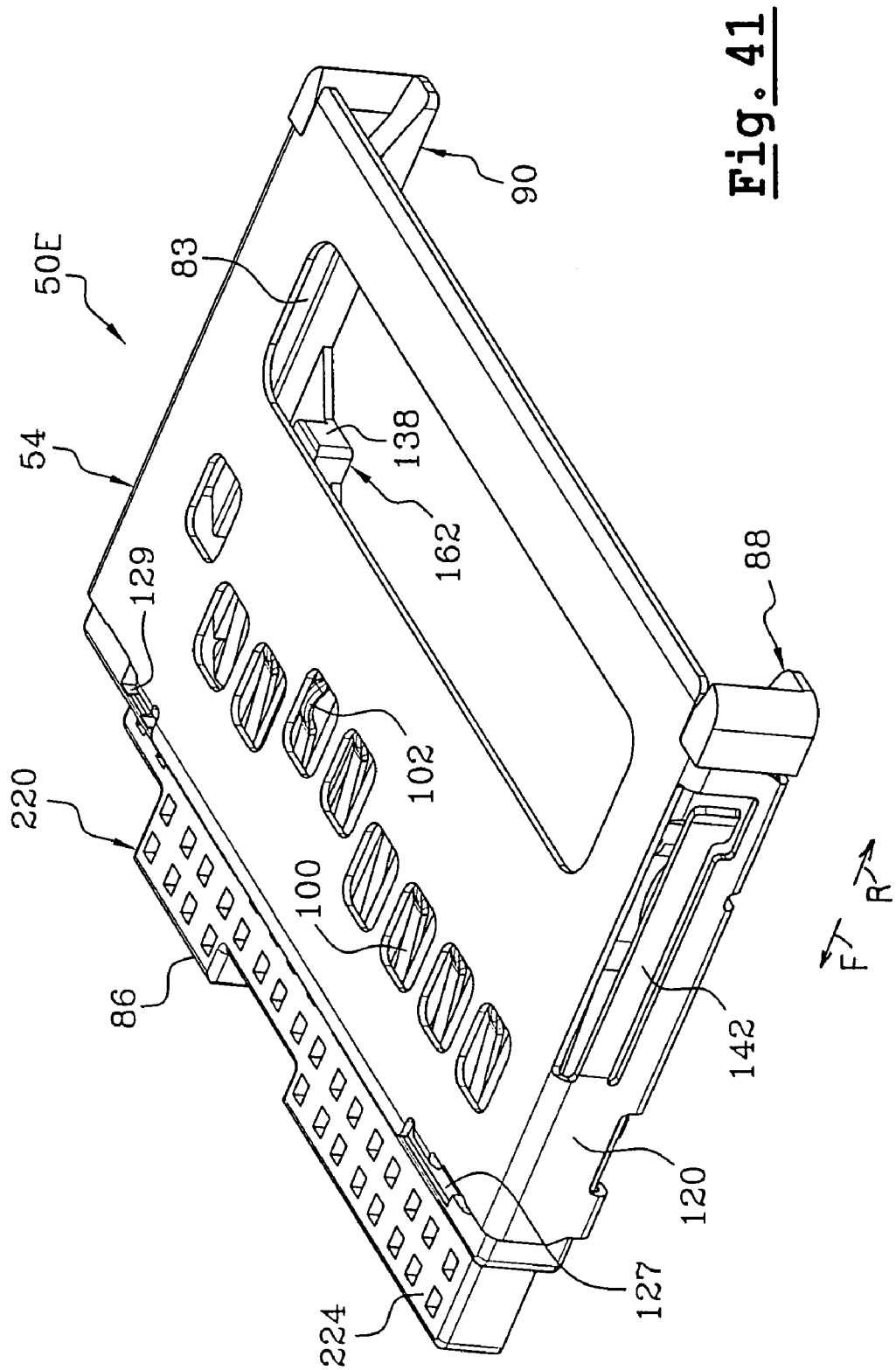
Figure 42:
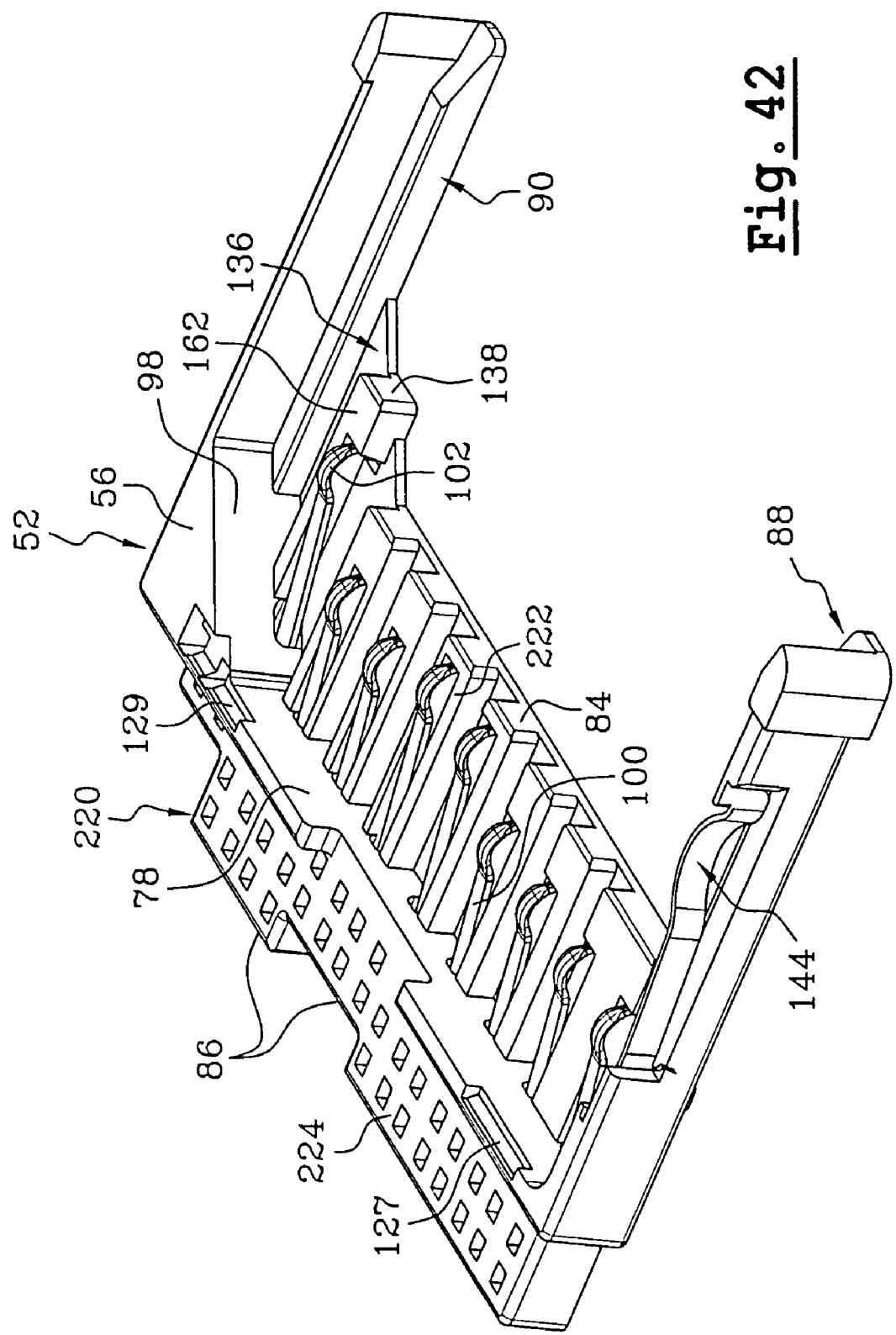
Figure 43:
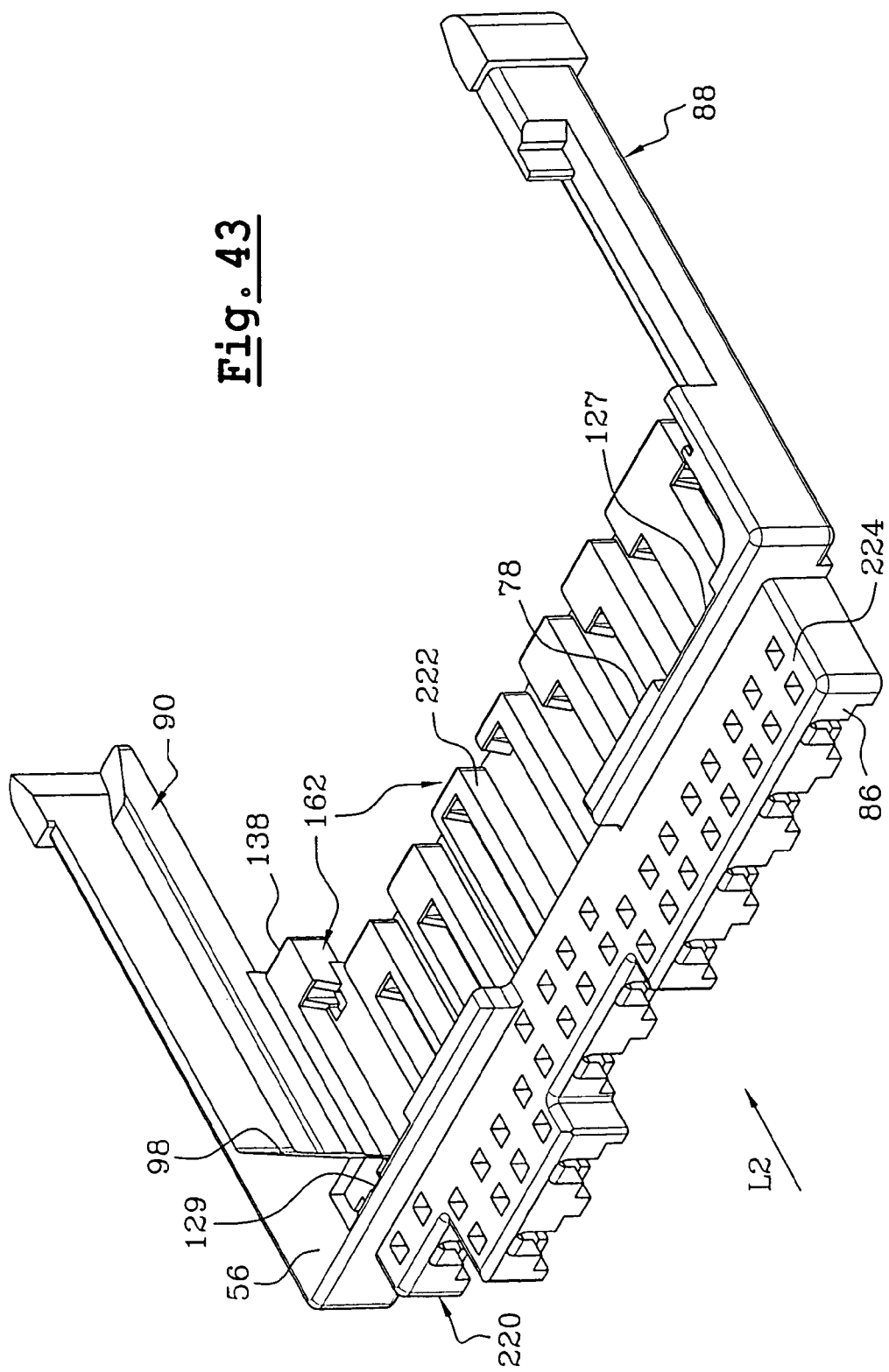
Figure 44:
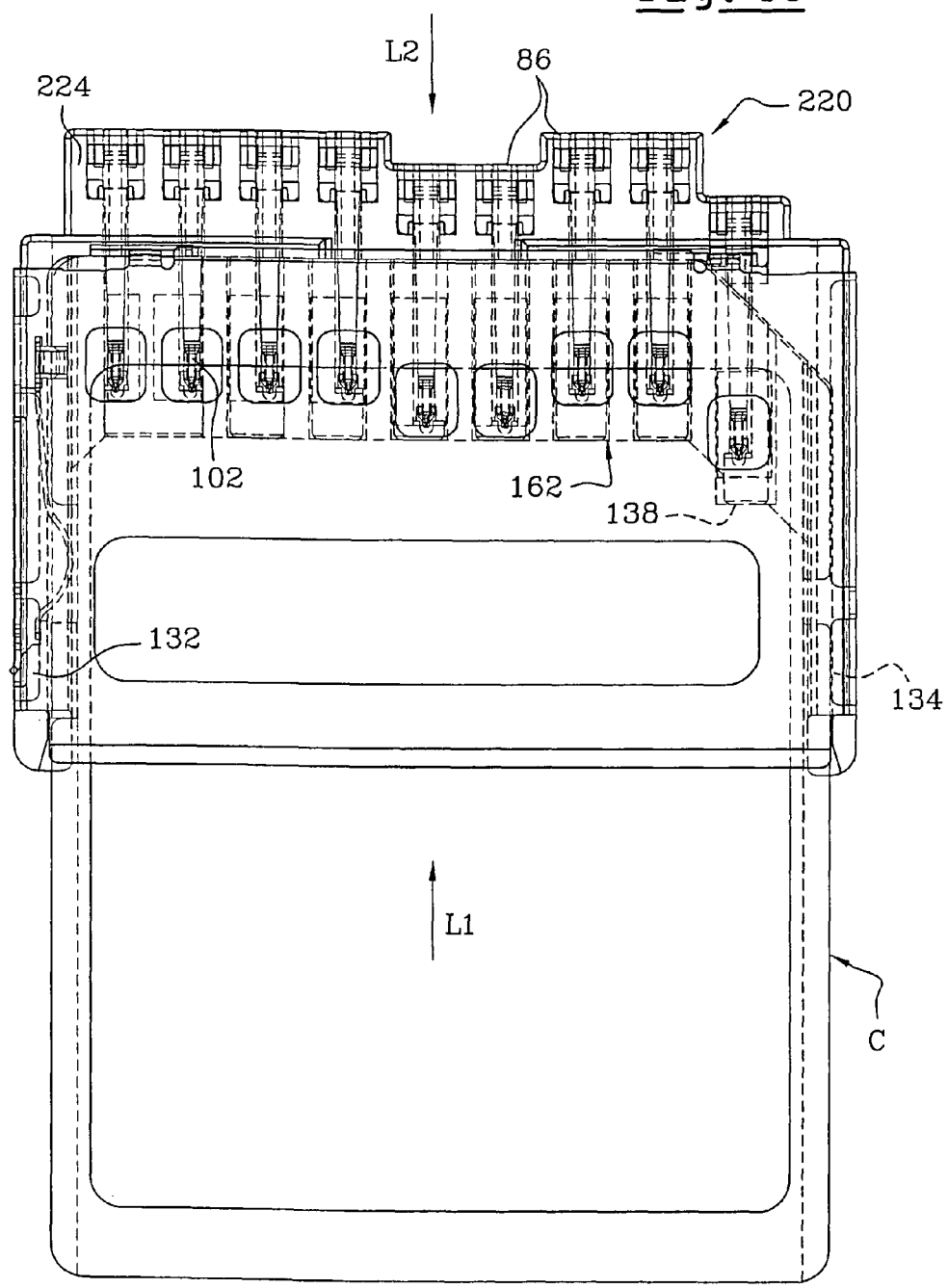
Figure 47:
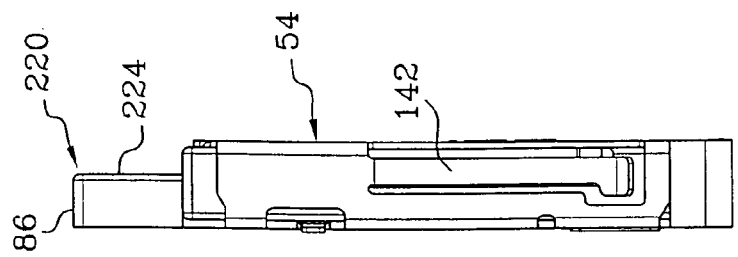
Figure 45:
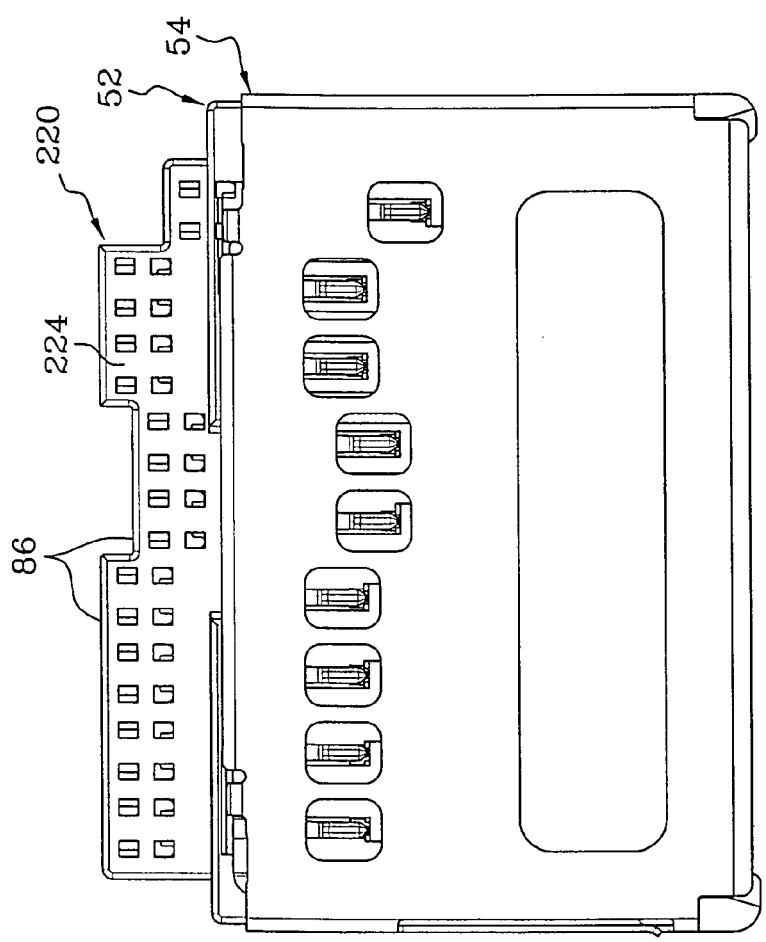
Figure 46:
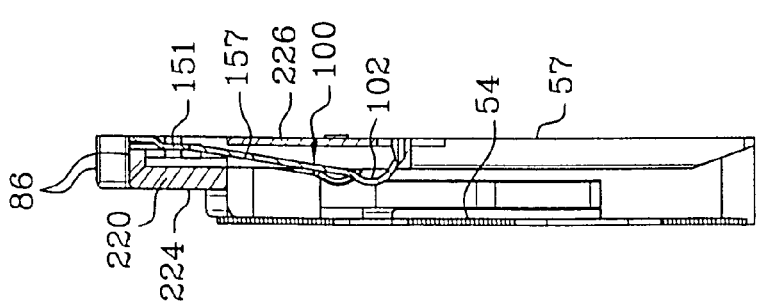

As may be seen in the figures, especially FIGS. 41 to 43, the total length of the connector 50, and more particularly the length of the main part of the insulating support 52 bounded by its transverse faces 84 and 86, is greater in order to have a rear block 220 allowing the contact blades 100, 102 to be mounted by longitudinal insertion in the direction L2.

As may be seen in FIGS. 42 and 43, the boxes 162 are, of course, reversed longitudinally and that one associated with the contact blade 100 located furthest to the right thus constitutes the stop 136 for polarizing the insertion of the 3D card, with its rear transverse stop face 138.

Referring to FIGS. 22 to 24 of the version with the outputs 104 oriented rearwards, it may be seen that the flexible branch 157 of the contact 100 and its part 151 for fixing it in the insulator 52 lie below the plane of the lower face 76 of the SD card, i.e. with a thickness or height "H" of 0.7 mm, which comprises 0.2 mm for the thickness of the contact and 0.25 mm of plastic on either side, above and below, the contact blade 151.

It may also be seen that the free contact 102 of the blade 100 must project by at least 0.7 mm from the plane of the flexible branch 157 of the blade in order to ensure that the end 102 is in contact with the pad Pi on the SD card without the lower face of the said card touching the flexible branch 157, in order to prevent any loss of electrical contact which would result therefrom.

Because of the 0.7 mm height between the planes 62 and 83 of the insulating support, dictated by the design of the SD card, the design of the blade 100 and of the cavity 158 of the insulating support has been optimized by reversing the design currently adopted for the electrical contact blades of the "crook" type normally used for the connectors for MICROSIM cards, for example those described in the documents WO-A-00/17805 and WO-A-00/17806.

In the rest state illustrated in FIG. 22, the flexible branch 57 is inclined towards the pads on the card at an angle of 10° with respect to the horizontal so as to minimize the height between the point of contact of the end 102 and the flexible branch 157, while still ensuring an overshoot of about 0.5 mm of the point of contact 102 with respect to the plane of contact of the conducting pads on the SD card or MMC card.

In the working position of each blade, illustrated in FIG. 23, the flexible branch 157 is returned by elastic deformation close to the horizontal.

If, according to the prior art, a design had been adopted in which the cavity 158 is open downwards in the lower face 57 of the insulating support, it would have been necessary, in order to prevent both the branch 157 in the elastically deformed position and the end 159 from colliding with the upper face of the printed circuit board, on the one hand for the angle of inclination of the branch 157 in the rest state to be considerably reduced (that is to say the overshoot height of the point of contact 102 in its rest state would have to be reduced, with a loss of reliability of the electrical contact) or, on the other hand, for the thickness between the region 151 of the contact blade 100 and the lower face 57 of the insulating support to be substantially increased, that is to say the total thickness of the connector would have to be increased.

Figure 49:
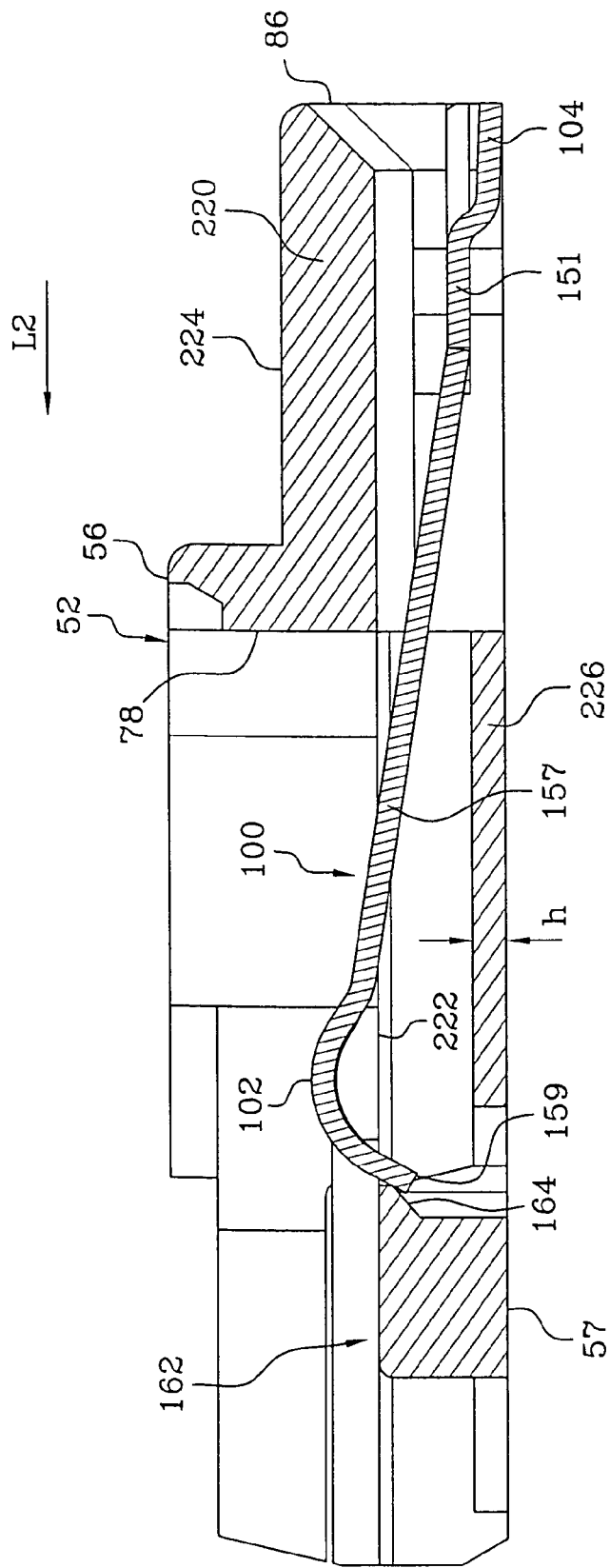
Figure 50:
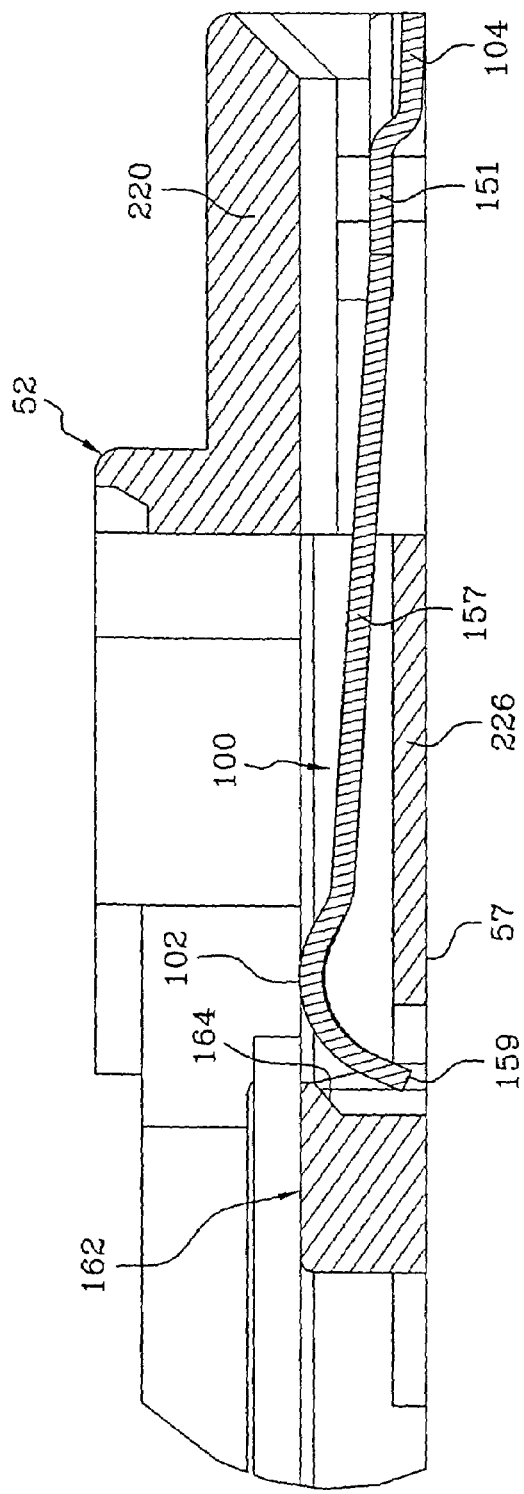
Figure 51:
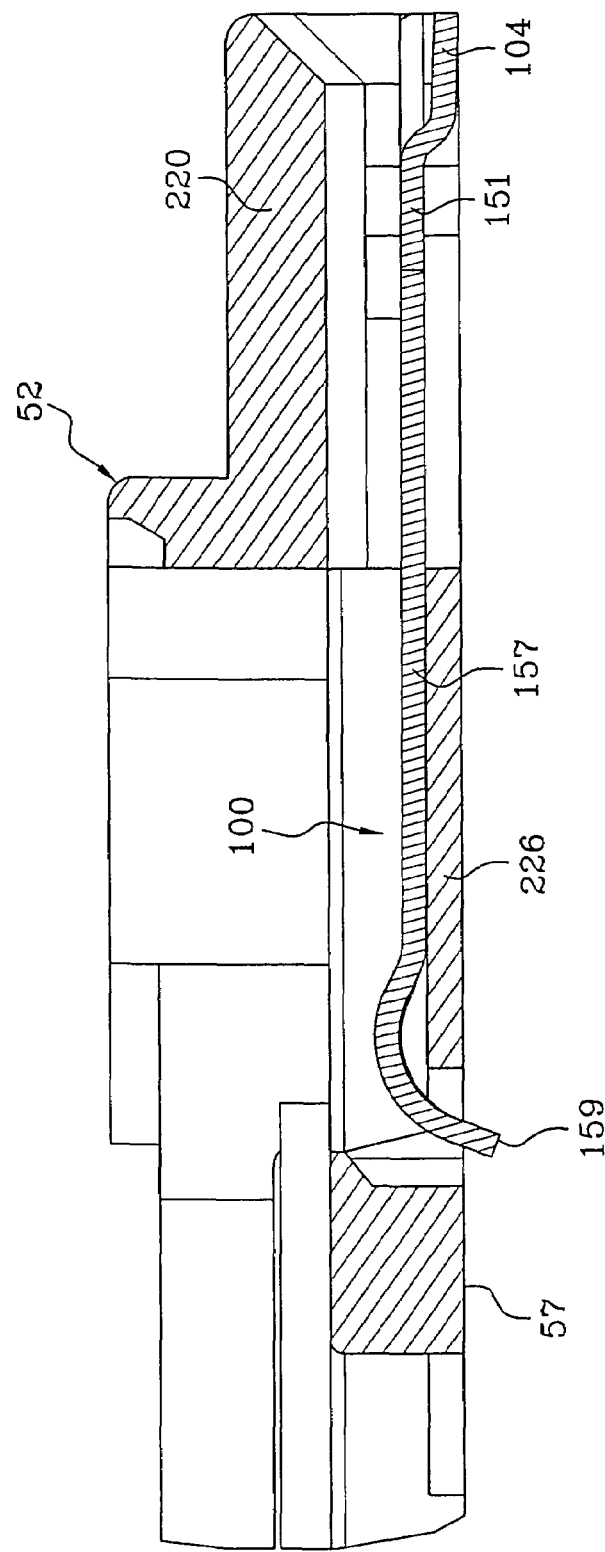

If we now compare this design with that with the outputs 104 oriented towards the front, which is shown in FIGS. 49 to 51, it may be seen that the bottom of the insulating support lying below the SD or MMC card has a height "h" reduced to 0.25 mm.

The robustness of this very thin bottom 226 is provided longitudinally by beams 222 (see FIG. 42) between which the flexible branches 157 lie and which terminate in the boxes 162.

On the other hand, the thin bottom 226 does not contribute to the transverse robustness of the insulating support as there is no transverse link between the beams.

It may also be seen that the blade retention region, with its part 151 inserted longitudinally, is located in the block 220 at the front of the insulating support 52 over a length of 4 mm bounded by the transverse faces 78 and 86.

The main features of this design are the following.

There is no heightwise constraint for the insulating support in this region, which may be brought up to the upper level of the insulating support 52, i.e. 2.5 mm.

However, as may be seen in the figures, it is not possible to use all of this height in order to avoid having excessively great thicknesses of material which would impair the quality of the molding. Thus, the block 220 is bounded upwards by an upper face 224 which lies vertically set back with respect to the upper face 56 of the support 52.

There is no dimensional constraint for the position of the blade retention region 151 since this region does not lie below the SD or MMC card. The plane of contact of each of the pads Pi on the SD or MMC card with the free end 102 of the associated contact blade lies at 0.7+0.25=0.95 mm from the lower face 57 of the insulating support.

This 0.95 mm value is similar to the thickness of the insulators (1 mm) used in the connectors developed for MICROSIM cards and for which the thickness of material under the contact retention region is equal to 0.25 mm and for which the cavities of the insulating support are oriented away from the conducting pads Pi on the card.

The lower face of the region 151 of the contact blade corresponds to the upper face of the thin bottom 226 with a thickness of 0.25 mm. Care therefore has to be taken to ensure that this retention region is located entirely beyond the stop face 78 for the card, so that the partitions 67 having a height of 0.6 or 0.7 mm, which separate the pads Pi on the SD card, do not collide with the latter.

The free end 102 of the blade 100 overshoots by 0.5 mm in the rest state illustrated in FIG. 49.

Thus, the deformation kinetics of a contact blade 100 illustrated in FIGS. 49 to 51 are identical to those of a conventional "crook"-type contact blade used in the known designs for connecting MICROSIM cards.

Since the upper face 224 is not limited heightwise, the thickness of plastic above the contact blade retention region 151 is very large, for example about 1.2 mm in the embodiment illustrated in the figures, giving the insulating support great transverse robustness.

In addition, since the cavities which house the contact blades are open downwards, this provides a natural passage for the free end 102 and the resilient branch 157 of each contact blade during their longitudinal insertion in the direction L2.

The cover 54 shown in FIG. 41 and the following figures is overall similar to the cover 54 described previously, with the exception of its tabs 132 and 134 which are placed in the rear part of the cover so that, after soldering to the printed circuit board, the fastening and the mechanical behavior of the connector may be balanced.

Figure 53:
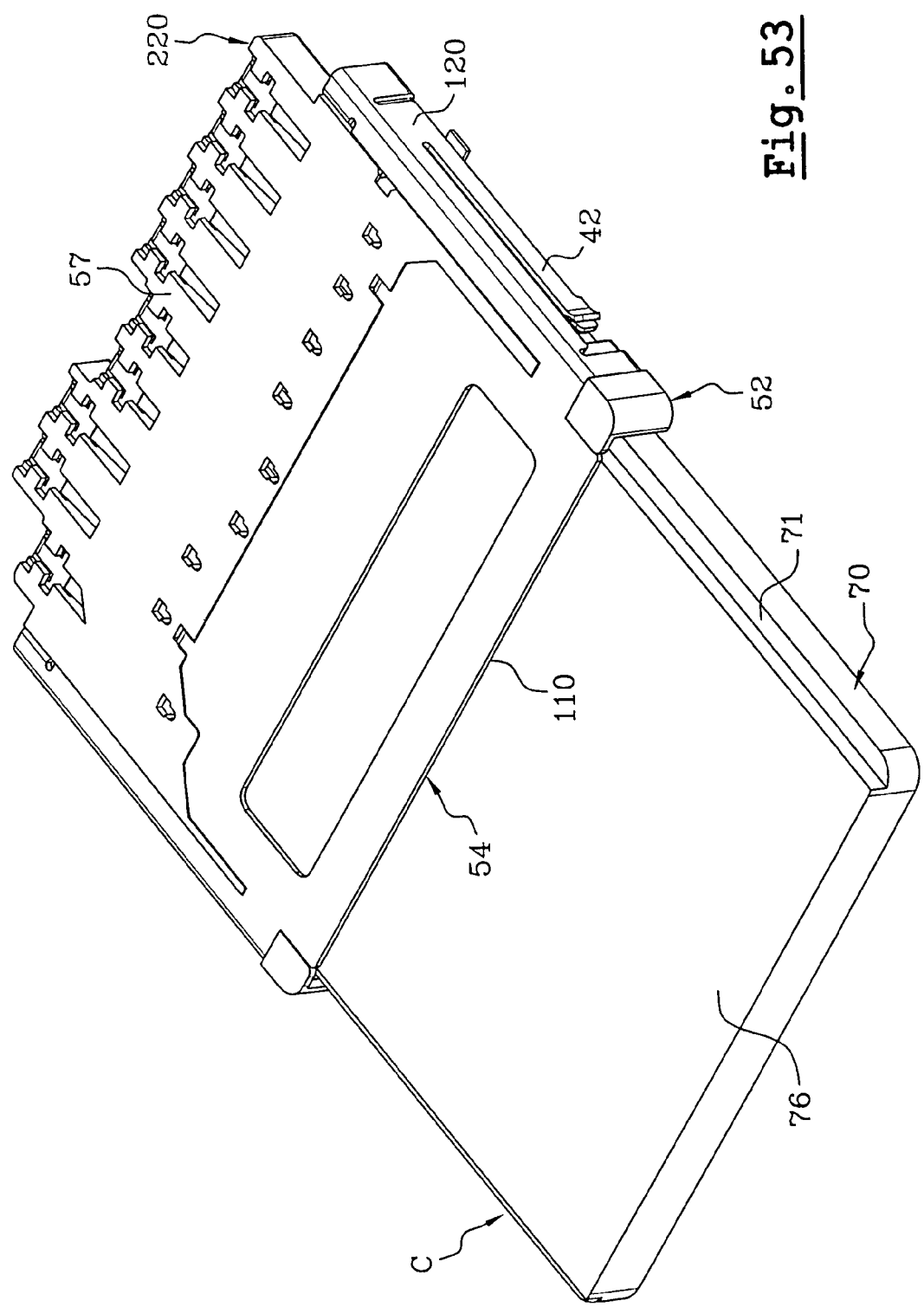
FIG. 53 is a bottom isometric view of the connector of FIG. 41, with a fully inserted card therein.
Figure 54:
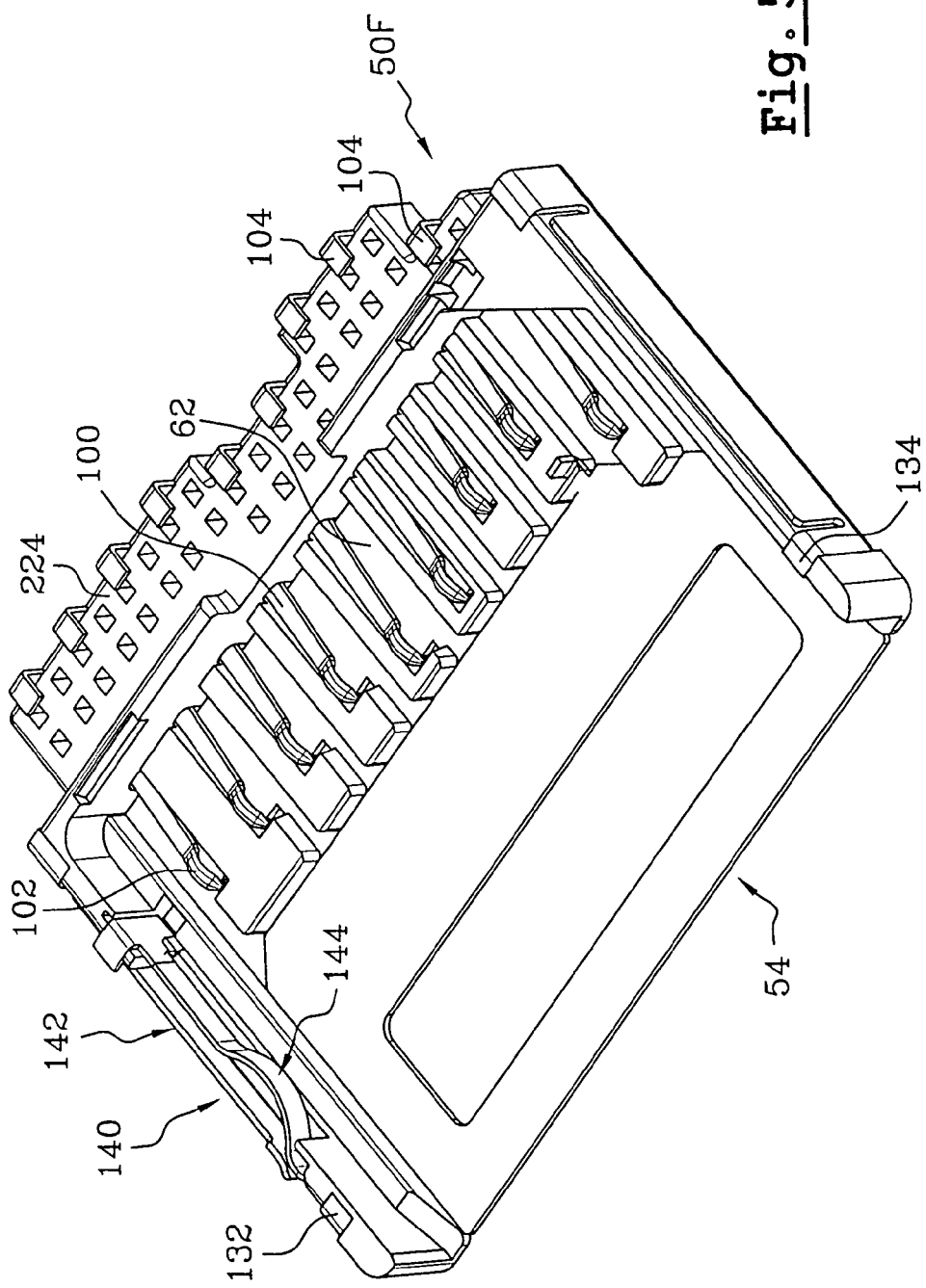
FIG. 54 is a top isometric view of the connector of FIG. 53?
Figure 55:
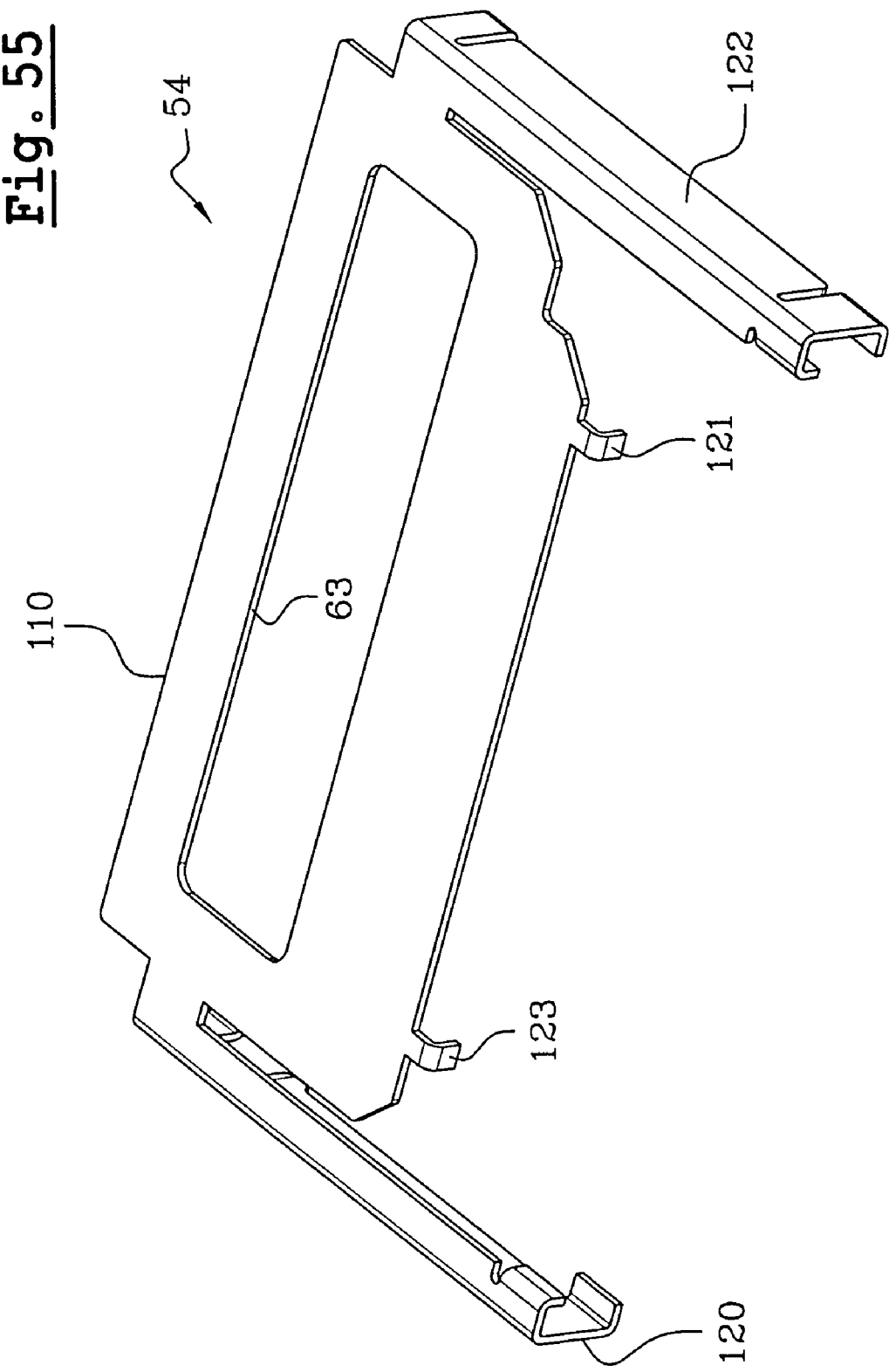
FIG. 55 is an isometric view of only the cover of the connector of FIGS. 53 and 54.
Figure 56:
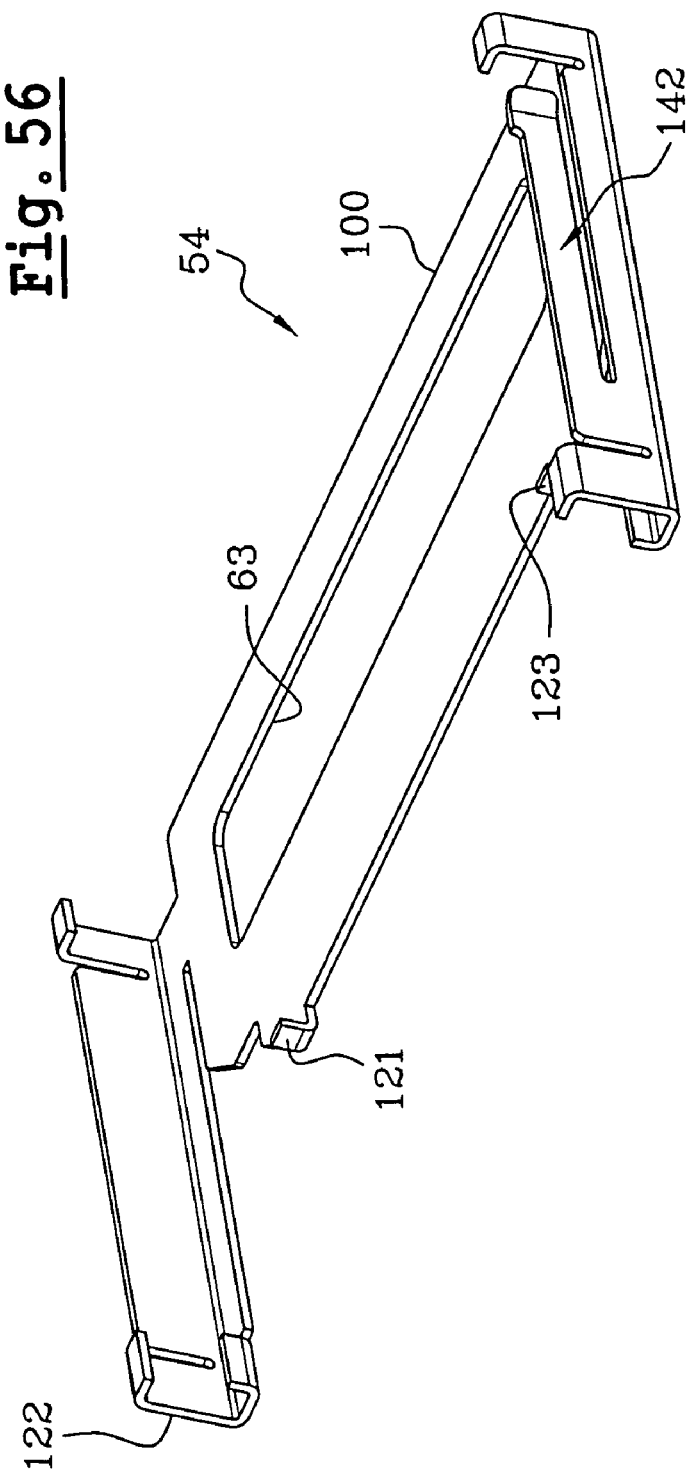
FIG. 56 is a bottom view of the cover of FIG. 55.

Finally, as may be seen in FIGS. 53 and 54, the insulating support 52 of a connector 50F may also be "turned upside down" so that its face 57 is oriented upwards in order to take an SD card with its conducting pads Pi, the latter also being oriented upwards, that is to say away from the upper face of the printed circuit board.

This embodiment of the connector also provides a cover or plate 54 whose main function is, in particular, to ensure rigidity of the longitudinal arms 88 and 90 thanks to the enveloping shape of its slideway-forming portions 120 and 122 and to contribute to the electromagnetic screening.

The cover 54 is mounted vertically by snapping onto the face 57 of the insulating support 52 which in this case is oriented upwards when the connector is in the mounted position on the upper face of the printed circuit board.

The 0.2 mm thickness of the upper plate 60 of the cover 54 is between the face 57 of the insulating support 52 and the other face, in this case oriented downwards, of the thin bottom or web 226 having a thickness of 0.25 mm (see FIG. 53).

Figure 57:
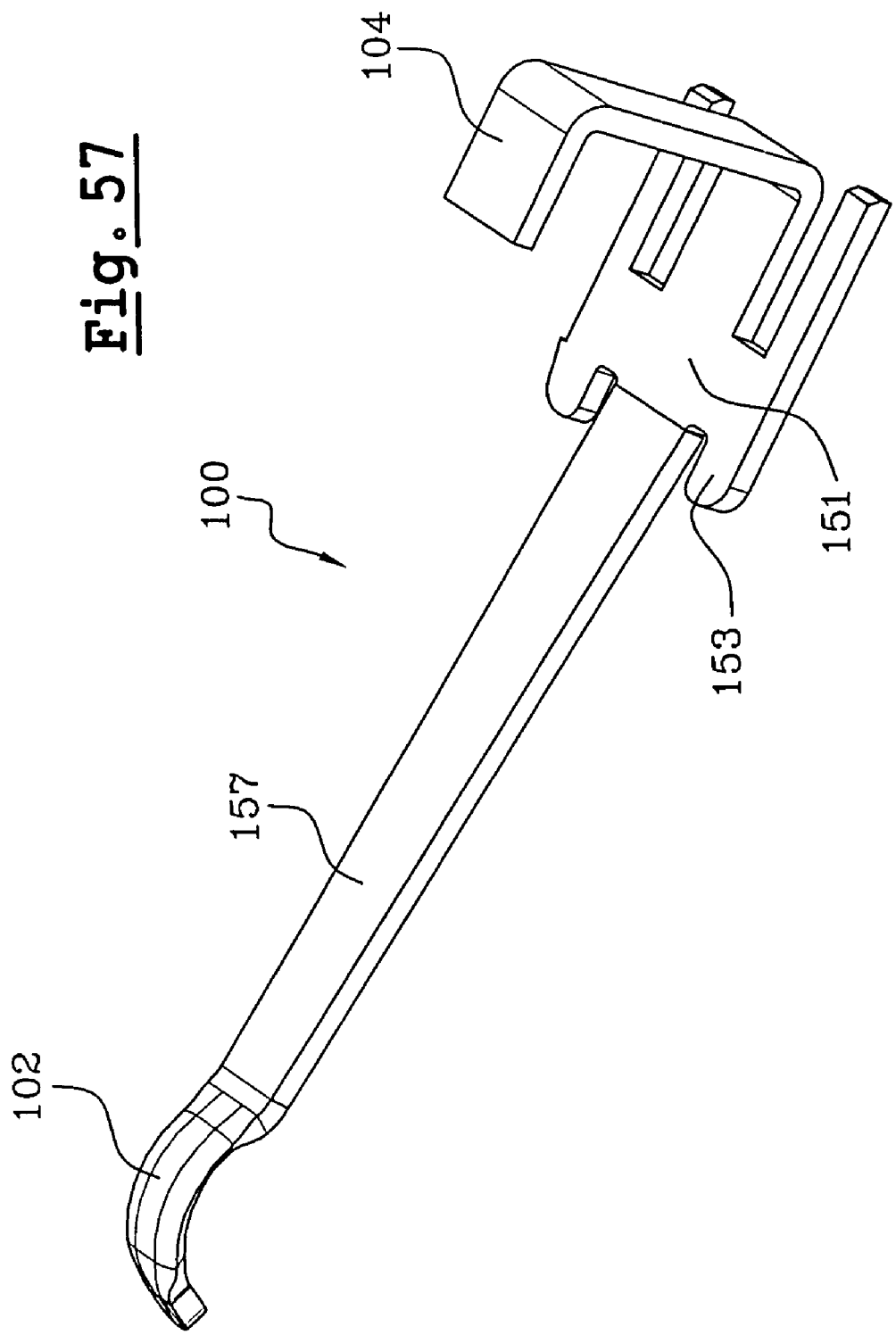
FIG. 57 is an isometric view of one of the nine identical contact blades of the connector of FIGS. 53 and 54.

As may be seen in FIGS. 54 and 57, the output ends 104 of the contact blades 100, 102 are, of course, modified, as is the output pad 146, 147 of the moving blade 144 of the switch 140.

Although applicant has used terms such as "lower", "upper", etc. to describe the invention as it is illustrated, it should be understood that the invention can be used in any orientation.

What is claimed is:

1. A smart card connector that includes an insulative support and a sheet metal cover that form a rearwardly-opening card-receiving cavity, that is designed to receive an SD smart card that has a front lower surface with grooves and contact pads in the grooves to block receipt of an upside-down SD smart card, the cover having a top wall lying primarily in a horizontal plane, first and second laterally-spaced vertically-extending side walls, and inward projections at lower ends of said side walls for lying under a bottom of the support to hold the cover on the support, wherein:

said support has a front wall with a top surface having a pair of laterally-spaced notches, and said cover top wall has a front end with a pair of partially downwardly-extending resilient projections that each lies in one of said notches;

said top surface of said support top wall having portions lying immediately forward of said notches, and said cover being slideable rearwardly onto said support until said projections each snaps into one of said notches to lock said cover onto said support, a stop fixed to said support and projecting upward therefrom into said cavity, said stop being positioned to be received in one of said grooves.

2. The connector described in claim 1 wherein:

said support front wall has an empty cutout lying between said notches, so a tool can be inserted into said cutout to pry up the front end of the cover.

3. A smart card connector for receiving a forwardly inserted SD smart card which has a front lower surface with grooves and contact pads in the grooves, wherein the connector prevents full forward insertion of an upside down SD smart card, the connector including a housing with walls forming a rearwardly-opening card-receiving having top and bottom cavity horizontal walls and a plurality of laterally-spaced contacts having mounting sections and having forward free ends that project into the cavity for engaging said forwardly inserted card, with said free ends being deflectable close to one of said horizontal cavity walls, said connector comprising:

A stop fixed to one of said cavity horizontal walls and narrow enough and positioned to be received in one of said grooves, said stop positioned to engage an end of said groove to prevent further movement of said card.

4. The connector described in claim 3 wherein:

said stop is sufficiently laterally close enough to a selected on of said contacts, so both said selected contact and said stop can fit into one of said grooves.

* * * * *